US012132261B2

(12) United States Patent
Papio-Toda et al.

(10) Patent No.: US 12,132,261 B2
(45) Date of Patent: Oct. 29, 2024

(54) SYSTEMS FOR RECEIVING ELECTROMAGNETIC ENERGY USING ANTENNAS THAT ARE MINIMALLY AFFECTED BY THE PRESENCE OF THE HUMAN BODY

(71) Applicant: Energous Corporation, San Jose, CA (US)

(72) Inventors: Anna Papio-Toda, San Jose, CA (US); Shun Yao, San Jose, CA (US); Chryssoula Kyriazidou, San Jose, CA (US); Seiran Khaledian, Chicago, IL (US)

(73) Assignee: Energous Corporation, San Jose, CA (US)

( * ) Notice: Subject to any disclaimer, the term of this patent is extended or adjusted under 35 U.S.C. 154(b) by 238 days.

(21) Appl. No.: 17/903,981

(22) Filed: Sep. 6, 2022

(65) Prior Publication Data

US 2023/0076710 A1 Mar. 9, 2023

Related U.S. Application Data

(63) Continuation of application No. 16/683,167, filed on Nov. 13, 2019, now Pat. No. 11,437,735.

(Continued)

(51) Int. Cl.

*H01Q 21/20* (2006.01)
*H01Q 1/52* (2006.01)

(Continued)

(52) U.S. Cl.

CPC ........... *H01Q 21/205* (2013.01); *H01Q 1/525* (2013.01); *H01Q 21/24* (2013.01); *H01Q 25/001* (2013.01); *H02J 50/27* (2016.02); *H01Q 7/005* (2013.01)

(58) Field of Classification Search

None

See application file for complete search history.

(56) References Cited

U.S. PATENT DOCUMENTS 787,412 A 4/1905 Tesla
2,811,624 A 10/1957 Haagensen (Continued)

FOREIGN PATENT DOCUMENTS

CN 201278367 Y 7/2009
CN 102292896 A 12/2011

(Continued)

OTHER PUBLICATIONS

Energous Corp., IPRP, PCT/US2014/037072, Nov. 10, 2015, 6 pgs.

(Continued)

*Primary Examiner* — Jared Fureman
*Assistant Examiner* — Joel Barnett
(74) *Attorney, Agent, or Firm* — Morgan, Lewis & Bockius LLP

(57) ABSTRACT

An antenna for receiving wireless power from a transmitter is provided. The antenna includes multiple antenna elements, coupled to an electronic device, configured to receive radio-frequency (RF) power waves from the transmitter, each antenna element being adjacent to at least one other antenna element. Furthermore, the multiple antenna elements are arranged so that an efficiency of reception of the RF power waves by the antenna elements remains above a predetermined threshold efficiency when a human hand is in contact with the electronic device, the predetermined threshold efficiency being at least 50%. Lastly, at least one antenna element is coupled to conversion circuitry, which is configured to (i) convert energy from the received RF power waves (Continued)

into usable power and (ii) provide the usable power to the electronic device for powering or charging of the electronic device.

26 Claims, 24 Drawing Sheets
(16 of 24 Drawing Sheet(s) Filed in Color)

Related U.S. Application Data

(60) Provisional application No. 62/767,365, filed on Nov. 14, 2018.

(51) Int. Cl.

| | |
|---|---|
| ***H01Q 7/00*** | (2006.01) |
| ***H01Q 21/24*** | (2006.01) |
| ***H01Q 25/00*** | (2006.01) |
| ***H02J 50/27*** | (2016.01) |

(56) References Cited

U.S. PATENT DOCUMENTS 2,863,148 A 12/1958 Gammon et al.
3,167,775 A 1/1965 Guertler
3,434,678 A 3/1969 Brown et al.
3,696,384 A 10/1972 Lester
3,754,269 A 8/1973 Clavin
4,101,895 A 7/1978 Jones, Jr.
4,360,741 A 11/1982 Fitzsimmons et al.
4,944,036 A 7/1990 Hyatt
4,995,010 A 2/1991 Knight
5,200,759 A 4/1993 McGinnis
5,211,471 A 5/1993 Rohrs
5,548,292 A 8/1996 Hirshfield et al.
5,556,749 A 9/1996 Mitsuhashi et al.
5,568,088 A 10/1996 Dent et al.
5,646,633 A 7/1997 Dahlberg
5,697,063 A 12/1997 Kishigami et al.
5,712,642 A 1/1998 Hulderman
5,936,527 A 8/1999 Isaacman et al.
5,982,139 A 11/1999 Parise
6,046,708 A 4/2000 MacDonald, Jr. et al.
6,061,025 A 5/2000 Jackson et al.
6,127,799 A 10/2000 Krishnan
6,127,942 A 10/2000 Welle
6,163,296 A 12/2000 Lier et al.
6,271,799 B1 8/2001 Rief
6,289,237 B1 9/2001 Mickle et al.
6,329,908 B1 12/2001 Frecska
6,400,586 B2 6/2002 Raddi et al.
6,421,235 B2 7/2002 Ditzik
6,437,685 B2 8/2002 Hanaki
6,456,253 B1 9/2002 Rummeli et al.
6,476,795 B1 11/2002 Derocher et al.
6,501,414 B2 12/2002 Amdt et al.
6,583,723 B2 6/2003 Watanabe et al.
6,597,897 B2 7/2003 Tang
6,615,074 B2 9/2003 Mickle et al.
6,650,376 B1 11/2003 Obitsu
6,664,920 B1 12/2003 Mott et al.
6,680,700 B2 1/2004 Hilgers
6,798,716 B1 9/2004 Charych
6,803,744 B1 10/2004 Sabo
6,853,197 B1 2/2005 McFarland
6,856,291 B2 2/2005 Mickle et al.
6,911,945 B2 6/2005 Korva
6,960,968 B2 11/2005 Odendaal et al.
6,967,462 B1 11/2005 Landis
6,988,026 B2 1/2006 Breed et al.
7,003,350 B2 2/2006 Denker et al.
7,027,311 B2 4/2006 Vanderelli et al.
7,068,234 B2 6/2006 Sievenpiper
7,068,991 B2 6/2006 Parise
7,079,079 B2 7/2006 Jo et al.
7,183,748 B1 2/2007 Unno et al.
7,191,013 B1 3/2007 Miranda et al.
7,193,644 B2 3/2007 Carter
7,196,663 B2 3/2007 Bolzer et al.
7,205,749 B2 4/2007 Hagen et al.
7,215,296 B2 5/2007 Abramov et al.
7,222,356 B1 5/2007 Yonezawa et al.
7,274,334 B2 9/2007 O'Riordan et al.
7,274,336 B2 9/2007 Carson
7,351,975 B2 4/2008 Brady et al.
7,359,730 B2 4/2008 Dennis et al.
7,372,408 B2 5/2008 Gaucher
7,392,068 B2 6/2008 Dayan
7,403,803 B2 7/2008 Mickle et al.
7,443,057 B2 10/2008 Nunally
7,451,839 B2 11/2008 Perlman
7,463,201 B2 12/2008 Chiang et al.
7,471,247 B2 12/2008 Saily
7,535,195 B1 5/2009 Horovitz et al.
7,614,556 B2 11/2009 Overhultz et al.
7,639,994 B2 12/2009 Greene et al.
7,643,312 B2 1/2010 Vanderelli et al.
7,652,577 B1 1/2010 Madhow et al.
7,679,576 B2 3/2010 Riedel et al.
7,702,771 B2 4/2010 Ewing et al.
7,786,419 B2 8/2010 Hyde et al.
7,812,771 B2 10/2010 Greene et al.
7,830,312 B2 11/2010 Choudhury et al.
7,844,306 B2 11/2010 Shearer et al.
7,868,482 B2 1/2011 Greene et al.
7,898,105 B2 3/2011 Greene et al.
7,904,117 B2 3/2011 Doan et al.
7,911,386 B1 3/2011 Ito et al.
7,925,308 B2 4/2011 Greene et al.
7,948,208 B2 5/2011 Partovi et al.
8,049,676 B2 11/2011 Yoon et al.
8,055,003 B2 11/2011 Mittleman et al.
8,070,595 B2 12/2011 Alderucci et al.
8,072,380 B2 12/2011 Crouch
8,092,301 B2 1/2012 Alderucci et al.
8,099,140 B2 1/2012 Arai
8,115,448 B2 2/2012 John
8,159,090 B2 4/2012 Greene et al.
8,159,364 B2 4/2012 Zeine
8,180,286 B2 5/2012 Yamasuge
8,228,194 B2 7/2012 Mickle
8,234,509 B2 7/2012 Gioscia et al.
8,264,101 B2 9/2012 Hyde et al.
8,264,291 B2 9/2012 Morita
8,276,325 B2 10/2012 Clifton et al.
8,278,784 B2 10/2012 Cook et al.
8,284,101 B2 10/2012 Fusco
8,310,201 B1 11/2012 Wright
8,338,991 B2 12/2012 Von Novak et al.
8,362,745 B2 1/2013 Tinaphong
8,380,255 B2 2/2013 Shearer et al.
8,384,600 B2 2/2013 Huang et al.
8,410,953 B2 4/2013 Zeine
8,411,963 B2 4/2013 Luff
8,432,062 B2 4/2013 Greene et al.
8,432,071 B2 4/2013 Huang et al.
8,446,248 B2 5/2013 Zeine
8,447,234 B2 5/2013 Cook et al.
8,451,189 B1 5/2013 Fluhler
8,452,235 B2 5/2013 Kirby et al.
8,457,656 B2 6/2013 Perkins et al.
8,461,817 B2 6/2013 Martin et al.
8,467,733 B2 6/2013 Leabman
8,497,601 B2 7/2013 Hall et al.
8,497,658 B2 7/2013 Von Novak et al.
8,552,597 B2 8/2013 Song et al.
8,558,661 B2 10/2013 Zeine
8,560,026 B2 10/2013 Chanterac
8,564,485 B2 10/2013 Milosavljevic et al.
8,604,746 B2 12/2013 Lee
8,614,643 B2 12/2013 Leabman
8,621,245 B2 12/2013 Shearer et al.
8,626,249 B2 1/2014 Kuusilinna et al.

(56) References Cited

U.S. PATENT DOCUMENTS 8,629,576 B2 1/2014 Levine
8,653,966 B2 2/2014 Rao et al.
8,674,551 B2 3/2014 Low et al.
8,686,685 B2 4/2014 Moshfeghi
8,686,905 B2 4/2014 Shtrom
8,712,355 B2 4/2014 Black et al.
8,712,485 B2 4/2014 Tam
8,718,773 B2 5/2014 Wills et al.
8,729,737 B2 5/2014 Schatz et al.
8,736,228 B1 5/2014 Freed et al.
8,760,113 B2 6/2014 Keating
8,770,482 B2 7/2014 Ackermann et al.
8,772,960 B2 7/2014 Yoshida
8,823,319 B2 9/2014 Von Novak, III et al.
8,832,646 B1 9/2014 Wendling
8,854,176 B2 10/2014 Zeine
8,860,364 B2 10/2014 Low et al.
8,897,770 B1 11/2014 Frolov et al.
8,903,456 B2 12/2014 Chu et al.
8,917,057 B2 12/2014 Hui
8,923,189 B2 12/2014 Leabman
8,928,544 B2 1/2015 Massie et al.
8,937,408 B2 1/2015 Ganem et al.
8,946,940 B2 2/2015 Kim et al.
8,963,486 B2 2/2015 Kirby et al.
8,970,070 B2 3/2015 Sada et al.
8,989,053 B1 3/2015 Skaaksrud et al.
9,000,616 B2 4/2015 Greene et al.
9,001,622 B2 4/2015 Perry
9,006,934 B2 4/2015 Kozakai et al.
9,021,277 B2 4/2015 Shearer et al.
9,030,161 B2 5/2015 Lu et al.
9,059,598 B2 6/2015 Kang et al.
9,059,599 B2 6/2015 Won et al.
9,077,188 B2 7/2015 Moshfeghi
9,083,595 B2 7/2015 Rakib et al.
9,088,216 B2 7/2015 Garrity et al.
9,124,125 B2 9/2015 Leabman et al.
9,130,397 B2 9/2015 Leabman et al.
9,130,602 B2 9/2015 Cook
9,142,998 B2 9/2015 Yu et al.
9,143,000 B2 9/2015 Leabman et al.
9,143,010 B2 9/2015 Urano
9,153,074 B2 10/2015 Zhou et al.
9,178,389 B2 11/2015 Hwang
9,225,196 B2 12/2015 Huang et al.
9,240,469 B2 1/2016 Sun et al.
9,242,411 B2 1/2016 Kritchman et al.
9,244,500 B2 1/2016 Cain et al.
9,252,628 B2 2/2016 Leabman et al.
9,270,344 B2 2/2016 Rosenberg
9,276,329 B2 3/2016 Jones et al.
9,282,582 B1 3/2016 Dunsbergen et al.
9,294,840 B1 3/2016 Anderson et al.
9,297,896 B1 3/2016 Andrews
9,318,898 B2 4/2016 John
9,368,020 B1 6/2016 Bell et al.
9,401,977 B1 7/2016 Gaw
9,409,490 B2 8/2016 Kawashima
9,419,335 B2 8/2016 Pintos
9,419,443 B2 8/2016 Leabman
9,438,045 B1 9/2016 Leabman
9,438,046 B1 9/2016 Leabman
9,444,283 B2 9/2016 Son et al.
9,450,449 B1 9/2016 Leabman et al.
9,461,502 B2 10/2016 Lee et al.
9,520,725 B2 12/2016 Masaoka et al.
9,520,748 B2 12/2016 Hyde et al.
9,522,270 B2 12/2016 Perryman et al.
9,537,354 B2 1/2017 Bell et al.
9,537,357 B2 1/2017 Leabman
9,537,358 B2 1/2017 Leabman
9,538,382 B2 1/2017 Bell et al.
9,544,640 B2 1/2017 Lau
9,559,553 B2 1/2017 Bae
9,564,773 B2 2/2017 Pogorelik et al.
9,571,974 B2 2/2017 Choi et al.
9,590,317 B2 3/2017 Zimmerman et al.
9,590,444 B2 3/2017 Walley
9,620,996 B2 4/2017 Zeine
9,647,328 B2 5/2017 Dobric
9,706,137 B2 7/2017 Scanlon et al.
9,711,999 B2 7/2017 Hietala et al.
9,723,635 B2 8/2017 Nambord et al.
9,793,758 B2 10/2017 Leabman
9,793,764 B2 10/2017 Perry
9,800,080 B2 10/2017 Leabman et al.
9,800,172 B1 10/2017 Leabman
9,806,564 B2 10/2017 Leabman
9,819,230 B2 11/2017 Petras et al.
9,824,815 B2 11/2017 Leabman et al.
9,825,674 B1 11/2017 Leabman
9,831,718 B2 11/2017 Leabman et al.
9,838,083 B2 12/2017 Bell et al.
9,843,213 B2 12/2017 Leabman et al.
9,843,229 B2 12/2017 Leabman
9,843,763 B2 12/2017 Leabman et al.
9,847,669 B2 12/2017 Leabman
9,847,677 B1 12/2017 Leabman
9,847,679 B2 12/2017 Bell et al.
9,853,361 B2 12/2017 Chen et al.
9,853,692 B1 12/2017 Bell et al.
9,859,756 B2 1/2018 Leabman et al.
9,859,758 B1 1/2018 Leabman
9,866,279 B2 1/2018 Bell et al.
9,867,032 B2 1/2018 Verma et al.
9,867,062 B1 1/2018 Bell et al.
9,871,301 B2 1/2018 Contopanagos
9,876,380 B1 1/2018 Leabman et al.
9,876,394 B1 1/2018 Leabman
9,876,536 B1 1/2018 Bell et al.
9,876,648 B2 1/2018 Bell
9,882,394 B1 1/2018 Bell et al.
9,882,427 B2 1/2018 Leabman et al.
9,887,584 B1 2/2018 Bell et al.
9,887,739 B2 2/2018 Leabman et al.
9,891,669 B2 2/2018 Bell
9,893,554 B2 2/2018 Bell et al.
9,893,555 B1 2/2018 Leabman et al.
9,893,564 B2 2/2018 de Rochemont
9,899,744 B1 2/2018 Contopanagos et al.
9,899,844 B1 2/2018 Bell et al.
9,899,861 B1 2/2018 Leabman et al.
9,899,873 B2 2/2018 Bell et al.
9,906,065 B2 2/2018 Leabman et al.
9,906,275 B2 2/2018 Leabman
9,912,199 B2 3/2018 Leabman et al.
9,916,485 B1 3/2018 Lilly et al.
9,917,477 B1 3/2018 Bell et al.
9,923,386 B1 3/2018 Leabman et al.
9,939,864 B1 4/2018 Bell et al.
9,941,747 B2 4/2018 Bell et al.
9,941,754 B2 4/2018 Leabman et al.
9,948,135 B2 4/2018 Leabman et al.
9,965,009 B1 5/2018 Bell et al.
9,966,765 B1 5/2018 Leabman
9,966,784 B2 5/2018 Leabman
9,967,743 B1 5/2018 Bell et al.
9,973,008 B1 5/2018 Leabman
10,003,211 B1 6/2018 Leabman et al.
10,008,777 B1 6/2018 Broyde et al.
10,008,889 B2 6/2018 Bell et al.
10,014,728 B1 7/2018 Leabman
10,027,159 B2 7/2018 Hosseini
10,038,337 B1 7/2018 Leabman et al.
10,050,462 B1 8/2018 Leabman et al.
10,056,782 B1 8/2018 Leabman
10,063,064 B1 8/2018 Bell et al.
10,063,105 B2 8/2018 Leabman
10,063,106 B2 8/2018 Bell et al.
10,068,703 B1 9/2018 Contopanagos
10,075,008 B1 9/2018 Bell et al.
10,079,515 B2 9/2018 Hosseini et al.
10,090,699 B1 10/2018 Leabman

(56) References Cited

U.S. PATENT DOCUMENTS 10,090,886 B1 10/2018 Bell et al.
10,103,552 B1 10/2018 Leabman et al.
10,103,582 B2 10/2018 Leabman et al.
10,122,219 B1 11/2018 Hosseini et al.
10,122,415 B2 11/2018 Bell et al.
10,124,754 B1 11/2018 Leabman
10,128,686 B1 11/2018 Leabman et al.
10,128,693 B2 11/2018 Bell et al.
10,128,695 B2 11/2018 Leabman et al.
10,128,699 B2 11/2018 Leabman
10,134,260 B1 11/2018 Bell et al.
10,135,112 B1 11/2018 Hosseini
10,135,286 B2 11/2018 Hosseini et al.
10,135,294 B1 11/2018 Leabman
10,135,295 B2 11/2018 Leabman
10,141,768 B2 11/2018 Leabman et al.
10,141,771 B1 11/2018 Hosseini et al.
10,141,791 B2 11/2018 Bell et al.
10,148,097 B1 12/2018 Leabman et al.
10,153,645 B1 12/2018 Bell et al.
10,153,653 B1 12/2018 Bell et al.
10,153,660 B1 12/2018 Leabman et al.
10,158,257 B2 12/2018 Leabman
10,158,259 B1 12/2018 Leabman
10,164,478 B2 12/2018 Leabman
10,170,917 B1 1/2019 Bell et al.
10,177,594 B2 1/2019 Contopanagos
10,181,756 B2 1/2019 Bae et al.
10,186,892 B2 1/2019 Hosseini et al.
10,186,893 B2 1/2019 Bell et al.
10,186,911 B2 1/2019 Leabman
10,186,913 B2 1/2019 Leabman et al.
10,193,396 B1 1/2019 Bell et al.
10,199,835 B2 2/2019 Bell
10,199,849 B1 2/2019 Bell
10,199,850 B2 2/2019 Leabman
10,205,239 B1 2/2019 Contopanagos et al.
10,206,185 B2 2/2019 Leabman et al.
10,211,674 B1 2/2019 Leabman et al.
10,211,680 B2 2/2019 Leabman et al.
10,211,682 B2 2/2019 Bell et al.
10,211,685 B2 2/2019 Bell et al.
10,218,207 B2 2/2019 Hosseini et al.
10,218,227 B2 2/2019 Leabman et al.
10,223,717 B1 3/2019 Bell
10,224,758 B2 3/2019 Leabman et al.
10,224,982 B1 3/2019 Leabman
10,230,266 B1 3/2019 Leabman et al.
10,243,414 B1 3/2019 Leabman et al.
10,256,657 B2 4/2019 Hosseini et al.
10,256,677 B2 4/2019 Hosseini et al.
10,263,432 B1 4/2019 Leabman et al.
10,263,476 B2 4/2019 Leabman
10,270,261 B2 4/2019 Bell et al.
10,277,054 B2 4/2019 Hosseini
10,291,055 B1 5/2019 Bell et al.
10,291,056 B2 5/2019 Bell et al.
10,291,066 B1 5/2019 Leabman
10,291,294 B2 5/2019 Leabman
10,298,024 B2 5/2019 Leabman
10,298,133 B2 5/2019 Leabman
10,305,315 B2 5/2019 Leabman et al.
10,312,715 B2 6/2019 Leabman
10,320,446 B2 6/2019 Hosseini
10,333,332 B1 6/2019 Hosseini
10,355,534 B2 7/2019 Johnston et al.
10,381,880 B2 8/2019 Leabman et al.
10,389,161 B2 8/2019 Hosseini et al.
10,396,588 B2 8/2019 Leabman
10,396,604 B2 8/2019 Bell et al.
10,439,442 B2 10/2019 Hosseini et al.
10,439,448 B2 10/2019 Bell et al.
10,447,093 B2 10/2019 Hosseini
10,476,312 B2 11/2019 Johnston et al.
10,483,768 B2 11/2019 Bell et al.
10,490,346 B2 11/2019 Contopanagos
10,491,029 B2 11/2019 Hosseini
10,498,144 B2 12/2019 Leabman et al.
10,511,097 B2 12/2019 Kornaros et al.
10,511,196 B2 12/2019 Hosseini
10,516,289 B2 12/2019 Leabman et al.
10,516,301 B2 12/2019 Leabman
10,523,033 B2 12/2019 Leabman
10,523,058 B2 12/2019 Leabman
10,615,647 B2 4/2020 Johnston et al.
10,680,319 B2 6/2020 Hosseini et al.
10,714,984 B2 7/2020 Hosseini et al.
10,734,717 B2 8/2020 Hosseini
10,778,041 B2 9/2020 Leabman
10,790,674 B2 9/2020 Bell et al.
10,848,853 B2 11/2020 Leabman et al.
10,923,954 B2 2/2021 Leabman
10,958,095 B2 3/2021 Leabman et al.
10,965,164 B2 3/2021 Leabman et al.
10,992,185 B2 4/2021 Leabman
10,992,187 B2 4/2021 Leabman
11,011,942 B2 5/2021 Liu
11,114,885 B2 9/2021 Hosseini et al.
11,159,057 B2 10/2021 Kabiri et al.
11,233,425 B2 1/2022 Leabman
11,251,654 B2 2/2022 Sauterel et al.
11,342,798 B2 5/2022 Johnston et al.
11,437,735 B2 9/2022 Papio-Toda et al.
2001/0027876 A1 10/2001 Tsukamoto et al.
2002/0001307 A1 1/2002 Nguyen et al.
2002/0024471 A1 2/2002 Ishitobi
2002/0028655 A1 3/2002 Rosener et al.
2002/0034958 A1 3/2002 Oberschmidt et al.
2002/0054330 A1 5/2002 Jinbo et al.
2002/0065052 A1 5/2002 Pande et al.
2002/0072784 A1 6/2002 Sheppard et al.
2002/0095980 A1 7/2002 Breed et al.
2002/0103447 A1 8/2002 Terry
2002/0123776 A1 9/2002 Von Arx
2002/0133592 A1 9/2002 Matsuda
2002/0171594 A1 11/2002 Fang
2002/0172223 A1 11/2002 Stilp
2003/0005759 A1 1/2003 Breed et al.
2003/0038750 A1 2/2003 Chen
2003/0048254 A1 3/2003 Huang
2003/0058187 A1 3/2003 Billiet et al.
2003/0076274 A1 4/2003 Phelan et al.
2003/0179152 A1 9/2003 Watada et al.
2003/0179573 A1 9/2003 Chun
2003/0192053 A1 10/2003 Sheppard et al.
2004/0019624 A1 1/2004 Sukegawa
2004/0020100 A1 2/2004 O'Brian et al.
2004/0036657 A1 2/2004 Forster et al.
2004/0066251 A1 4/2004 Eleftheriades et al.
2004/0107641 A1 6/2004 Walton et al.
2004/0113543 A1 6/2004 Daniels
2004/0119675 A1 6/2004 Washio et al.
2004/0130425 A1 7/2004 Dayan et al.
2004/0130442 A1 7/2004 Breed
2004/0142733 A1 7/2004 Parise
2004/0145342 A1 7/2004 Lyon
2004/0155832 A1 8/2004 Yuanzhu
2004/0196190 A1 10/2004 Mendolia et al.
2004/0203979 A1 10/2004 Attar et al.
2004/0207559 A1 10/2004 Milosavljevic
2004/0218759 A1 11/2004 Yacobi
2004/0259604 A1 12/2004 Mickle et al.
2004/0263124 A1 12/2004 Wieck et al.
2005/0007276 A1 1/2005 Barrick et al.
2005/0030118 A1 2/2005 Wang
2005/0046584 A1 3/2005 Breed
2005/0055316 A1 3/2005 Williams
2005/0077872 A1 4/2005 Single
2005/0093766 A1 5/2005 Turner
2005/0116683 A1 6/2005 Cheng
2005/0117660 A1 6/2005 Vialle et al.
2005/0134517 A1 6/2005 Gottl
2005/0171411 A1 8/2005 KenKnight
2005/0198673 A1 9/2005 Kit et al.

(56) References Cited

U.S. PATENT DOCUMENTS

2005/0227619 A1 10/2005 Lee et al.
2005/0232469 A1 10/2005 Schofield
2005/0237249 A1 10/2005 Nagel
2005/0237258 A1 10/2005 Abramov et al.
2005/0282591 A1 12/2005 Shaff
2006/0013335 A1 1/2006 Leabman
2006/0019712 A1 1/2006 Choi
2006/0030279 A1 2/2006 Leabman et al.
2006/0033674 A1 2/2006 Essig, Jr. et al.
2006/0071308 A1 4/2006 Tang et al.
2006/0092079 A1 5/2006 de Rochemont
2006/0094425 A1 5/2006 Mickle et al.
2006/0113955 A1 6/2006 Nunally
2006/0119532 A1 6/2006 Yun et al.
2006/0136004 A1 6/2006 Cowan et al.
2006/0160517 A1 7/2006 Yoon
2006/0183473 A1 8/2006 Ukon
2006/0190063 A1 8/2006 Kanzius
2006/0192913 A1 8/2006 Shutou et al.
2006/0199620 A1 9/2006 Greene et al.
2006/0238365 A1 10/2006 Vecchione et al.
2006/0266564 A1 11/2006 Perlman et al.
2006/0266917 A1 11/2006 Baldis et al.
2006/0278706 A1 12/2006 Hatakayama et al.
2006/0284593 A1 12/2006 Nagy et al.
2006/0287094 A1 12/2006 Mahaffey et al.
2007/0007821 A1 1/2007 Rossetti
2007/0019693 A1 1/2007 Graham
2007/0021140 A1 1/2007 Keyes
2007/0060185 A1 3/2007 Simon et al.
2007/0070490 A1 3/2007 Tsunoda et al.
2007/0090997 A1 4/2007 Brown et al.
2007/0093269 A1 4/2007 Leabman et al.
2007/0097653 A1 5/2007 Gilliland et al.
2007/0103110 A1 5/2007 Sagoo
2007/0106894 A1 5/2007 Zhang
2007/0109121 A1 5/2007 Cohen
2007/0139000 A1 6/2007 Kozuma
2007/0149162 A1 6/2007 Greene et al.
2007/0164868 A1 7/2007 Deavours et al.
2007/0173196 A1 7/2007 Gallic
2007/0173214 A1 7/2007 Mickle et al.
2007/0178857 A1 8/2007 Greene et al.
2007/0178945 A1 8/2007 Cook et al.
2007/0182367 A1 8/2007 Partovi
2007/0191074 A1 8/2007 Harrist et al.
2007/0191075 A1 8/2007 Greene et al.
2007/0197281 A1 8/2007 Stronach
2007/0210960 A1 9/2007 Rofougaran et al.
2007/0222681 A1 9/2007 Greene et al.
2007/0228833 A1 10/2007 Stevens et al.
2007/0229261 A1 10/2007 Zimmerman et al.
2007/0240297 A1 10/2007 Yang et al.
2007/0257634 A1 11/2007 Leschin et al.
2007/0273486 A1 11/2007 Shiotsu
2007/0291165 A1 12/2007 Wang
2007/0296639 A1 12/2007 Hook et al.
2007/0298846 A1 12/2007 Greene et al.
2008/0014897 A1 1/2008 Cook et al.
2008/0024376 A1 1/2008 Norris et al.
2008/0048917 A1 2/2008 Achour et al.
2008/0062062 A1 3/2008 Borau et al.
2008/0062255 A1 3/2008 Gal
2008/0067874 A1 3/2008 Tseng
2008/0074324 A1 3/2008 Puzella et al.
2008/0089277 A1 4/2008 Alexander et al.
2008/0110263 A1 5/2008 Klessel et al.
2008/0113816 A1 5/2008 Mahaffey et al.
2008/0122297 A1 5/2008 Arai
2008/0123383 A1 5/2008 Shionoiri
2008/0129536 A1 6/2008 Randall et al.
2008/0140278 A1 6/2008 Breed
2008/0169910 A1 7/2008 Greene et al.
2008/0197802 A1 8/2008 Onishi
2008/0204342 A1 8/2008 Kharadly
2008/0204350 A1 8/2008 Tam et al.
2008/0210762 A1 9/2008 Osada et al.
2008/0211458 A1 9/2008 Lawther et al.
2008/0233890 A1 9/2008 Baker
2008/0248758 A1 10/2008 Schedelbeck et al.
2008/0248846 A1 10/2008 Stronach et al.
2008/0258993 A1 10/2008 Gummalla et al.
2008/0266191 A1 10/2008 Hilgers
2008/0278378 A1 11/2008 Chang et al.
2008/0309452 A1 12/2008 Zeine
2009/0002493 A1 1/2009 Kates
2009/0010316 A1 1/2009 Rofougaran et al.
2009/0019183 A1 1/2009 Wu et al.
2009/0036065 A1 2/2009 Siu
2009/0039828 A1 2/2009 Jakubowski
2009/0047998 A1 2/2009 Alberth, Jr.
2009/0058354 A1 3/2009 Harrison
2009/0058361 A1 3/2009 John
2009/0058731 A1 3/2009 Geary et al.
2009/0060012 A1 3/2009 Gresset et al.
2009/0067198 A1 3/2009 Graham et al.
2009/0067208 A1 3/2009 Martin et al.
2009/0073066 A1 3/2009 Jordon et al.
2009/0096412 A1 4/2009 Huang
2009/0096413 A1 4/2009 Partovi
2009/0102292 A1 4/2009 Cook et al.
2009/0102296 A1 4/2009 Greene et al.
2009/0108679 A1 4/2009 Porwal
2009/0122847 A1 5/2009 Nysen et al.
2009/0128262 A1 5/2009 Lee et al.
2009/0157911 A1 6/2009 Aihara
2009/0174604 A1 7/2009 Keskitalo
2009/0180653 A1 7/2009 Sjursen et al.
2009/0200985 A1 8/2009 Zane et al.
2009/0206791 A1 8/2009 Jung
2009/0207090 A1 8/2009 Pettus et al.
2009/0207092 A1 8/2009 Nysen et al.
2009/0218884 A1 9/2009 Soar
2009/0218891 A1 9/2009 McCollough
2009/0219903 A1 9/2009 Alamouti et al.
2009/0243397 A1 10/2009 Cook et al.
2009/0256752 A1 10/2009 Akkermans et al.
2009/0264069 A1 10/2009 Yamasuge
2009/0271048 A1 10/2009 Wakamatsu
2009/0280866 A1 11/2009 Lo et al.
2009/0281678 A1 11/2009 Wakamatsu
2009/0284082 A1 11/2009 Mohammadian
2009/0284083 A1 11/2009 Karalis et al.
2009/0284220 A1 11/2009 Toncich et al.
2009/0284227 A1 11/2009 Mohammadian et al.
2009/0284325 A1 11/2009 Rossiter et al.
2009/0286475 A1 11/2009 Toncich et al.
2009/0286476 A1 11/2009 Toncich et al.
2009/0291634 A1 11/2009 Saarisalo
2009/0299175 A1 12/2009 Bernstein et al.
2009/0308936 A1 12/2009 Nitzan et al.
2009/0312046 A1 12/2009 Clevenger et al.
2009/0315412 A1 12/2009 Yamamoto et al.
2009/0322281 A1 12/2009 Kamijo et al.
2010/0001683 A1 1/2010 Huang et al.
2010/0007307 A1 1/2010 Baarman et al.
2010/0007569 A1 1/2010 Sim et al.
2010/0019686 A1 1/2010 Gutierrez, Jr.
2010/0019908 A1 1/2010 Cho et al.
2010/0026605 A1 2/2010 Yang et al.
2010/0027379 A1 2/2010 Saulnier et al.
2010/0029383 A1 2/2010 Dai
2010/0033021 A1 2/2010 Bennett
2010/0033390 A1 2/2010 Alamouti et al.
2010/0034238 A1 2/2010 Bennett
2010/0041453 A1 2/2010 Grimm, Jr.
2010/0044123 A1 2/2010 Perlman et al.
2010/0054200 A1 3/2010 Tsai
2010/0060534 A1 3/2010 Oodachi
2010/0066631 A1 3/2010 Puzella et al.
2010/0075607 A1 3/2010 Hosoya
2010/0079005 A1 4/2010 Hyde et al.
2010/0079011 A1 4/2010 Hyde et al.
2010/0082193 A1 4/2010 Chiappetta

(56) References Cited

U.S. PATENT DOCUMENTS

2010/0087227 A1 4/2010 Francos et al.
2010/0090524 A1 4/2010 Obayashi
2010/0090656 A1 4/2010 Shearer et al.
2010/0109443 A1 5/2010 Cook et al.
2010/0117596 A1 5/2010 Cook et al.
2010/0117926 A1 5/2010 DeJean, II
2010/0119234 A1 5/2010 Suematsu et al.
2010/0123618 A1 5/2010 Martin et al.
2010/0123624 A1 5/2010 Minear et al.
2010/0124040 A1 5/2010 Diebel et al.
2010/0127660 A1 5/2010 Cook et al.
2010/0142418 A1 6/2010 Nishioka et al.
2010/0142509 A1 6/2010 Zhu et al.
2010/0148723 A1 6/2010 Cook et al.
2010/0151808 A1 6/2010 Toncich et al.
2010/0156721 A1 6/2010 Alamouti et al.
2010/0156741 A1 6/2010 Vazquez et al.
2010/0164296 A1 7/2010 Kurs et al.
2010/0164433 A1 7/2010 Janefalker et al.
2010/0167664 A1 7/2010 Szini
2010/0171461 A1 7/2010 Baarman et al.
2010/0171676 A1 7/2010 Tani et al.
2010/0174629 A1 7/2010 Taylor et al.
2010/0176934 A1 7/2010 Chou et al.
2010/0181961 A1 7/2010 Novak et al.
2010/0181964 A1 7/2010 Huggins et al.
2010/0194206 A1 8/2010 Burdo et al.
2010/0201189 A1 8/2010 Kirby et al.
2010/0201201 A1 8/2010 Mobarhan et al.
2010/0201314 A1 8/2010 Toncich et al.
2010/0207572 A1 8/2010 Kirby et al.
2010/0210233 A1 8/2010 Cook et al.
2010/0213895 A1 8/2010 Keating et al.
2010/0214177 A1 8/2010 Parsche
2010/0222010 A1 9/2010 Ozaki et al.
2010/0225270 A1 9/2010 Jacobs et al.
2010/0227570 A1 9/2010 Hendin
2010/0231470 A1 9/2010 Lee et al.
2010/0237709 A1 9/2010 Hall et al.
2010/0244576 A1 9/2010 Hillan et al.
2010/0253281 A1 10/2010 Li
2010/0256831 A1 10/2010 Abramo et al.
2010/0259110 A1 10/2010 Kurs et al.
2010/0259447 A1 10/2010 Crouch
2010/0264747 A1 10/2010 Hall et al.
2010/0277003 A1 11/2010 Von Novak et al.
2010/0277121 A1 11/2010 Hall et al.
2010/0279606 A1 11/2010 Hillan et al.
2010/0289341 A1 11/2010 Ozaki et al.
2010/0295372 A1 11/2010 Hyde et al.
2010/0308767 A1 12/2010 Rofougaran et al.
2010/0309079 A1 12/2010 Rofougaran et al.
2010/0309088 A1 12/2010 Hyvonen et al.
2010/0315045 A1 12/2010 Zeine
2010/0316163 A1 12/2010 Forenza et al.
2010/0327766 A1 12/2010 Recker et al.
2010/0328044 A1 12/2010 Waffenschmidt et al.
2010/0332401 A1 12/2010 Prahlad et al.
2011/0013198 A1 1/2011 Shirley
2011/0018360 A1 1/2011 Baarman et al.
2011/0028114 A1 2/2011 Kerselaers
2011/0031928 A1 2/2011 Soar
2011/0032149 A1 2/2011 Leabman
2011/0032866 A1 2/2011 Leabman
2011/0034190 A1 2/2011 Leabman
2011/0034191 A1 2/2011 Leabman
2011/0043047 A1 2/2011 Karalis et al.
2011/0043163 A1 2/2011 Baarman et al.
2011/0043327 A1 2/2011 Baarman et al.
2011/0050166 A1 3/2011 Cook et al.
2011/0055037 A1 3/2011 Hayashigawa et al.
2011/0056215 A1 3/2011 Ham
2011/0057607 A1 3/2011 Carobolante
2011/0057853 A1 3/2011 Kim et al.
2011/0062788 A1 3/2011 Chen et al.
2011/0074342 A1 3/2011 MacLaughlin
2011/0074349 A1 3/2011 Ghovanloo
2011/0074620 A1 3/2011 Wintermantel
2011/0078092 A1 3/2011 Kim et al.
2011/0090126 A1 4/2011 Szini et al.
2011/0109167 A1 5/2011 Park et al.
2011/0114401 A1 5/2011 Kanno
2011/0115303 A1 5/2011 Baarman et al.
2011/0115432 A1 5/2011 El-Maleh
2011/0115605 A1 5/2011 Dimig et al.
2011/0121660 A1 5/2011 Azancot et al.
2011/0122018 A1 5/2011 Tarng et al.
2011/0122026 A1 5/2011 DeLaquil et al.
2011/0127845 A1 6/2011 Walley et al.
2011/0127952 A1 6/2011 Walley et al.
2011/0133655 A1 6/2011 Recker et al.
2011/0133691 A1 6/2011 Hautanen
2011/0148578 A1 6/2011 Aloi et al.
2011/0148595 A1 6/2011 Miller et al.
2011/0151789 A1 6/2011 Viglione et al.
2011/0154429 A1 6/2011 Stantchev
2011/0156494 A1 6/2011 Mashinsky
2011/0156640 A1 6/2011 Moshfeghi
2011/0163128 A1 7/2011 Taguchi et al.
2011/0175455 A1 7/2011 Hashiguchi
2011/0175461 A1 7/2011 Tinaphong
2011/0175812 A1 7/2011 Hsien et al.
2011/0181120 A1 7/2011 Liu et al.
2011/0182245 A1 7/2011 Malkamaki et al.
2011/0184842 A1 7/2011 Melen
2011/0188207 A1 8/2011 Won et al.
2011/0193688 A1 8/2011 Forsell
2011/0194543 A1 8/2011 Zhao et al.
2011/0195722 A1 8/2011 Walter et al.
2011/0199046 A1 8/2011 Tsai et al.
2011/0215086 A1 9/2011 Yeh
2011/0217923 A1 9/2011 Ma
2011/0220634 A1 9/2011 Yeh
2011/0221389 A1 9/2011 Won et al.
2011/0222272 A1 9/2011 Yeh
2011/0243040 A1 10/2011 Khan et al.
2011/0243050 A1 10/2011 Yanover
2011/0244913 A1 10/2011 Kim et al.
2011/0248573 A1 10/2011 Kanno et al.
2011/0248575 A1 10/2011 Kim et al.
2011/0249678 A1 10/2011 Bonicatto
2011/0254377 A1 10/2011 Widmer et al.
2011/0254503 A1 10/2011 Widmer et al.
2011/0259953 A1 10/2011 Baarman et al.
2011/0273977 A1 11/2011 Shapira et al.
2011/0278941 A1 11/2011 Krishna et al.
2011/0279226 A1 11/2011 Chen et al.
2011/0281535 A1 11/2011 Low et al.
2011/0282415 A1 11/2011 Eckhoff et al.
2011/0285213 A1 11/2011 Kowalewski
2011/0286374 A1 11/2011 Shin et al.
2011/0291489 A1 12/2011 Tsai et al.
2011/0302078 A1 12/2011 Failing
2011/0304216 A1 12/2011 Baarman
2011/0304437 A1 12/2011 Beeler
2011/0304521 A1 12/2011 Ando et al.
2012/0007441 A1 1/2012 John
2012/0013196 A1 1/2012 Kim et al.
2012/0013198 A1 1/2012 Uramoto et al.
2012/0013296 A1 1/2012 Heydari et al.
2012/0019419 A1 1/2012 Prat et al.
2012/0043887 A1 2/2012 Mesibov
2012/0051109 A1 3/2012 Kim et al.
2012/0051294 A1 3/2012 Guillouard
2012/0056486 A1 3/2012 Endo et al.
2012/0056741 A1 3/2012 Zhu et al.
2012/0068906 A1 3/2012 Asher et al.
2012/0074891 A1 3/2012 Anderson et al.
2012/0075072 A1 3/2012 Pappu
2012/0080944 A1 4/2012 Recker et al.
2012/0080957 A1 4/2012 Cooper et al.
2012/0086284 A1 4/2012 Capanella et al.
2012/0086615 A1 4/2012 Norair
2012/0095617 A1 4/2012 Martin et al.

(56) References Cited

U.S. PATENT DOCUMENTS

2012/0098350 A1 4/2012 Campanella et al.
2012/0098485 A1 4/2012 Kang et al.
2012/0099675 A1 4/2012 Kitamura et al.
2012/0103562 A1 5/2012 Clayton
2012/0104849 A1 5/2012 Jackson
2012/0105252 A1 5/2012 Wang
2012/0112532 A1 5/2012 Kesler et al.
2012/0119914 A1 5/2012 Uchida
2012/0126743 A1 5/2012 Rivers, Jr.
2012/0132647 A1 5/2012 Beverly et al.
2012/0133214 A1 5/2012 Yun et al.
2012/0142291 A1 6/2012 Rath et al.
2012/0146426 A1 6/2012 Sabo
2012/0146576 A1 6/2012 Partovi
2012/0146577 A1 6/2012 Tanabe
2012/0147802 A1 6/2012 Ukita et al.
2012/0149307 A1 6/2012 Terada et al.
2012/0150670 A1 6/2012 Taylor et al.
2012/0153894 A1 6/2012 Widmer et al.
2012/0157019 A1 6/2012 Li
2012/0161531 A1 6/2012 Kim et al.
2012/0161544 A1 6/2012 Kashiwagi et al.
2012/0169276 A1 7/2012 Wang
2012/0169278 A1 7/2012 Choi
2012/0173418 A1 7/2012 Beardsmore et al.
2012/0179004 A1 7/2012 Roesicke et al.
2012/0181973 A1 7/2012 Lyden
2012/0182427 A1 7/2012 Marshall
2012/0188142 A1 7/2012 Shashi et al.
2012/0187851 A1 8/2012 Huggins et al.
2012/0193999 A1 8/2012 Zeine
2012/0200399 A1 8/2012 Chae
2012/0201153 A1 8/2012 Bharadia et al.
2012/0201173 A1 8/2012 Jian et al.
2012/0206299 A1 8/2012 Valdes-Garcia
2012/0211214 A1 8/2012 Phan
2012/0212071 A1 8/2012 Miyabayashi et al.
2012/0212072 A1 8/2012 Miyabayashi et al.
2012/0214462 A1 8/2012 Chu et al.
2012/0214536 A1 8/2012 Kim et al.
2012/0228392 A1 9/2012 Cameron et al.
2012/0228956 A1 9/2012 Kamata
2012/0231856 A1 9/2012 Lee et al.
2012/0235636 A1 9/2012 Partovi
2012/0242283 A1 9/2012 Kim et al.
2012/0248886 A1 10/2012 Kesler et al.
2012/0248888 A1 10/2012 Kesler et al.
2012/0248891 A1 10/2012 Drennen
2012/0249051 A1 10/2012 Son et al.
2012/0262002 A1 10/2012 Widmer et al.
2012/0265272 A1 10/2012 Judkins
2012/0267900 A1 10/2012 Huffman et al.
2012/0268238 A1 10/2012 Park et al.
2012/0274154 A1 11/2012 DeLuca
2012/0280650 A1 11/2012 Kim et al.
2012/0286582 A1 11/2012 Kim et al.
2012/0292993 A1 11/2012 Mettler et al.
2012/0293021 A1 11/2012 Teggatz et al.
2012/0293119 A1 11/2012 Park et al.
2012/0299389 A1 11/2012 Lee et al.
2012/0299540 A1 11/2012 Perry
2012/0299541 A1 11/2012 Perry
2012/0299542 A1 11/2012 Perry
2012/0300588 A1 11/2012 Perry
2012/0300592 A1 11/2012 Perry
2012/0300593 A1 11/2012 Perry
2012/0306433 A1 12/2012 Kim et al.
2012/0306705 A1 12/2012 Sakurai et al.
2012/0306707 A1 12/2012 Yang et al.
2012/0306720 A1 12/2012 Tanmi et al.
2012/0307873 A1 12/2012 Kim et al.
2012/0309295 A1 12/2012 Maguire
2012/0309308 A1 12/2012 Kim et al.
2012/0309332 A1 12/2012 Liao
2012/0313446 A1 12/2012 Park et al.
2012/0313449 A1 12/2012 Kurs
2012/0313835 A1 12/2012 Gebretnsae
2012/0326660 A1 12/2012 Lu et al.
2013/0002550 A1 1/2013 Zalewski
2013/0018439 A1 1/2013 Chow et al.
2013/0024059 A1 1/2013 Miller et al.
2013/0026981 A1 1/2013 Van Der Lee
2013/0026982 A1 1/2013 Rothenbaum
2013/0032589 A1 2/2013 Chung
2013/0033571 A1 2/2013 Steen
2013/0038124 A1 2/2013 Newdoll et al.
2013/0038402 A1 2/2013 Karalis et al.
2013/0043738 A1 2/2013 Park et al.
2013/0044035 A1 2/2013 Zhuang
2013/0049471 A1 2/2013 Oleynik
2013/0049475 A1 2/2013 Kim et al.
2013/0049484 A1 2/2013 Weissentern et al.
2013/0057078 A1 3/2013 Lee
2013/0057205 A1 3/2013 Lee et al.
2013/0057210 A1 3/2013 Negaard et al.
2013/0057364 A1 3/2013 Kesler et al.
2013/0058379 A1 3/2013 Kim et al.
2013/0062959 A1 3/2013 Lee et al.
2013/0063082 A1 3/2013 Lee et al.
2013/0063143 A1 3/2013 Adalsteinsson et al.
2013/0063266 A1 3/2013 Yunker et al.
2013/0069444 A1 3/2013 Waffenschmidt et al.
2013/0076308 A1 3/2013 Niskala et al.
2013/0077650 A1 3/2013 Traxler et al.
2013/0078918 A1 3/2013 Crowley et al.
2013/0082651 A1 4/2013 Park et al.
2013/0082653 A1 4/2013 Lee et al.
2013/0083774 A1 4/2013 Son et al.
2013/0088082 A1 4/2013 Kang et al.
2013/0088090 A1 4/2013 Wu
2013/0088192 A1 4/2013 Eaton
2013/0088331 A1 4/2013 Cho
2013/0093388 A1 4/2013 Partovi
2013/0099389 A1 4/2013 Hong et al.
2013/0099586 A1 4/2013 Kato
2013/0106197 A1 5/2013 Bae et al.
2013/0107023 A1 5/2013 Tanaka et al.
2013/0119777 A1 5/2013 Rees
2013/0119778 A1 5/2013 Jung
2013/0119929 A1 5/2013 Partovi
2013/0120052 A1 5/2013 Siska
2013/0120205 A1 5/2013 Thomson et al.
2013/0120206 A1 5/2013 Biancotto et al.
2013/0120217 A1 5/2013 Ueda et al.
2013/0130621 A1 5/2013 Kim et al.
2013/0132010 A1 5/2013 Winger et al.
2013/0134923 A1 5/2013 Smith
2013/0137455 A1 5/2013 Xia
2013/0141037 A1 6/2013 Jenwatanavet et al.
2013/0148341 A1 6/2013 Williams
2013/0149975 A1 6/2013 Yu et al.
2013/0154387 A1 6/2013 Lee et al.
2013/0155748 A1 6/2013 Sundstrom
2013/0157729 A1 6/2013 Tabe
2013/0162335 A1 6/2013 Kim et al.
2013/0169061 A1 7/2013 Microshnichenko et al.
2013/0169219 A1 7/2013 Gray
2013/0169348 A1 7/2013 Shi
2013/0171939 A1 7/2013 Tian et al.
2013/0175877 A1 7/2013 Abe et al.
2013/0178253 A1 7/2013 Karaoguz
2013/0181881 A1 7/2013 Christie et al.
2013/0187475 A1 7/2013 Vendik
2013/0190031 A1 7/2013 Persson et al.
2013/0193769 A1 8/2013 Mehta et al.
2013/0197320 A1 8/2013 Albert et al.
2013/0200064 A1 8/2013 Alexander
2013/0207477 A1 8/2013 Nam et al.
2013/0207604 A1 8/2013 Zeine
2013/0207879 A1 8/2013 Rada et al.
2013/0210357 A1 8/2013 Qin et al.
2013/0221757 A1 8/2013 Cho et al.
2013/0222201 A1 8/2013 Ma et al.
2013/0234530 A1 9/2013 Miyauchi

(56) References Cited

U.S. PATENT DOCUMENTS

2013/0234536 A1 9/2013 Chemishkian et al.
2013/0234658 A1 9/2013 Endo et al.
2013/0241306 A1 9/2013 Aber et al.
2013/0241468 A1 9/2013 Moshfeghi
2013/0241474 A1 9/2013 Moshfeghi
2013/0249478 A1 9/2013 Hirano
2013/0249479 A1 9/2013 Partovi
2013/0250102 A1 9/2013 Scanlon et al.
2013/0254578 A1 9/2013 Huang et al.
2013/0264997 A1 10/2013 Lee et al.
2013/0268782 A1 10/2013 Tam et al.
2013/0270923 A1 10/2013 Cook et al.
2013/0278076 A1 10/2013 Proud
2013/0278209 A1 10/2013 Von Novak et al.
2013/0285464 A1 10/2013 Miwa
2013/0285477 A1 10/2013 Lo et al.
2013/0285606 A1 10/2013 Ben-Shalom et al.
2013/0288600 A1 10/2013 Kuusilinna et al.
2013/0288617 A1 10/2013 Kim et al.
2013/0293423 A1 11/2013 Moshfeghi
2013/0307751 A1 11/2013 Yu-Juin et al.
2013/0310020 A1 11/2013 Kazuhiro
2013/0311798 A1 11/2013 Sultenfuss
2013/0328417 A1 12/2013 Takeuchi
2013/0334883 A1 12/2013 Kim et al.
2013/0339108 A1 12/2013 Ryder et al.
2013/0343208 A1 12/2013 Sexton et al.
2013/0343251 A1 12/2013 Zhang
2014/0001846 A1 1/2014 Mosebrook
2014/0001875 A1 1/2014 Nahidipour
2014/0001876 A1 1/2014 Fujiwara et al.
2014/0006017 A1 1/2014 Sen
2014/0008993 A1 1/2014 Leabman
2014/0009110 A1 1/2014 Lee
2014/0011531 A1 1/2014 Burstrom et al.
2014/0015336 A1 1/2014 Weber et al.
2014/0015344 A1 1/2014 Mohamadi
2014/0021907 A1 1/2014 Yu et al.
2014/0021908 A1 1/2014 McCool
2014/0035524 A1 2/2014 Zeine
2014/0035526 A1 2/2014 Tripathi et al.
2014/0035786 A1 2/2014 Ley
2014/0043248 A1 2/2014 Yeh
2014/0049422 A1 2/2014 Von Novak et al.
2014/0054971 A1 2/2014 Kissin
2014/0055098 A1 2/2014 Lee et al.
2014/0057618 A1 2/2014 Zirwas et al.
2014/0062395 A1 3/2014 Kwon et al.
2014/0082435 A1 3/2014 Kitgawa
2014/0086125 A1 3/2014 Polo et al.
2014/0086592 A1 3/2014 Nakahara et al.
2014/0091756 A1 4/2014 Ofstein et al.
2014/0091968 A1 4/2014 Harel et al.
2014/0091974 A1 4/2014 Desclos et al.
2014/0103869 A1 4/2014 Radovic
2014/0104157 A1 4/2014 Burns
2014/0111147 A1 4/2014 Soar
2014/0113689 A1 4/2014 Lee
2014/0117946 A1 5/2014 Muller et al.
2014/0118140 A1 5/2014 Amis
2014/0128107 A1 5/2014 An
2014/0132210 A1 5/2014 Partovi
2014/0133279 A1 5/2014 Khuri-Yakub
2014/0139034 A1 5/2014 Sankar et al.
2014/0139039 A1 5/2014 Cook et al.
2014/0139180 A1 5/2014 Kim et al.
2014/0141838 A1 5/2014 Cai et al.
2014/0142876 A1 5/2014 John et al.
2014/0143933 A1 5/2014 Low et al.
2014/0145879 A1 5/2014 Pan
2014/0145884 A1 5/2014 Dang et al.
2014/0152117 A1 6/2014 Sanker
2014/0159651 A1 6/2014 Von Novak et al.
2014/0159652 A1 6/2014 Hall et al.
2014/0159662 A1 6/2014 Furui
2014/0159667 A1 6/2014 Kim et al.
2014/0169385 A1 6/2014 Hadani et al.
2014/0175893 A1 6/2014 Sengupta et al.
2014/0176054 A1 6/2014 Porat et al.
2014/0176061 A1 6/2014 Cheatham, III et al.
2014/0176082 A1 6/2014 Visser
2014/0177399 A1 6/2014 Teng et al.
2014/0183964 A1 7/2014 Walley
2014/0184148 A1 7/2014 Van Der Lee et al.
2014/0184155 A1 7/2014 Cha
2014/0184163 A1 7/2014 Das et al.
2014/0184170 A1 7/2014 Jeong
2014/0191568 A1 7/2014 Partovi
2014/0191818 A1 7/2014 Waffenschmidt et al.
2014/0194092 A1 7/2014 Wanstedt et al.
2014/0194095 A1 7/2014 Wanstedt et al.
2014/0197691 A1 7/2014 Wang
2014/0203629 A1 7/2014 Hoffman et al.
2014/0206384 A1 7/2014 Kim et al.
2014/0210281 A1 7/2014 Ito et al.
2014/0217955 A1 8/2014 Lin
2014/0217967 A1 8/2014 Zeine et al.
2014/0225805 A1 8/2014 Pan et al.
2014/0232320 A1 8/2014 Ento July et al.
2014/0232610 A1 8/2014 Shigemoto et al.
2014/0239733 A1 8/2014 Mach et al.
2014/0241231 A1 8/2014 Zeine
2014/0245036 A1 8/2014 Oishi
2014/0246416 A1 9/2014 White
2014/0247152 A1 9/2014 Proud
2014/0252813 A1 9/2014 Lee et al.
2014/0252866 A1 9/2014 Walsh et al.
2014/0265725 A1 9/2014 Angle et al.
2014/0265727 A1 9/2014 Berte
2014/0265943 A1 9/2014 Angle et al.
2014/0266025 A1 9/2014 Jakubowski
2014/0266946 A1 9/2014 Bily et al.
2014/0273819 A1 9/2014 Nadakuduti et al.
2014/0273892 A1 9/2014 Nourbakhsh
2014/0281655 A1 9/2014 Angle et al.
2014/0292090 A1 10/2014 Cordeiro et al.
2014/0292451 A1 10/2014 Zimmerman
2014/0300452 A1 10/2014 Rofe et al.
2014/0312706 A1 10/2014 Fiorello et al.
2014/0325218 A1 10/2014 Shimizu et al.
2014/0327320 A1 11/2014 Muhs et al.
2014/0327390 A1 11/2014 Park et al.
2014/0333142 A1 11/2014 Desrosiers
2014/0346860 A1 11/2014 Aubry et al.
2014/0354063 A1 12/2014 Leabman et al.
2014/0354221 A1 12/2014 Leabman et al.
2014/0355718 A1 12/2014 Guan et al.
2014/0368048 A1 12/2014 Leabman et al.
2014/0368161 A1 12/2014 Leabman et al.
2014/0368405 A1 12/2014 Ek et al.
2014/0375139 A1 12/2014 Tsukamoto
2014/0375253 A1 12/2014 Leabman et al.
2014/0375258 A1 12/2014 Arkhipenkov
2014/0375261 A1 12/2014 Manova-Elssibony et al.
2015/0001949 A1 1/2015 Leabman et al.
2015/0002086 A1 1/2015 Matos et al.
2015/0003207 A1 1/2015 Lee et al.
2015/0008980 A1 1/2015 Kim et al.
2015/0011160 A1 1/2015 Uurgovan et al.
2015/0015180 A1 1/2015 Miller et al.
2015/0015182 A1 1/2015 Brandtman et al.
2015/0015192 A1 1/2015 Leabman et al.
2015/0021990 A1 1/2015 Myer et al.
2015/0022008 A1 1/2015 Leabman et al.
2015/0022010 A1 1/2015 Leabman et al.
2015/0022194 A1 1/2015 Almalki et al.
2015/0023204 A1 1/2015 Wil et al.
2015/0028688 A1 1/2015 Masaoka
2015/0028694 A1 1/2015 Leabman et al.
2015/0028697 A1 1/2015 Leabman et al.
2015/0028875 A1 1/2015 Irie et al.
2015/0035378 A1 2/2015 Calhoun et al.
2015/0035715 A1 2/2015 Kim et al.
2015/0039482 A1 2/2015 Fuinaga

(56) References Cited

U.S. PATENT DOCUMENTS

2015/0041459 A1 2/2015 Leabman et al.
2015/0042265 A1 2/2015 Leabman et al.
2015/0044977 A1 2/2015 Ramasamy et al.
2015/0046526 A1 2/2015 Bush et al.
2015/0061404 A1 3/2015 Lamenza et al.
2015/0076917 A1 3/2015 Leabman et al.
2015/0076927 A1 3/2015 Leabman et al.
2015/0077036 A1 3/2015 Leabman et al.
2015/0077037 A1 3/2015 Leabman et al.
2015/0091520 A1 4/2015 Blum et al.
2015/0091706 A1 4/2015 Chemishkian et al.
2015/0097442 A1 4/2015 Muurinen
2015/0097663 A1 4/2015 Sloo et al.
2015/0102764 A1 4/2015 Leabman et al.
2015/0102769 A1 4/2015 Leabman et al.
2015/0102942 A1 4/2015 Houser et al.
2015/0102973 A1 4/2015 Hand et al.
2015/0108848 A1 4/2015 Joehren
2015/0109181 A1 4/2015 Hyde et al.
2015/0115877 A1 4/2015 Aria et al.
2015/0115878 A1 4/2015 Park
2015/0116153 A1 4/2015 Chen et al.
2015/0128733 A1 5/2015 Taylor et al.
2015/0130285 A1 5/2015 Leabman et al.
2015/0130293 A1 5/2015 Hajimiri et al.
2015/0137612 A1 5/2015 Yamakawa et al.
2015/0148664 A1 5/2015 Stolka et al.
2015/0155737 A1 6/2015 Mayo
2015/0155738 A1 6/2015 Leabman et al.
2015/0162662 A1 6/2015 Chen et al.
2015/0162751 A1 6/2015 Leabman et al.
2015/0162779 A1 6/2015 Lee et al.
2015/0171512 A1 6/2015 Chen et al.
2015/0171513 A1 6/2015 Chen et al.
2015/0171656 A1 6/2015 Leabman et al.
2015/0171658 A1 6/2015 Manova-Elssibony et al.
2015/0171931 A1 6/2015 Won et al.
2015/0177326 A1 6/2015 Chakraborty et al.
2015/0180133 A1 6/2015 Hunt
2015/0180249 A1 6/2015 Jeon et al.
2015/0181117 A1 6/2015 Park et al.
2015/0187491 A1 7/2015 Yanagawa
2015/0188352 A1 7/2015 Peek et al.
2015/0199665 A1 7/2015 Chu
2015/0201385 A1 7/2015 Mercer et al.
2015/0207333 A1 7/2015 Baarman et al.
2015/0207542 A1 7/2015 Zeine
2015/0222126 A1 8/2015 Leabman et al.
2015/0233987 A1 8/2015 Von Novak, III et al.
2015/0234144 A1 8/2015 Cameron et al.
2015/0236520 A1 8/2015 Baarman
2015/0244070 A1 8/2015 Cheng et al.
2015/0244080 A1 8/2015 Gregoire
2015/0244187 A1 8/2015 Horie
2015/0244201 A1 8/2015 Chu
2015/0244341 A1 8/2015 Ritter et al.
2015/0249484 A1 9/2015 Mach et al.
2015/0255989 A1 9/2015 Walley et al.
2015/0256097 A1 9/2015 Gudan et al.
2015/0260835 A1 9/2015 Widmer et al.
2015/0262465 A1 9/2015 Pritchett
2015/0263534 A1 9/2015 Lee et al.
2015/0263548 A1 9/2015 Cooper
2015/0270618 A1 9/2015 Zhu et al.
2015/0270622 A1 9/2015 Takasaki et al.
2015/0270741 A1 9/2015 Leabman et al.
2015/0278558 A1 10/2015 Priev et al.
2015/0280484 A1 10/2015 Radziemski et al.
2015/0288074 A1 10/2015 Harper et al.
2015/0288438 A1 10/2015 Maltsev et al.
2015/0311585 A1 10/2015 Church et al.
2015/0312721 A1 10/2015 Singh
2015/0318729 A1 11/2015 Leabman
2015/0326024 A1 11/2015 Bell et al.
2015/0326070 A1 11/2015 Petras et al.
2015/0326072 A1 11/2015 Petras et al.
2015/0326143 A1 11/2015 Petras et al.
2015/0327085 A1 11/2015 Hadani
2015/0333528 A1 11/2015 Leabman
2015/0333573 A1 11/2015 Leabman
2015/0333800 A1 11/2015 Perry et al.
2015/0339497 A1 11/2015 Kurian
2015/0340759 A1 11/2015 Bridgelall et al.
2015/0340903 A1 11/2015 Bell et al.
2015/0341087 A1 11/2015 Moore et al.
2015/0358222 A1 12/2015 Berger et al.
2015/0365137 A1 12/2015 Miller et al.
2015/0365138 A1 12/2015 Miller et al.
2016/0005068 A1 1/2016 Im et al.
2016/0012695 A1 1/2016 Bell et al.
2016/0013560 A1 1/2016 Daniels
2016/0013677 A1 1/2016 Bell et al.
2016/0013855 A1 1/2016 Campos
2016/0020636 A1 1/2016 Khlat
2016/0028403 A1 1/2016 McCaughan et al.
2016/0042206 A1 2/2016 Pesavento et al.
2016/0054440 A1 2/2016 Younis
2016/0056635 A1 2/2016 Bell
2016/0056640 A1 2/2016 Mao
2016/0065005 A1 3/2016 Won et al.
2016/0079799 A1 3/2016 Khlat
2016/0087348 A1* 3/2016 Ko ...................... H01Q 21/205 455/73
2016/0087483 A1 3/2016 Hietala et al.
2016/0087486 A1 3/2016 Pogorelik et al.
2016/0094091 A1 3/2016 Shin et al.
2016/0094092 A1 3/2016 Davlantes et al.
2016/0099601 A1 4/2016 Leabman et al.
2016/0099614 A1 4/2016 Leabman et al.
2016/0099755 A1 4/2016 Leabman et al.
2016/0099757 A1 4/2016 Leabman et al.
2016/0112787 A1 4/2016 Rich
2016/0126749 A1 5/2016 Shichino et al.
2016/0126752 A1 5/2016 Vuori et al.
2016/0126776 A1 5/2016 Kim et al.
2016/0141908 A1 5/2016 Jakl et al.
2016/0164563 A1 6/2016 Khawand et al.
2016/0181849 A1 6/2016 Govindaraj
2016/0181867 A1 6/2016 Daniel et al.
2016/0181873 A1 6/2016 Mitcheson et al.
2016/0197522 A1 7/2016 Zeine et al.
2016/0202343 A1 7/2016 Okutsu
2016/0204642 A1 7/2016 Oh
2016/0233582 A1 8/2016 Piskun
2016/0238365 A1 8/2016 Wixey et al.
2016/0240908 A1 8/2016 Strong
2016/0248276 A1 8/2016 Hong et al.
2016/0294225 A1 10/2016 Blum et al.
2016/0299210 A1 10/2016 Zeine
2016/0301240 A1 10/2016 Zeine
2016/0322868 A1 11/2016 Akuzawa et al.
2016/0323000 A1 11/2016 Liu et al.
2016/0336804 A1 11/2016 Son et al.
2016/0339258 A1 11/2016 Perryman et al.
2016/0344098 A1 11/2016 Ming
2016/0359367 A1 12/2016 Rothschild
2016/0380464 A1 12/2016 Chin et al.
2016/0380466 A1 12/2016 Yang et al.
2017/0005481 A1 1/2017 Von Novak, III
2017/0005516 A9 1/2017 Leabman et al.
2017/0005524 A1 1/2017 Akuzawa et al.
2017/0005530 A1 1/2017 Zeine et al.
2017/0012448 A1 1/2017 Miller et al.
2017/0025887 A1 1/2017 Hyun et al.
2017/0025903 A1 1/2017 Song et al.
2017/0026087 A1 1/2017 Tanabe
2017/0040700 A1 2/2017 Leung
2017/0043675 A1 2/2017 Jones et al.
2017/0047784 A1 2/2017 Jung et al.
2017/0063168 A1 3/2017 Uchida
2017/0077733 A1 3/2017 Jeong et al.
2017/0077765 A1 3/2017 Bell et al.
2017/0085437 A1 3/2017 Condeixa et al.
2017/0092115 A1 3/2017 Sloo et al.

(56) References Cited

U.S. PATENT DOCUMENTS

| | | | |
|---|---|---|---|
| 2017/0110886 A1 | 4/2017 | Reynolds et al. | |
| 2017/0127196 A1 | 5/2017 | Blum et al. | |
| 2017/0134686 A9 | 5/2017 | Leabman | |
| 2017/0141582 A1 | 5/2017 | Adolf et al. | |
| 2017/0141583 A1 | 5/2017 | Adolf et al. | |
| 2017/0163076 A1 | 6/2017 | Park et al. | |
| 2017/0168595 A1 | 6/2017 | Sakaguchi et al. | |
| 2017/0179763 A9 | 6/2017 | Leabman | |
| 2017/0214422 A1 | 7/2017 | Na et al. | |
| 2017/0338695 A1 | 11/2017 | Port | |
| 2018/0040929 A1 | 2/2018 | Chappelle | |
| 2018/0048178 A1 | 2/2018 | Leabman | |
| 2018/0090992 A1 | 3/2018 | Shrivastava et al. | |
| 2018/0159208 A1* | 6/2018 | Ameri | H01Q 9/0414 |
| 2018/0309314 A1 | 10/2018 | White et al. | |
| 2018/0351631 A1* | 12/2018 | Hamabe | G01R 29/0892 |
| 2020/0153117 A1 | 5/2020 | Papio-Toda et al. | |

FOREIGN PATENT DOCUMENTS

| | | | |
|---|---|---|---|
| CN | 102860037 | A | 1/2013 |
| CN | 103348563 | A | 10/2013 |
| CN | 203826555 | U | 9/2014 |
| CN | 104090265 | A | 10/2014 |
| CN | 106329116 | A | 1/2017 |
| CN | 103380561 | B | 9/2017 |
| DE | 20016655 | U1 | 2/2002 |
| DE | 102013216953 | A1 | 2/2015 |
| EP | 1028482 | A2 | 8/2000 |
| EP | 1081506 | A1 | 3/2001 |
| EP | 2346136 | A1 | 7/2011 |
| EP | 2397973 | A1 | 2/2012 |
| EP | 2545635 | A2 | 1/2013 |
| EP | 2747195 | A1 | 6/2014 |
| EP | 3067983 | A1 | 9/2016 |
| EP | 3118970 | A1 | 1/2017 |
| EP | 3145052 | A1 | 3/2017 |
| GB | 2404497 | A | 2/2005 |
| GB | 2556620 | A | 6/2018 |
| JP | 2002319816 | A | 10/2002 |
| JP | 2006157586 | A | 6/2006 |
| JP | 2007043432 | A | 2/2007 |
| JP | 2008167017 | A | 7/2008 |
| JP | 2013162624 | A | 8/2013 |
| JP | 2015128349 | A | 7/2015 |
| JP | WO2015177859 | A1 | 4/2017 |
| KR | 20060061776 | A | 6/2006 |
| KR | 20070044302 | A | 4/2007 |
| KR | 100755144 | B1 | 9/2007 |
| KR | 20110132059 | A | 12/2011 |
| KR | 20110135540 | A1 | 12/2011 |
| KR | 20120009843 | A | 2/2012 |
| KR | 20120108759 | A | 10/2012 |
| KR | 20130026977 | A | 3/2013 |
| KR | 20140023409 | A | 2/2014 |
| KR | 20140023410 | A | 3/2014 |
| KR | 20140085200 | A | 7/2014 |
| KR | 20150077678 | A | 7/2015 |
| WO | WO 199508125 | A1 | 3/1995 |
| WO | WO 199831070 | A1 | 7/1998 |
| WO | WO 199952173 | A1 | 10/1999 |
| WO | WO 2000111716 | A1 | 2/2001 |
| WO | WO 2003091943 | A1 | 11/2003 |
| WO | WO 2004077550 | A1 | 9/2004 |
| WO | WO 2006122783 | A2 | 11/2006 |
| WO | WO 2007070571 | A2 | 6/2007 |
| WO | WO 2008024993 | A2 | 2/2008 |
| WO | WO 2008156571 | A2 | 12/2008 |
| WO | WO 2010022181 | A1 | 2/2010 |
| WO | WO 2010039246 | A1 | 4/2010 |
| WO | WO 2010138994 | A1 | 12/2010 |
| WO | WO 2011112022 | A2 | 9/2011 |
| WO | WO 2012177283 | A1 | 12/2012 |
| WO | WO 2013031988 | A1 | 3/2013 |
| WO | WO 2013035190 | A1 | 3/2013 |
| WO | WO 2013038074 | A2 | 3/2013 |
| WO | WO 2013042399 | A1 | 3/2013 |
| WO | WO 2013052950 | A1 | 4/2013 |
| WO | WO 2013105920 | A2 | 7/2013 |
| WO | WO 2014075103 | A1 | 5/2014 |
| WO | WO 2014132258 | A1 | 9/2014 |
| WO | WO 2014134996 | A1 | 9/2014 |
| WO | WO 2014182788 | A2 | 11/2014 |
| WO | WO 2014182788 | A3 | 11/2014 |
| WO | WO 2014197472 | A1 | 12/2014 |
| WO | WO 2014209587 | A1 | 12/2014 |
| WO | WO 2015038773 | A1 | 3/2015 |
| WO | WO 2015097809 | A1 | 7/2015 |
| WO | WO 2015161323 | A1 | 10/2015 |
| WO | WO 2016024869 | A1 | 2/2016 |
| WO | WO 2016048512 | A1 | 3/2016 |
| WO | WO 2016187357 | A1 | 11/2016 |

OTHER PUBLICATIONS

Energous Corp., IPRP, PCT/US2014/037109, Apr. 12, 2016, 9 pgs.
Energous Corp., IPRP, PCT/US2014/037170, Nov. 10, 2015, 8 pgs.
Energous Corp., IPRP, PCT/US2014/040648, Dec. 8, 2015, 8 pgs.
Energous Corp., IPRP, PCT/US2014/040697, Dec. 8, 2015, 9 pgs.
Energous Corp., IPRP, PCT/US2014/040705, Dec. 8, 2015, 6 pgs.
Energous Corp., IPRP, PCT/US2014/041323, Dec. 22, 2015, 8 pgs.
Energous Corp., IPRP, PCT/US2014/041342, Dec. 15, 2015, 8 pgs.
Energous Corp., IPRP, PCT/US2014/041534, Dec. 29, 2015, 7 pgs.
Energous Corp., IPRP, PCT/US2014/041546, Dec. 29, 2015, 9 pgs.
Energous Corp., IPRP, PCT/US2014/041558, Dec. 29, 2015, 6 pgs.
Energous Corp., IPRP, PCT/US2014/044810, Jan. 5, 2016, 10 pgs.
Energous Corp., IPRP, PCT/US2014/045102, Jan. 12, 2016, 11 pgs.
Energous Corp., IPRP, PCT/US2014/045119, Jan. 12, 2016, 9 pgs.
Energous Corp., IPRP, PCT/US2014/045237, Jan. 12, 2016, 12 pgs.
Energous Corp., IPRP, PCT/US2014/046941, Jan. 19, 2016, 9 pgs.
Energous Corp., IPRP, PCT/US2014/046956, Jan. 19, 2016, 7 pgs.
Energous Corp., IPRP, PCT/US2014/046961, Jan. 19, 2016, 8 pgs.
Energous Corp., IPRP, PCT/US2014/047963, Jan. 26, 2016, 10 pgs.
Energous Corp., IPRP, PCT/US2014/048002, Feb. 12, 2015 8 pgs.
Energous Corp., IPRP, PCT/US2014/049666, Feb. 9, 2016, 5 pgs.
Energous Corp., IPRP, PCT/US2014/049669, Feb. 9, 2016, 8 pgs.
Energous Corp., IPRP, PCT/US2014/049673, Feb. 9, 2016, 6 pgs.
Energous Corp., IPRP, PCT/US2014/054891, Mar. 15, 2016, 10 pgs.
Energous Corp., IPRP, PCT/US2014/054897, Mar. 15, 2016, 8 pgs.
Energous Corp., IPRP, PCT/US2014/054953, Mar. 22, 2016, 5 pgs.
Energous Corp., IPRP, PCT/US2014/055195, Mar. 22, 2016, 9 pgs.
Energous Corp., IPRP, PCT/US2014/059317, Apr. 12, 2016, 10 pgs.
Energous Corp., IPRP, PCT/US2014/059340, Apr. 12, 2016, 11 pgs.
Energous Corp., IPRP, PCT/US2014/059871, Apr. 12, 2016, 9 pgs.
Energous Corp., IPRP, PCT/US2014/062661, May 3, 2016, 10 pgs.
Energous Corp., IPRP, PCT/US2014/062672, May 10, 2016, 8 pgs.
Energous Corp., IPRP, PCT/US2014/062682, May 3, 2016, 8 pgs.
Energous Corp., IPRP, PCT/US2014/068282, Jun. 7, 2016, 10 pgs.
Energous Corp., IPRP, PCT/US2014/068568, Jun. 14, 2016, 8 pgs.
Energous Corp., IPRP, PCT/US2014/068586, Jun. 14, 2016, 8 pgs.
Energous Corp., IPRP, PCT/US2015/067242, Jun. 27, 2017, 7 pgs.
Energous Corp., IPRP, PCT/US2015/067243, Jun. 27, 2017, 7 pgs.
Energous Corp., IPRP, PCT/US2015/067245, Jun. 27, 2017, 7 pgs.
Energous Corp., IPRP, PCT/US2015/067246, Jun. 27, 2017, 9 pgs.
Energous Corp., IPRP, PCT/US2015/067249, Jun. 27, 2017, 7 pgs.
Energous Corp., IPRP, PCT/US2015/067250, Mar. 30, 2016, 10 pgs.
Energous Corp., IPRP, PCT/US2015/067271, Jul. 4, 2017, 5 pgs.
Energous Corp., IPRP, PCT/US2015/067275, Jul. 4, 2017, 7 pgs.
Energous Corp., IPRP, PCT/US2015/067279, Jul. 4, 2017, 7 pgs.
Energous Corp., IPRP, PCT/US2015/067282, Jul. 4, 2017, 6 pgs.
Energous Corp., IPRP, PCT/US2015/067287, Jul. 4, 2017, 6 pgs.
Energous Corp., IPRP, PCT/US2015/067291, Jul. 4, 2017, 4 pgs.
Energous Corp., IPRP, PCT/US2015/067294, Jul. 4, 2017, 6 pgs.
Energous Corp., IPRP, PCT/US2015/067325, Jul. 4, 2017, 8 pgs.
Energous Corp., IPRP, PCT/US2015/067334, Jul. 4, 2017, 5 pgs.
Energous Corp., IPRP, PCT/US2016/068495, Jun. 26, 2018, 7 pgs.
Energous Corp., IPRP, PCT/US2016/068498, Jun. 26, 2018, 6 pgs.

(56) References Cited

OTHER PUBLICATIONS

Energous Corp., IPRP, PCT/US2016/068504, Jun. 26, 2018, 5 pgs.
Energous Corp., IPRP, PCT/US2016/068551, Jun. 26, 2018, 6 pgs.
Energous Corp., IPRP, PCT/US2016/068565, Jun. 26, 2018, 9 pgs.
Energous Corp., IPRP, PCT/US2016/068987, Jul. 3, 2018, 7 pgs.
Energous Corp., IPRP, PCT/US2016/068993, Jul. 3, 2018, 10 pgs.
Energous Corp., IPRP, PCT/US2016/069313, Jul. 3, 2018, 7 pgs.
Energous Corp., IPRP, PCT/US2016/069316, Jul. 3, 2018, 12 pgs.
Energous Corp., IPRP, PCT/US2017/046800, Feb. 12, 2019, 10 pgs.
Energous Corp., IPRP, PCT/US2017/065886, Jun. 18, 2019, 10 pgs.
Energous Corp., IPRP, PCT/US2018/012806, Jul. 9, 2019, 6 pgs.
Energous Corp., IPRP, PCT/US2018/025465, Oct. 1, 2019, 8 pgs.
Energous Corp., IPRP, PCT/US2018/031768, Nov. 12, 2019, 8 pgs.
Energous Corp., IPRP, PCT/US2019/061445, May 18, 2021, 14 pgs.
Energous Corp., ISRWO, PCT/US2014/037072, Sep. 12, 2014, 8 pgs.
Energous Corp., ISRWO, PCT/US2014/037109, Apr. 8, 2016, 12 pgs.
Energous Corp., ISRWO, PCT/US2014/037170, Sep. 15, 2014, 11 pgs.
Energous Corp., ISRWO, PCT/US2014/040648, Oct. 10, 2014, 11 pgs.
Energous Corp., ISRWO, PCT/US2014/040697, Oct. 1, 2014, 12 pgs.
Energous Corp., ISRWO, PCT/US2014/040705, Sep. 23, 2014, 8 pgs.
Energous Corp., ISRWO, PCT/US2014/041323, Oct. 1, 2014, 10 pgs.
Energous Corp., ISRWO, PCT/US2014/041342, Jan. 27, 2015, 10 pgs.
Energous Corp., ISRWO, PCT/US2014/041534, Oct. 13, 2014, 10 pgs.
Energous Corp., ISRWO, PCT/US2014/041546, Oct. 16, 2014, 12 pgs.
Energous Corp., ISRWO, PCT/US2014/041558, Oct. 10, 2014, 8 pgs.
Energous Corp., ISRWO, PCT/US2014/044810 Oct. 21, 2014, 12 pgs.
Energous Corp., ISRWO, PCT/US2014/045102, Oct. 28, 2014, 14 pgs.
Energous Corp., ISRWO, PCT/US2014/045119, Oct. 13, 2014, 11 pgs.
Energous Corp., ISRWO, PCT/US2014/045237, Oct. 13, 2014, 16 pgs.
Energous Corp., ISRWO, PCT/US2014/046941, Nov. 6, 2014, 11 pgs.
Energous Corp., ISRWO, PCT/US2014/046956, Nov. 12, 2014, 10 pgs.
Energous Corp., ISRWO, PCT/US2014/046961, Nov. 24, 2014, 16 pgs.
Energous Corp., ISRWO, PCT/US2014/047963, Nov. 7, 2014, 13 pgs.
Energous Corp., ISRWO, PCT/US2014/048002, Nov. 13, 2014, 11 pgs.
Energous Corp., ISRWO, PCT/US2014/049666, Nov. 10, 2014, 7 pgs.
Energous Corp., ISRWO, PCT/US2014/049669, Nov. 13, 2014, 10 pgs.
Energous Corp., ISRWO, PCT/US2014/049673, Nov. 18, 2014, 10 pgs.
Energous Corp., ISRWO, PCT/US2014/054891, Dec. 18, 2014, 12 pgs.
Energous Corp., ISRWO, PCT/US2014/054897, Feb. 17, 2015, 10 pgs.
Energous Corp., ISRWO, PCT/US2014/054953, Dec. 4, 2014, 7 pgs.
Energous Corp., ISRWO, PCT/US2014/055195, Dec. 22, 2014, 11 pgs.
Energous Corp., ISRWO, PCT/US2014/059317, Feb. 24, 2015, 13 pgs.
Energous Corp., ISRWO, PCT/US2014/059340, Jan. 15, 2015, 13 pgs.
Energous Corp., ISRWO, PCT/US2014/059871, Jan. 23, 2015, 12 pgs.
Energous Corp., ISRWO, PCT/US2014/062661, Jan. 27, 2015, 12 pgs.
Energous Corp., ISRWO, PCT/US2014/062672, Jan. 26, 2015, 11 pgs.
Energous Corp., ISRWO, PCT/US2014/062682, Feb. 12, 2015, 10 pgs.
Energous Corp., ISRWO, PCT/US2014/068282, Mar. 19, 2015, 13 pgs.
Energous Corp., ISRWO, PCT/US2014/068568, Mar. 20, 2015, 10 pgs.
Energous Corp., ISRWO, PCT/US2014/068586, Mar. 20, 2015, 11 pgs.
Energous Corp., ISRWO, PCT/US2015/067242, Mar. 16, 2016, 9 pgs.
Energous Corp., ISRWO, PCT/US2015/067243, Mar. 10, 2016, 11 pgs.
Energous Corp., ISRWO, PCT/US2015/067245, Mar. 17, 2016, 8 pgs.
Energous Corp., ISRWO, PCT/US2015/067246, May 11, 2016, 18 pgs.
Energous Corp., ISRWO, PCT/US2015/067249, Mar. 29, 2016, 8 pgs.
Energous Corp., ISRWO, PCT/US2015/067250, Mar. 30, 2016, 11 pgs.
Energous Corp., ISRWO, PCT/US2015/067271, Mar. 11, 2016, 6 pgs.
Energous Corp., ISRWO, PCT/US2015/067275, Mar. 3, 2016, 8 pgs.
Energous Corp., ISRWO, PCT/US2015/067279, Mar. 11, 2015, 13 pgs.
Energous Corp., ISRWO, PCT/US2015/067282, Jul. 5, 2016, 7 pgs.
Energous Corp., ISRWO, PCT/US2015/067287, Feb. 2, 2016, 8 pgs.
Energous Corp., ISRWO, PCT/US2015/067291, Mar. 4, 2016, 10 pgs.
Energous Corp., ISRWO, PCT/US2015/067294, Mar. 26, 2016, 7 pgs.
Energous Corp., ISRWO, PCT/US2015/067325, Mar. 10, 2016, 9 pgs.
Energous Corp., ISRWO, PCT/US2015/067334, Mar. 3, 2016, 6 pgs.
Energous Corp., ISRWO, PCT/US2016/068495, Mar. 30, 2017, 9 pgs.
Energous Corp., ISRWO, PCT/US2016/068498, May 17, 2017, 8 pgs.
Energous Corp., ISRWO, PCT/US2016/068504, Mar. 30, 2017, 8 pgs.
Energous Corp., ISRWO, PCT/US2016/068551, Mar. 17, 2017, 8 pgs.
Energous Corp., ISRWO, PCT/US2016/068565, Mar. 8, 2017, 11 pgs.
Energous Corp., ISRWO, PCT/US2016/068987, May 8, 2017, 10 pgs.
Energous Corp., ISRWO, PCT/US2016/068993, Mar. 13, 2017, 12 pgs.
Energous Corp., ISRWO, PCT/US2016/069313, Nov. 13, 2017, 10 pgs.
Energous Corp., ISRWO, PCT/US2016/069316, Mar. 16, 2017, 15 pgs.
Energous Corp., ISRWO, PCT/US2017/046800, Sep. 11, 2017, 13 pgs.
Energous Corp., ISRWO, PCT/US2017/065886, Apr. 6, 2018, 13 pgs.
Energous Corp., ISRWO, PCT/US2018/012806, Mar. 23, 2018, 9 pgs.
Energous Corp., ISRWO, PCT/US2018/025465, Jun. 22, 2018, 9 pgs.
Energous Corp., ISRWO, PCT/US2018/031768, Jul. 3, 2018, 9 pgs.

(56) References Cited

OTHER PUBLICATIONS

Energous Corp., ISRWO, PCT/US2018/031786, Aug. 8, 2018, 9 pgs.
Energous Corp., ISRWO, PCT/US2018/039334, Sep. 11, 2018, 9 pgs.
Energous Corp., ISRWO, PCT/US2018/051082, Dec. 12, 2018, 9 pgs.
Energous Corp., ISRWO, PCT/US2018/058178, Mar. 13, 2019, 10 pgs.
Energous Corp., ISRWO, PCT/US2019/015820, May 14, 2019, 9 pgs.
Energous Corp., ISRWO, PCT/US2019/021817, Apr. 6, 2019, 11 pgs.
Energous Corp., ISRWO, PCT/US2019/039014, Oct. 4, 2019, 15 pgs.
Energous Corp., ISRWO, PCT/US2019/061445, Jan. 7, 2020, 19 pgs.
Order Granting Reexamination Request, U.S. Appl. No. 90/013,793, filed Aug. 31, 2016, 23 pgs.
Notice of Intent to Issue Reexam Certificate: 90/013,793 Feb. 2, 2017, 8 pgs.
*Ossia Inc.* vs *Energous Corp.*, Declaration of Stephen B. Heppe in Support of Petition for Post-Grant Review of U.S. Pat. No. 9124125, PGR2016-00023, May 31, 2016, 144 pgs.
*Ossia Inc.* vs *Energous Corp.*, Declaration of Stephen B. Heppe in Support of Petition for Post-Grant Review of U.S. Pat. No. 9124125, PGR2016-00024, May 31, 2016, 122 pgs.
*Ossia Inc.* vs *Energous Corp.*, Patent Owner Preliminary Response, Sep. 8, 2016, 95 pgs.
*Ossia Inc.* vs *Energous Corp.*, Petition for Post Grant Review of U.S. Pat. No. 9124125, May 31, 2016, 86 pgs.
*Ossia Inc.* vs *Energous Corp.*, Petition for Post-Grant Review of U.S. Pat. No. 9124125, May 31, 2016, 92 pgs.
*Ossia Inc.* vs *Energous Corp.*, PGR2016-00023-Institution Decision, Nov. 29, 2016, 29 pgs.
*Ossia Inc.* vs *Energous Corp.*, PGR2016-00024-Institution Decision, Nov. 29, 2016, 50 pgs.
*Ossia Inc.* vs *Energous Corp.*, PGR2016-00024-Judgement-Adverse, Jan. 20, 2017, 3 pgs.
Extended European Search Report, EP14818136.5, Jul. 21, 2016, 9 pgs.
Extended European Search Report, EP14822971.9, Feb. 10, 2017, 10 pgs.
Extended European Search Report, EP14868901.1, Jul. 17, 2017, 6 pgs.
Extended European Search Report, EP15874273.4, May 11, 2018, 7 pgs.
Extended European Search Report, EP15876033.0, Jun. 13, 2018, 10 pgs.
Extended European Search Report, EP15876036.3, May 3, 2018, 9 pgs.
Extended European Search Report, EP15876043.9, Aug. 9, 2018, 9 pgs.
Extended European Search Report, EP16189052.0, Feb. 10, 2017, 13 pgs.
Extended European Search Report, EP16189300.3, Mar. 24, 2017, 6 pgs.
Extended European Search Report, EP16189319.3, Feb. 10, 2017, 11 pgs.
Extended European Search Report, EP16189974.5, Mar. 13, 2017, 7 pgs.
Extended European Search Report, EP16189982.8, Feb. 7, 2017, 11 pgs.
Extended European Search Report, EP16189987.7, Feb. 9, 2017, 10 pgs.
Extended European Search Report, EP16189988.5, Mar. 13, 2017, 6 pgs.
Extended European Search Report, EP16193743.8, Feb. 8, 2017, 9 pgs.
Extended European Search Report, EP16196205.5, Apr. 7, 2017, 9 pgs.
Extended European Search Report, EP16880139.7, Jul. 12, 2019, 5 pgs.
Extended European Search Report, EP16880153.8, Jul. 2, 2019, 9 pgs.
Extended European Search Report, EP16880158.7, Jul. 15, 2019, 8 pgs.
Extended European Search Report, EP16882597.4, Aug. 7, 2019, 9 pgs.
Extended European Search Report, EP16882696.4, Jul. 3, 2019, 10 pgs.
Extended European Search Report, EP17840412.5, Jul. 15, 2019, 8 pgs.
Extended European Search Report, EP17882087.4, Sep. 17, 2019, 10 pgs.
Extended European Search Report, EP18204043.6, Feb. 14, 2019, 5 pgs.
Adamiuk et al., "Compact, Dual-Polarized UWB-Antanna, Embedded in a Dielectric," IEEE Transactions on Antenna and Propagation, IEEE Service Center, Piscataway, NJ, US vol. 56, No. 2, Feb. 1, 2010, 8 pgs.
Gill et al., "A System for Change Detection and Human Recognition in Voxel Space using the Microsoft Kinect Sensor," 2011 IEEE Applied Imagery Pattern Recognition Workshop. 8 pgs.
Han et al., Enhanced Computer Vision with Microsoft Kinect Sensor: A Review, IEEE Transactions on Cybernetics vol. 43, No. 5., pp. 1318-1334, Oct. 3, 2013.
Hsieh et al., "Development of a Retrodirective Wireless Microwave Power Transmission System", IEEE, 2003, pp. 393-396.
Leabman, "Adaptive Band-partitioning for Interference Cancellation in Communication System," Thesis Massachusetts Institute of Technology, Feb. 1997, pp. 1-70.
Li et al., "High-Efficiency Switching-Mode Charger System Design Considerations with Dynamic Power Path Management," Mar./Apr. 2012 Issue, 8 pgs.
Mao et al., "BeamStar: An Edge-Based Approach to Routing in Wireless Sensors Networks", IEEE Transactions on Mobile Computing, IEEE Service Center, Los Alamitos, CA, vol. 6, No. 11, Nov. 1, 2007, 13 pgs.
Mascarenas et al., "Experimental Studies of Using Wireless Energy Transmission for Powering Embedded Sensor Nodes," Nov. 28, 2009, Journal of Sound and Vibration, 13 pgs.
Mishra et al., "SIW-based Slot Array Antenna and Power Management Circuit for Wireless Energy Harvesting Applications", IEEE APSURSI, Jul. 2012, 2 pgs.
Nenzi et al., "U-Helix: On-Chip Short Conical Antenna", 7th European Conference on Antennas and Propagation (EUCAP), ISBN: 978-1-4673-2187-7, IEEE, Apr. 8, 2013, 5 pgs.
Qing et al., "UHF Near-Field Segmented Loop Antennas with Enlarged Interrogation Zone," 2012 IEEE International Workshop on Antenna Technology (iWAT), Mar. 1, 2012, pp. 132-135, XP055572059, ISBN: 978-1-4673-0035-3.
Singh, "Wireless Power Transfer Using Metamaterial Bonded Microstrip Antenna for Smart Grid WSN", 4th International Conference on Advances in Computing and Communications (ICACC), Aug. 27-29, 2014, 1 pg.
Smolders, "Broadband Microstrip Array Antennas", Institute of Electrical and Electronics Engineers, Digest of the Antennas and Propagation Society International Symposium, Seattle, WA, Jun. 19-24, 1994, 3 pgs.
Van Veen et al., "Beamforming: A Versatile Approach to Spatial Filtering", IEEE, ASSP Magazine, Apr. 1988, pp. 4-24.
Wei et al., "Design of a Wideband Horizontally Polarized Omnidirectional Printed Loop Antenna," IEEE Antennas and Wireless Propagation Letters, vol. 11, Jan. 3, 2012, 4 pgs.
Zeng et al., "A Compact Fractal Loop Rectenna for RF Energy Harvesting," IEEE Antennas And Wireless Propagation Letters, vol. 16, Jun. 26, 2017, 4 pgs.
Zhai et al., "A Practical Wireless Charging System Based on Ultra-Wideband Retro-Reflective Beamforming", 2010 IEEE Anten-

(56) References Cited

OTHER PUBLICATIONS nas and Propagation Society International Symposium, Toronto, ON, 2010, 4 pgs.

* cited by examiner

| Name | Phi | Ang | Mag |
|---|---|---|---|
| m1 | -44.0000 | -44.0000 | -0.3992 |
| m2 | -2.0000 | -2.0000 | -0.9386 |
| m3 | 34.0000 | 34.0000 | 0.5109 |
| m4 | 64.0000 | 64.0000 | 0.2601 |

604-C

604-B

SYSTEMS FOR RECEIVING ELECTROMAGNETIC ENERGY USING ANTENNAS THAT ARE MINIMALLY AFFECTED BY THE PRESENCE OF THE HUMAN BODY

RELATED APPLICATION

This application is a continuation of U.S. patent application Ser. No. 16/683,167, filed on Nov. 13, 2019, entitled "Systems For Receiving Electromagnetic Energy Using Antennas That Are Minimally Affected By The Presence Of The Human Body," which claims the benefit of U.S. Provisional Patent Application No. 62/767,365, filed Nov. 14, 2018, entitled "Miniaturized, Tunable, Omnidirectional Antennas Minimally Affected by Presence of Human Body," each of which is herein fully incorporated by reference in its respective entirety.

TECHNICAL FIELD

The present disclosure relates generally to wireless power transmission, and more particularly to omnidirectional antennas that are minimally affected by the presence of the human body.

BACKGROUND

Portable electronic devices such as smartphones, tablets, notebooks and other electronic devices have become a necessity for communicating and interacting with others. The frequent use of portable electronic devices, however, uses a significant amount of power, which quickly depletes the batteries attached to these devices. Inductive charging pads and corresponding inductive coils in portable devices allow users to wirelessly charge a device by placing the device at a particular position on an inductive pad to allow for a contact-based charging of the device due to magnetic coupling between respective coils in the inductive pad and in the device.

Conventional inductive charging pads, however, suffer from many drawbacks. For one, users typically must place their devices at a specific position and in a certain orientation on the charging pad because gaps ("dead zones" or "cold zones") exist on the surface of the charging pad. In other words, for optimal charging, the coil in the charging pad needs to be aligned with the coil in the device in order for the required magnetic coupling to occur. Additionally, placement of other metallic objects near an inductive charging pad may interfere with operation of the inductive charging pad. Thus, even if the user places their device at the exact right position, if another metal object is also on the pad, then magnetic coupling still may not occur and the device will not be charged by the inductive charging pad. This results in a frustrating experience for many users as they may be unable to properly charge their devices. Also, inductive charging requires a relatively large receiver coil to be placed within a device to be charged, which is less than ideal for devices where internal space is at a premium.

Inductive charging pads more recently have been used to wireless charge electronic devices that frequently move, e.g., a computer mouse. However, these types of pads are expensive and heavy, and they also suffer from the inherent drawbacks associated with inductive charging. For example, a computer mouse can be slightly raised off the surface during usage (e.g., during gaming, where movements of the computer mouse are abrupt and aggressive). When the computer mouse is raised off the inductive charging pads, magnetic coupling between the pad of the mouse is degraded, or lost completely. This result is unsatisfactory to users as the cursor on the computer screen tends to jump or skip when magnetic coupling is interfered with or lost. Additionally, as mentioned in the paragraph above, metal objects interfere with magnetic coupling. As such, jewelry worn by users (e.g., rings, bracelets, etc.) can interfere with the magnetic coupling between the inductive charging pad and the corresponding circuitry located on the computer mouse.

Charging using electromagnetic radiation (e.g., microwave radiation waves) offers promise.

SUMMARY

Accordingly, there is a need for a wireless charging solution that: (i) can be integrated with movable electronic devices, such as a computer mouse, (ii) is not affected by known uses of the electronic device, and (iii) is minimally affected by presence of the human body (among other objects that may interfere with reception of RF energy). One solution is to incorporate antennas into movable electronic devices that, together with the appropriate circuitry, can charge the device's battery or directly power the device using electromagnetic radiation. Antenna systems that charge using electromagnetic radiation are far less susceptible to interference from metallic objects, relative to inductive charging pads. Furthermore, the antennas disclosed herein are designed to substantially reduce interferences caused by the human body, while ensuring that the reception of RF energy is still safe for human users.

(A1) In some embodiments, an antenna for receiving wireless power from a wireless-power-transmitting device is provided. The antenna (e.g., loop antenna 300, FIG. 3A) includes a plurality of antenna elements, forming a planar loop, configured to receive horizontally polarized (polarization parallel to the plane of the loop) electromagnetic (radio frequency, RF) power waves transmitted by a wireless-power-transmitting device. Each antenna element of the plurality of antenna elements includes a male component and a female component, and the male component of a first respective antenna element of the plurality of antenna elements mates with the female component of a second respective antenna element of the plurality of antenna elements (the first and second respective antenna elements being adjacent to each other, e.g., adjacent/neighboring segments in the planar loop). Furthermore, at least one of the plurality of antenna elements is coupled to a transmission line. Moreover, conversion circuitry, coupled to the transmission line, is configured to: (i) convert energy from the received electromagnetic power waves into usable power, and (ii) provide the usable power to an electronic device for powering or charging of the electronic device.

(A2) In some embodiments of the antenna of A1, each of the plurality of antenna element includes: (i) a segment body with first and second opposing ends, (ii) the female component is a slot (e.g., slot 306, FIG. 3A) defined by the segment body, the slot extending from the first end into the segment body, and (iii) the male component is a protrusion (e.g., protrusion 308, FIG. 3A) extending from the second end away from the segment body.

(A3) In some embodiments of the antenna of A2, the protrusion of the first respective antenna element is positioned within the slot defined by the second respective antenna element. The protrusion of the first respective antenna element does not contact the second respective antenna element.

(A4) In some embodiments of the antenna of any of A1-A3, the plurality of antenna elements creates an omni-directional antenna as a result of at least: (i) a shape of each of the plurality of antenna elements, and (ii) an arrangement of the plurality of antenna elements.

(A5) In some embodiments of the antenna of any of A1-A4, at least one antenna element of the plurality of antenna elements includes one or more tuning elements, and the one or more tuning elements are configured to adjust an operating frequency of the antenna by adjusting a length of the at least one antenna element's male component.

(A6) In some embodiments of the antenna of A5, the one or more tuning elements are switchably coupled to each other and the at least one antenna element's male component via diodes.

(A7) In some embodiments of the antenna of any of A5-A6, the one or more tuning elements are configured to adjust the operating frequency of the antenna to a first operating frequency when no human hand is in contact with the electronic device, and the one or more tuning elements are configured to adjust the operating frequency of the antenna to a second operating frequency, different from (or the same as) the first operating frequency, when a human hand is in contact with the electronic device. The contact of the hand shifts the frequency away from the desired operation frequency. With the tuning elements, the desired frequency can be regained (i.e., in some embodiments, the same operating frequency is targeted with and without the hand being in contact with the electronic device).

In some embodiments, a sensor may detect the human hand, and in response, a processor in communication with the one or more tuning elements and the processor may connect (or disconnect) one or more of the tuning elements with the at least one antenna element. In another example, a feedback loop may be used to determine (e.g., by a processer in communication with the one or more tuning elements) that the human hand is in contact with the electronic device (e.g., an unexpected drop in reception efficiency is detected). In response to detecting the unexpected drop, the processor may connect (or disconnect) one or more of the tuning elements with the at least one antenna element. In this way, the antenna can be dynamically tuned to account for the human hand being in contact with the electronic device.

(A8) In some embodiments of the antenna of any of A1-A7, the plurality of antenna elements has a reception efficiency above a predetermined threshold efficiency when a human hand is in contact with the electronic device, the predetermined threshold efficiency being at least 50%.

(A9) In some embodiments of the antenna of any of A1-A8, the first antenna element of the plurality of antenna elements has a surface area that is less than respective surface areas of other antenna elements of the plurality of antenna elements, and the surface area of the first antenna element is reduced, relative to the respective surface areas of the other antenna elements, to increase a gain of the antenna in a predefined direction.

(A10) In some embodiments of the antenna of any of A1-A9, the antenna is integrated with an electronic device, and the first antenna element is located towards a preferred direction of the electronic device that can maximize the link with the wireless-power-transmitting device. In such embodiments, the first antenna element can be located towards a nose of the electronic device (e.g., a front-end of a computer mouse).

(A11) In some embodiments of the antenna of A10, the transmission line is connected to the first antenna element.

(A12) In some embodiments of the antenna of any of A10-A11, a housing of the electronic device has a first surface shaped for a palmar surface of a user's hand and a second surface, opposite the first surface, to translate on a working surface; and the plurality of antenna elements forming the planar loop is coupled to the second surface of the housing. In other embodiments, the plurality of antenna elements forming the planar loop may be placed anywhere parallel to the second surface and inside a volume (e.g., cavity) defined by the two surfaces, but not necessarily attached to the second surface.

(A13) In some embodiments of the method of any of A1-A12, the electromagnetic power waves are transmitted at a frequency of approximately 5.8 GHz, 2.4 GHz, or 900 MHz.

(B1) In another aspect, an electronic device is provided. The electronic device includes electronics to track movement of the electronic device and a housing having a first surface shaped for a palmar surface of a user's hand and a second surface, opposite the first surface, to translate on a working surface. The electronic device also includes a loop antenna, coupled to the second surface of the housing, that includes a plurality of antenna elements forming a planar loop. The plurality of antenna elements is configured to receive horizontally polarized (polarization parallel to the plane of the loop) electromagnetic power waves transmitted by a wireless-power-transmitting device. The electronic device also includes conversion circuitry, coupled to the loop antenna and the electronics, configured to: (i) convert energy from the received electromagnetic power waves into usable power and (ii) provide the usable power to the electronics. The loop antenna included in the electronic device of (B1) includes any of the structural characteristics of the antenna described above in any of A1-A12.

(C1) In yet another aspect, an antenna for receiving wireless power from a wireless-power-transmitting device is provided. The antenna (e.g., stack antenna 600, FIG. 6A) includes a plurality of substrates, arranged in a stack, forming a pyramidal frustum. The antenna also includes a plurality of antenna elements configured to receive vertically polarized (along the pyramid axis) electromagnetic power waves transmitted by a wireless-power-transmitting device. Each antenna element of the plurality of antenna elements is attached to one of the plurality of substrates. In addition, one (or more) of the plurality of antenna elements is coupled to a transmission line. Conversion circuitry, coupled to the transmission line, is configured to: (i) convert energy from the received electromagnetic power waves into usable power, and (ii) provide the usable power to an electronic device for powering or charging of the electronic device.

(C2) In some embodiments of the antenna of C1, substrates in the plurality of substrates do not directly contact one another. Instead, the substrates are spaced-apart, thereby forming a layered pyramidal frustum.

(C3) In some embodiments of the antenna of any of C1-C2, further including multiple sets of metal rods, where each of the plurality of substrates is supported by one set of metal rods from the multiple sets of metal rods.

(C4) In some embodiments of the antenna of C3, each substrate includes a set of vias defined through the substrate and connected to: (i) predefined portions of one of the plurality of antenna elements at one end, and (ii) one of the sets of metal rods at the other end.

(C5) In some embodiments of the antenna of any of C3-C4, each set of metal rods separates two neighboring substrates by a predefined distance.

(C6) In some embodiments of the antenna of any of C1-05, the plurality of substrates includes first and second substrates. The first substrate includes: (i) a first antenna element of the plurality of antenna elements, the first antenna element being a first four-pronged antenna element; and (ii) four vias positioned at respective ends of the first four-pronged antenna element. In addition, the second substrate, which is positioned above the first substrate in the stack, includes: (i) a second antenna element of the plurality of antenna elements, the second antenna element being a second four-pronged antenna element; and (ii) four vias, vertically aligned with the four vias of the first substrate, positioned at respective ends of the second four-pronged antenna element. In some embodiments, a design of the first four-pronged antenna element is the same as a design of the second four-pronged antenna element. However, in some other embodiments a design of the first four-pronged antenna element differs from a design of the second four-pronged antenna element. For example, with reference to FIGS. 6D-6E, the two antenna element designs differ from each other.

(C7) In some embodiments of the antenna of C6, further including four metal rods that each have a first length, where: (i) each of the four metal rods connects one of the four vias of the second substrate with one of the four vias of the first substrate, and (ii) the second substrate is vertically offset from the first substrate by the first length.

(C8) In some embodiments of the antenna of any of C6-C7, the first and second substrates are parallel. For example, with reference to FIG. 6C, substrate 602-E parallels substrate 602-D, and vice versa (e.g., both substrates are horizontally oriented).

(C9) In some embodiments of the antenna of any of C6-C8, an operating frequency of the antenna corresponds, at least in part, to a magnitude of the first length.

(C10) In some embodiments of the antenna of any of C6-C9, the first and second substrates are rectangular; and a largest cross-sectional dimension of the second substrate is less than a largest cross-section dimension of the first substrate.

(C11) In some embodiments of the antenna of any of C6-C10, the first four-pronged antenna element has a first surface area, the second four-pronged antenna element has a second surface area, and the second surface area is less than the first surface area.

(C12) In some embodiments of the antenna of any of C1-C11, the ground plane forms a bottom of the stack, and a first respective antenna element, of the plurality of antenna elements, is partially coupled to the ground plane. For example, the first respective antenna element may include a plurality of prongs, and one or more of the plurality of prongs are coupled to the ground plane while one or more other prongs of the plurality of prongs are not coupled to the ground plane. Instead, the one or more other prongs are coupled to the transmission line. In some embodiments, the first respective antenna element is nearest the ground plane, relative to the other antenna elements in the stack.

(C13) In some embodiments of the antenna of C12, the transmission line is coupled to the first respective antenna element.

(C14) In some embodiments of the antenna of any of C1-C13, at least one of the plurality of antenna elements follows a meandered path to increase an effective length of the antenna element, thereby lowering a resonant frequency of the antenna and reducing an overall size of the antenna. Furthermore, in some embodiments, the other antenna elements of the plurality of antenna elements have a different design from the at least one antenna element.

(D1) In yet another aspect, an electronic device is provided. The electronic device includes electronics to track movement of the electronic device and a housing having a first surface shaped for a palmar surface of a user's hand and a second surface, opposite the first surface, to translate on a working surface. The electronic device also includes an antenna, integrated with the housing, including multiple substrates that are spaced apart and arranged in a stack. In addition, (i) each substrate includes a respective antenna element, (ii) the multiple substrates arranged in the stack form a pyramidal frustum, and (iii) the antenna is configured to receive vertically polarized radio frequency (RF) power waves transmitted from a wireless-power-transmitting device. The electronic device also includes conversion circuitry, coupled to the loop antenna and the electronics, configured to: (i) convert energy from the received electromagnetic power waves into usable power and (ii) provide the usable power to the electronics. The antenna included in the electronic device of (D1) includes the structural characteristics of the antenna described above in C1-C14.

(E1) In another aspect, an antenna for receiving wireless power from a wireless-power-transmitting device is provided. The antenna (e.g., loop-slot antenna 800, FIG. 8A) includes: (i) an inner antenna element, coupled to a transmission line, configured to receive electromagnetic power waves by a wireless-power-transmitting device, wherein the inner antenna element forms an open loop, (ii) an outer antenna element, separated from the inner antenna element, configured to receive electromagnetic power waves by the wireless-power-transmitting device, wherein the outer antenna element forms an open-loop and surrounds the inner antenna element, and (iii) first and second sets of tuning elements positioned adjacent to first and second ends of the outer antenna element, respectively, the first and second sets of tuning elements being configured to adjust an operating frequency of the antenna. In addition, conversion circuitry, coupled to the transmission line, is configured to: (i) convert energy from the received electromagnetic power waves into usable power, and (ii) provide the usable power to an electronic device for powering or charging of the electronic device.

(E2) In some embodiments of the antenna of E1, the antenna is attached to the electronic device of B1. For example, the antenna of E1 is attached to a bottom surface of the electronic device, in a similar manner as the loop antenna 300 (FIG. 3A).

(E3) In some embodiments of the antenna of E2, the first and second sets of tuning elements are configured to adjust the operating frequency of the antenna to a first operating frequency when no human hand is in contact with the electronic device, and the first and second sets of tuning elements are configured to adjust the operating frequency of the antenna to a second operating frequency when a human hand is in contact with the electronic device.

(E4) In some embodiments of the antenna of E3, the second operating frequency is the same as the first operating frequency.

(E5) In some embodiments of the antenna of E4, the human hand in contact with the electronic device shifts a frequency of the antenna away from the first operating frequency, and the first and second sets of tuning elements are used to regain the first operating frequency when the human hand is in contact with the electronic device.

(E6) In some embodiments of the antenna of any of E3-E5, a sensor (e.g., receiving sensor 128) signals a processor (e.g., processor 140) when a human hand is in contact with the electronic device, and the processor is in communication with the first and second sets of tuning elements. In such instances, the processor is configured to connect (or disconnect) one or more tuning elements of the first and second sets of tuning elements with the outer antenna element in response to being signaled by the sensor.

(E7) In some embodiments of the antenna of any of E1-E6, the inner antenna element and the outer antenna element together form an omnidirectional antenna.

(E8) In some embodiments of the antenna of any of E1-E7, the inner antenna element and the outer antenna element are positioned on a plane, and the inner and outer antenna elements are configured to receive electromagnetic power waves with polarizations parallel to the plane.

(E9) In some embodiments of the antenna of any of E1-E8, the inner antenna element, the outer antenna element, and the first and second sets of elements are coupled to a substrate.

(E10) In some embodiments of the antenna of any of E1-E9, a surface area of the outer antenna element is greater than a surface area of the inner antenna element.

(E11) In some embodiments of the antenna of any of E1-E10, ends of the inner antenna element are coupled to a transmission line or other feed mechanism.

(F1) In yet another aspect, another antenna is provided. The antenna includes a plurality of antenna elements configured to receive radio-frequency power waves from a wireless-power-transmitting device, each antenna element being adjacent to at least one other antenna element in the plurality of antenna elements. Moreover, the plurality of antenna elements is arranged so that an efficiency of reception of the radio-frequency power waves by the plurality of antenna elements remains above a predetermined threshold efficiency when a human hand is in contact with the electronic device, the predetermined threshold efficiency being at least 50%. Furthermore, at least one of the plurality of antenna elements is coupled to conversion circuitry, the conversion circuitry being configured to (i) convert energy from the received RF power waves into usable power and (ii) provide the usable power to an electronic device for powering or charging of the electronic device.

(F2) In some embodiments of the antenna of F1, the antenna elements in the plurality form a planar loop and are coupled to a surface of a peripheral device.

(F3) In some embodiments of the antenna of F2, the antenna elements in the plurality are arranged in the planar loop to prevent interference with functional components of the peripheral device.

(F4) In some embodiments of the antenna of any of F2-F3, the peripheral device is a computer mouse, and the surface of the peripheral device is a bottom surface of the computer mouse.

(F5) In some embodiments of the antenna of any of F2-F4, the antenna elements in the plurality that form the planar loop are configured to receive horizontally polarized radio-frequency power waves.

(F6) In some embodiments of the antenna of F1, the antenna elements in the plurality form a pyramidal frustum and are embedded in a peripheral device.

(F7) In some embodiments of the antenna of F6, the antenna elements in the plurality that form the pyramidal frustum are configured to receive vertically polarized radio-frequency power waves.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

So that the present disclosure can be understood in greater detail, a more particular description may be had by reference to the features of various embodiments, some of which are illustrated in the appended drawings. The appended drawings, however, merely illustrate pertinent features of the present disclosure and are therefore not to be considered limiting, for the description may admit to other effective features.

Figure 1:
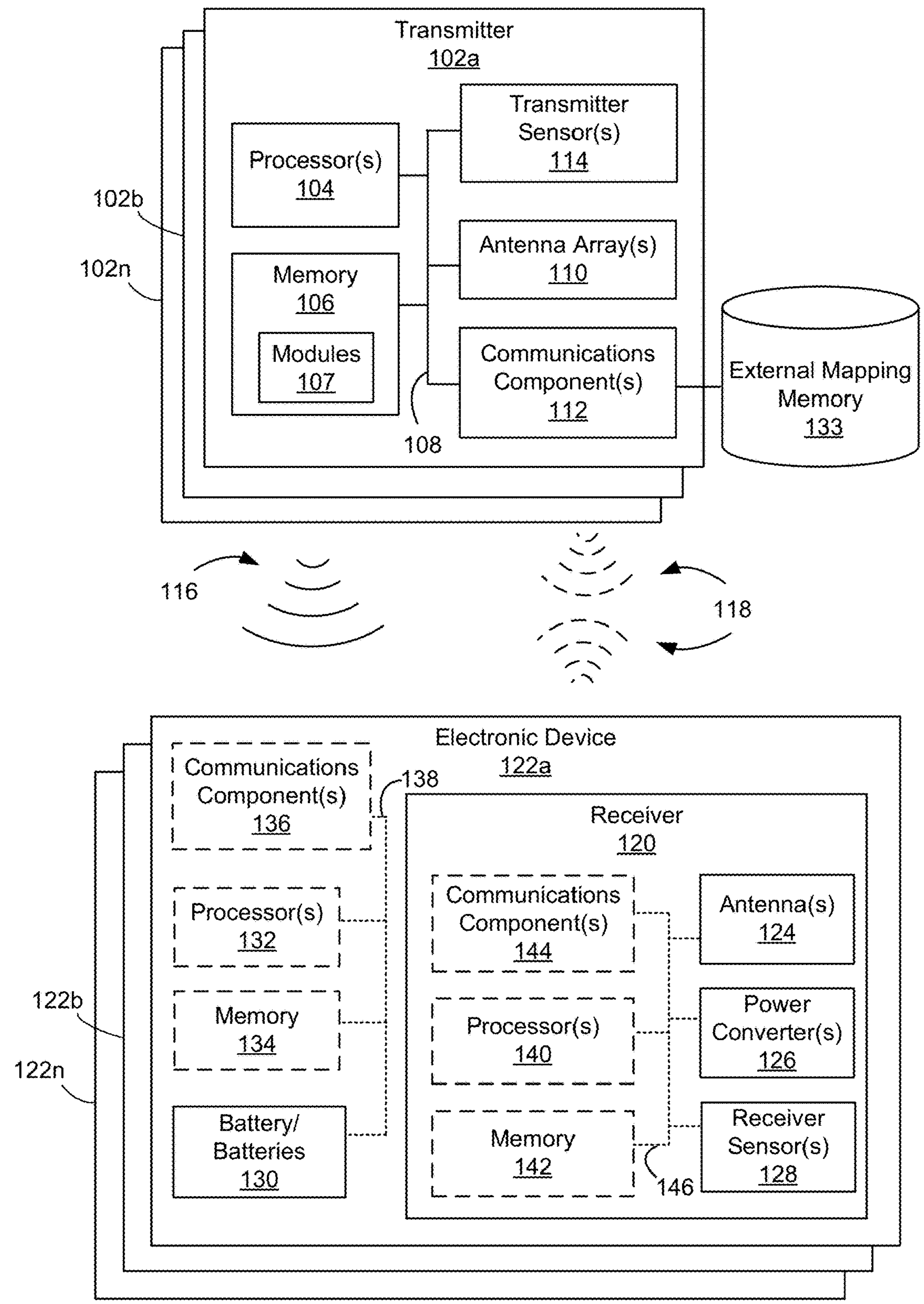
FIG. 1 is a block diagram showing components of a wireless power transmission system in accordance with some embodiments.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Numerous details are described herein in order to provide a thorough understanding of the example embodiments illustrated in the accompanying drawings. However, some embodiments may be practiced without many of the specific details, and the scope of the claims is only limited by those features and aspects specifically recited in the claims. Furthermore, well-known processes, components, and materials have not been described in exhaustive detail so as not to unnecessarily obscure pertinent aspects of the embodiments described herein.

FIG. 1 is a block diagram of components of wireless power transmission environment 100, in accordance with some embodiments. Wireless power transmission environment 100 includes, for example, transmitters 102 (e.g., transmitters 102*a*, 102*b* . . . 102*n*) and one or more receivers 120 (e.g., receivers 120*a*, 120*b* . . . 120*n*). In some embodiments, each respective wireless power transmission environment 100 includes a number of receivers 120, each of which is associated with a respective electronic device 122. In some instances, a transmitter 102 is referred to herein as a "wireless-power-transmitting device" or a "wireless power transmitter." Additionally, in some instances, a receiver 120 is referred to herein as a "wireless-power-receiving device" or a "wireless power receiver."

An example transmitter 102 (e.g., transmitter 102*a*) includes, for example, one or more processor(s) 104, a memory 106, one or more antenna arrays 110, one or more communications components 112 (also referred to herein as a communications radio), and/or one or more transmitter sensors 114. In some embodiments, these components are interconnected by way of a communications bus 108. References to these components of transmitters 102 cover embodiments in which one or more of these components (and combinations thereof) are included.

In some embodiments, the memory 106 stores one or more programs (e.g., sets of instructions) and/or data structures, collectively referred to as "modules 107" herein. In some embodiments, the memory 106, or the non-transitory computer readable storage medium of the memory 106 stores the following programs, modules, and data structures, or a subset or superset thereof:

- information received from receiver 120 (e.g., generated by receiver sensor 128 or processor 140, and then transmitted to the transmitter 102*a*);
- information received from transmitter sensor 114;
- an adaptive pocket-forming module that adjusts one or more power waves transmitted by one or more transmitters 102; and/or
- a beacon transmitting module that transmits a communication signal 118 for detecting a receiver 120 (e.g., within a transmission field of the transmitter 102).

The above-identified modules (e.g., data structures and/or programs including sets of instructions) need not be implemented as separate software programs, procedures, or modules, and thus various subsets of these modules may be combined or otherwise re-arranged in various embodiments. In some embodiments, the memory 106 stores a subset of the modules identified above. In some embodiments, an external mapping memory 133 that is communicatively connected to communications component 112 stores one or more modules identified above. Furthermore, the memory 106 and/or external mapping memory 133 may store additional modules not described above. In some embodiments, the modules stored in the memory 106, or a non-transitory computer readable storage medium of memory 106, provide instructions for implementing respective operations in the methods described below. In some embodiments, some or all of these modules may be implemented with specialized hardware circuits that subsume part or all of the module functionality. One or more of the above-identified elements may be executed by one or more of processor(s) 104. In some embodiments, one or more of the modules described with regard to the memory 106 is implemented on the memory of a server (not shown) that is communicatively coupled to one or more transmitters 102 and/or by a memory of electronic device 122 and/or receiver 120.

In some embodiments, a single processor 104 (e.g., processor 104 of transmitter 102*a*) executes software modules for controlling multiple transmitters 102 (e.g., transmitters 102*b* . . . 102*n*). In some embodiments, a single transmitter 102 (e.g., transmitter 102*a*) includes multiple processors 104, such as one or more transmitter processors (configured to, e.g., control transmission of signals 116 by antenna array 110), one or more communications component processors (configured to, e.g., control communications transmitted by communications component 112 and/or receive communications by way of communications component 112) and/or one or more sensor processors (configured to, e.g., control operation of transmitter sensor 114 and/or receive output from transmitter sensor 114).

The wireless power receiver 120 receives power transmission signals 116 and/or communications 118 transmitted by transmitters 102. In some embodiments, the receiver 120 includes one or more antennas 124 (e.g., an antenna array including multiple antenna elements), power converter 126, receiver sensor 128, and/or other components or circuitry (e.g., processor(s) 140, memory 142, and/or communication component(s) 144). In some embodiments, these components are interconnected by way of a communications bus 146. References to these components of the receiver 120 cover embodiments in which one or more of these components (and combinations thereof) are included.

The receiver 120 converts energy from received signals 116 (also referred to herein as RF power transmission signals, or simply, RF signals, RF waves, electromagnetic (EM) power waves, power waves, or power transmission signals) into electrical energy to power and/or charge electronic device 122. For example, the receiver 120 uses the power converter 126 to convert energy derived from power waves 116 to alternating current (AC) electricity or direct current (DC) electricity usable to power and/or charge the electronic device 122. Non-limiting examples of the power converter 126 include rectifiers, rectifying circuits, voltage conditioners, among suitable circuitry and devices. The power converter 126 is also referred to herein as "conversion circuitry."

In some embodiments, the receiver 120 is a standalone device that is detachably coupled to one or more electronic devices 122. For example, the electronic device 122 has processor(s) 132 for controlling one or more functions of the electronic device 122, and the receiver 120 has processor(s) 140 for controlling one or more functions of the receiver 120. In some other embodiments, the receiver 120 is a component of the electronic device 122. For example, processors 132 control functions of the electronic device 122 and the receiver 120. In addition, in some embodiments, the receiver 120 includes one or more processors 140, which communicates with processors 132 of the electronic device 122.

In some embodiments, the electronic device 122 includes one or more processors 132, memory 134, one or more communication components 136, and/or one or more batteries 130. In some embodiments, these components are interconnected by way of a communications bus 138. In some embodiments, communications between the electronic device 122 and receiver 120 occur via communications component(s) 136 and/or 144. In some embodiments, communications between the electronic device 122 and receiver 120 occur via a wired connection between communications bus 138 and communications bus 146. In some embodiments, the electronic device 122 and the receiver 120 share a single communications bus.

The receiver 120 is configured to receive one or more power waves 116 directly from the transmitter 102 (e.g., via one or more antennas 124). Furthermore, the receiver 120 is configured to harvest power waves from one or more pockets of energy created by one or more power waves 116 transmitted by the transmitter 102. In some embodiments, the transmitter 102 is a near-field transmitter that transmits the one or more power waves 116 within a near-field distance (e.g., less than approximately six inches away from the transmitter 102). In some other embodiments, the transmitter 102 is a far-field transmitter that transmits the one or more power waves 116 within a far-field distance (e.g., more than approximately six inches away from the transmitter 102).

In some embodiments, after the power waves 116 are received and/or energy is harvested from a pocket of energy, circuitry (e.g., integrated circuits, amplifiers, rectifiers, and/or voltage conditioner) of the receiver 120 converts the energy of the power waves (e.g., radio frequency electromagnetic radiation) to usable power (i.e., electricity), which powers the electronic device 122 and/or is stored to battery 130 of the electronic device 122. In some embodiments, a rectifying circuit of the receiver 120 translates the electrical energy from AC to DC for use by the electronic device 122. In some embodiments, a voltage conditioning circuit increases or decreases the voltage of the electrical energy as required by the electronic device 122. In some embodiments, an electrical relay conveys electrical energy from the receiver 120 to the electronic device 122.

In some embodiments, the electronic device 122 obtains power from multiple transmitters 102 and/or using multiple receivers 120. In some embodiments, the wireless power transmission environment 100 includes a plurality of electronic devices 122, each having at least one respective receiver 120 that is used to harvest power waves from the transmitters 102 into usable power for charging the electronic devices 122.

In some embodiments, the one or more transmitters 102 adjust values of one or more characteristics (e.g., waveform characteristics, such as phase, gain, direction, amplitude, polarization, and/or frequency) of power waves 116. For example, a transmitter 102 selects a subset of one or more antenna elements of antenna array 110 to initiate transmission of power waves 116, cease transmission of power waves 116, and/or adjust values of one or more characteristics used to transmit power waves 116. In some embodiments, the one or more transmitters 102 adjust power waves 116 such that trajectories of power waves 116 converge at a predetermined location within a transmission field (e.g., a location or region in space), resulting in controlled constructive or destructive interference patterns. The transmitter 102 may adjust values of one or more characteristics for transmitting the power waves 116 to account for changes at the wireless power receiver 120 that may negatively impact transmission of the power waves 116.

In some embodiments, respective antenna arrays 110 of the one or more transmitters 102 may include antennas having one or more polarizations. For example, a respective antenna array 110 may include vertical or horizontal polarization, right hand or left hand circular polarization, elliptical polarization, or other polarizations, as well as any number of polarization combinations. In some embodiments, antenna array 110 is capable of dynamically varying the antenna polarization (or any other characteristic) to optimize wireless power transmission.

In some embodiments, respective antenna arrays 110 of the one or more transmitters 102 may include a set of one or more antennas configured to transmit the power waves 116 into respective transmission fields of the one or more transmitters 102. Integrated circuits (not shown) of the respective transmitter 102, such as a controller circuit (e.g., a radio frequency integrated circuit (RFIC)) and/or waveform generator, may control the behavior of the antennas. For example, based on the information received from the receiver 120 by way of the communication signal 118, a controller circuit (e.g., processor 104 of the transmitter 102, FIG. 1) may determine values of the waveform characteristics (e.g., amplitude, frequency, trajectory, direction, phase, polarization, among other characteristics) of power waves 116 that would effectively provide power to the receiver 120, and in turn, the electronic device 122. The controller circuit may also identify a subset of antennas from the antenna arrays 110 that would be effective in transmitting the power waves 116. In some embodiments, a waveform generator circuit (not shown in FIG. 1) of the respective transmitter 102 coupled to the processor 104 may convert energy and generate the power waves 116 having the specific values for the waveform characteristics identified by the processor 104/controller circuit, and then provide the power waves to the antenna arrays 110 for transmission.

In some embodiments, constructive interference of power waves occurs when two or more power waves 116 (e.g., RF power transmission signals) are in phase with each other and converge into a combined wave such that an amplitude of the combined wave is greater than amplitude of a single one of the power waves. For example, the positive and negative peaks of sinusoidal waveforms arriving at a location from multiple antennas "add together" to create larger positive and negative peaks. In some embodiments, a pocket of energy is formed at a location in a transmission field where constructive interference of power waves occurs.

In contrast, destructive interference of power waves occurs when two or more power waves are out of phase and converge into a combined wave such that the amplitude of the combined wave is less than the amplitude of a single one of the power waves. For example, the power waves "cancel each other out," thereby diminishing the amount of energy concentrated at a location in the transmission field. In some embodiments, destructive interference is used to generate a negligible amount of energy or "null" at a location within the transmission field where the power waves converge.

In some embodiments, the communications component 112 transmits communication signals 118 by way of a wired and/or wireless communication connection to the receiver 120. In some embodiments, the communications component 112 generates communication signals 118 used for triangulation of the receiver 120. In some embodiments, the communication signals 118 are used to convey information between the transmitter 102 and receiver 120 for adjusting values of one or more waveform characteristics used to transmit the power waves 116. In some embodiments, the communication signals 118 include information related to status, efficiency, user data, power consumption, billing, geo-location, and other types of information.

In some embodiments, the communications component 112 includes a communications component antenna for communicating with the receiver 120 and/or other transmitters 102 (e.g., transmitters 102*b* through 102*n*). In some embodiments, these communication signals 118 are sent using a first channel (e.g., a first frequency band) that is independent and distinct from a second channel (e.g., a second frequency band distinct from the first frequency band) used for transmission of the power waves 116.

In some embodiments, the receiver 120 includes a receiver-side communications component 144 (also referred to herein as a communications radio) configured to communicate various types of data with one or more of the transmitters 102, through a respective communication signal 118 generated by the receiver-side communications component (in some embodiments, a respective communication signal 118 is referred to as an advertising signal). The data may include location indicators for the receiver 120 and/or electronic device 122, a power status of the device 122, status information for the receiver 120, status information for the electronic device 122, status information about the power waves 116, and/or status information for pockets of energy. In other words, the receiver 120 may provide data to the transmitter 102, by way of the communication signal 118, regarding the current operation of the system 100, including: information identifying a present location of the receiver 120 or the device 122, an amount of energy (i.e., usable power) received by the receiver 120, and an amount of usable power received and/or used by the electronic device 122, among other possible data points containing other types of information.

In some embodiments, the data contained within communication signals 118 is used by the electronic device 122, the receiver 120, and/or the transmitters 102 for determining adjustments to values of one or more waveform characteristics used by the antenna array 110 to transmit the power waves 116. Using a communication signal 118, the transmitter 102 communicates data that is used, e.g., to identify receivers 120 within a transmission field, identify electronic devices 122, determine safe and effective waveform characteristics for power waves, and/or hone the placement of pockets of energy. In some embodiments, the receiver 120 uses a communication signal 118 to communicate data for alerting transmitters 102 that the receiver 120 has entered or is about to enter a transmission field, provide information about the electronic device 122, provide user information that corresponds to the electronic device 122, indicate the effectiveness of received power waves 116, and/or provide updated characteristics or transmission parameters that the one or more transmitters 102 use to adjust transmission of the power waves 116.

In some embodiments, transmitter sensor 114 and/or receiver sensor 128 detect and/or identify conditions of the electronic device 122, the receiver 120, the transmitter 102, and/or a transmission field. In some embodiments, data generated by the transmitter sensor 114 and/or receiver sensor 128 is used by the transmitter 102 to determine appropriate adjustments to values of waveform characteristics used to transmit the power waves 116. Data from transmitter sensor 114 and/or receiver sensor 128 received by the transmitter 102 includes, e.g., raw sensor data and/or sensor data processed by a processor 104, such as a sensor processor. Processed sensor data includes, e.g., determinations based upon sensor data output. In some embodiments, sensor data received from sensors that are external to the receiver 120 and the transmitters 102 is also used (such as thermal imaging data, information from optical sensors, and others).

In some embodiments, the receiver sensor 128 is a gyroscope that provides raw data such as orientation data (e.g., tri-axial orientation data), and processing this raw data may include determining a location of the receiver 120 and/or or a location of receiver antenna 124 using the orientation data. Furthermore, the receiver sensor 128 can indicate an orientation of the receiver 120 and/or electronic device 122. As one example, the transmitters 102 receive orientation information from the receiver sensor 128 and the transmitters 102 (or a component thereof, such as the processor 104) use the received orientation information to determine whether electronic device 122 is flat on a table, in motion, and/or in use (e.g., next to a user's head).

Non-limiting examples of the transmitter sensor 114 and/or the receiver sensor 128 include, e.g., infrared, pyroelectric, ultrasonic, laser, optical, Doppler, gyro, accelerometer, microwave, millimeter, RF standing-wave sensors, resonant LC sensors, capacitive sensors, and/or inductive sensors. In some embodiments, technologies for the transmitter sensor 114 and/or the receiver sensor 128 include binary sensors that acquire stereoscopic sensor data, such as the location of a human or other sensitive object.

In some embodiments, the transmitter sensor 114 and/or receiver sensor 128 is configured for human recognition (e.g., capable of distinguishing between a person and other objects, such as furniture). Examples of sensor data output by human recognition-enabled sensors include: body temperature data, infrared range-finder data, motion data, activity recognition data, silhouette detection and recognition data, gesture data, heart rate data, portable devices data, and wearable device data (e.g., biometric readings and output, accelerometer data).

Figure 2:
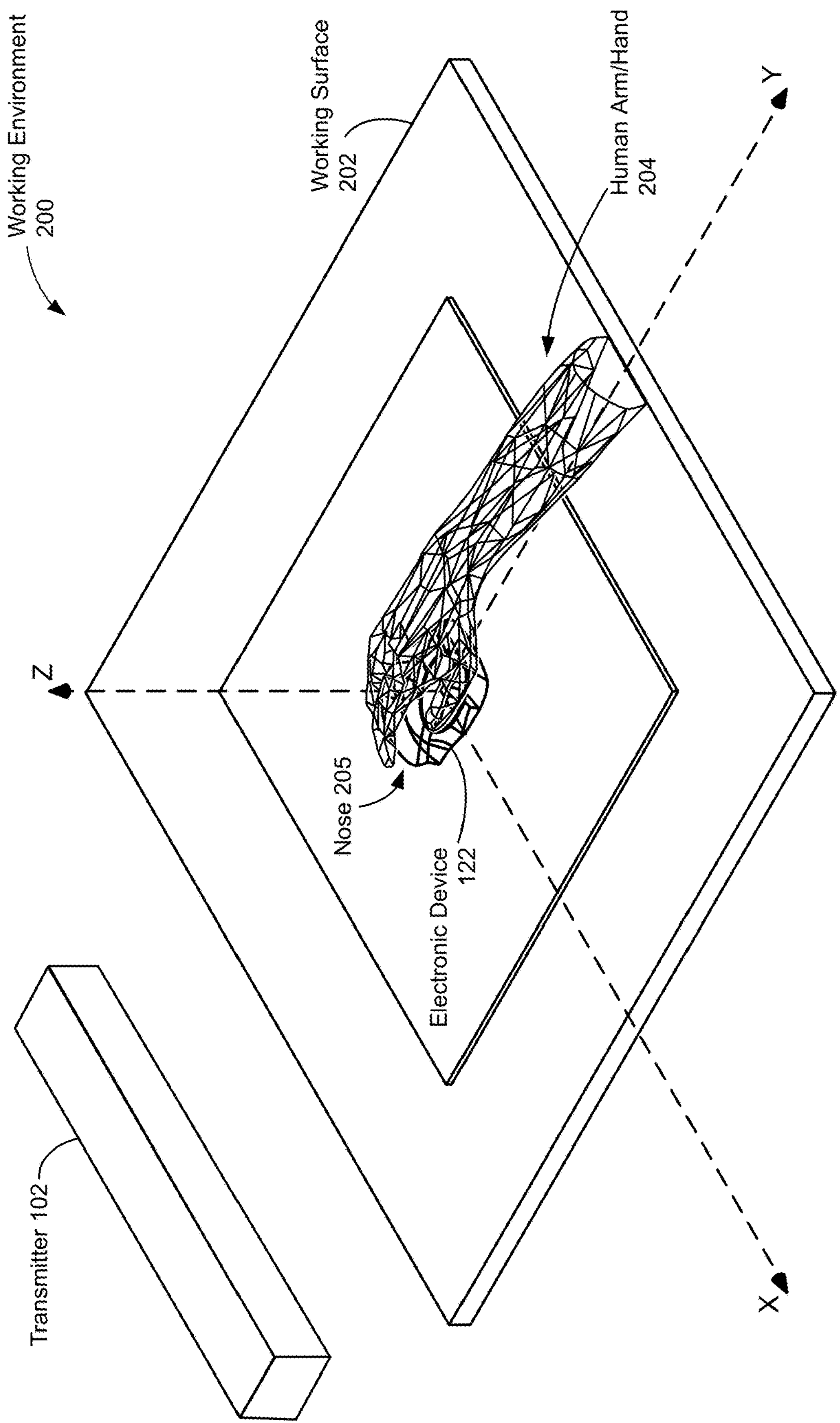
FIG. 2 illustrates an example working environment in accordance with some embodiments.

FIG. 2 illustrates an example working environment 200 in accordance with some embodiments. The example working environment 200 includes an electronic device 122 (e.g., a peripheral device, such as a computer mouse) coupled with a receiver 120 (not shown). The example working environment 200 also includes a transmitter 102 that is configured to transmit wireless power waves (e.g., power waves 116) to the receiver 120 coupled in the electronic device 122. The working environment 200 also shows the electronic device 122 positioned on a working surface 202. The electronic device 122 is configured to traverse (e.g., slide) on the working surface 202 (e.g., computer mouse traversing a mouse pad). The working environment 200 also includes a human arm/hand 204 positioned on the electronic device 122 (e.g., a human hand operates a personal computer using a computer mouse).

Various embodiments of the antenna 124 are illustrated and described below. For example, a first embodiment of the antenna 124 is illustrated and described with reference to FIGS. 3A to 5C. A second embodiment of the antenna 124 is illustrated and described with reference to FIGS. 6A to 7C.

A third embodiment of the antenna 124 is illustrated and described with reference to FIGS. 8A to 9B. The first, second, and third embodiments of the antenna 124 are designed to be integrated with (e.g., embedded in or attached to) existing electronic devices, such as a computer mouse. Furthermore, the first, second, and third embodiments of the antenna 124 are designed to maintain a satisfactory operating efficiency even in the presence of the human body (e.g., when a human hand is in contact with a housing of an electronic device in which the antenna 124 is integrated). While not shown, the other components (e.g., power converters 126, receiver sensors 128, communications component 144, etc.) of the receiver 120 can also be integrated with (e.g., embedded in or attached to) the electronic device 122.

First Embodiment—Loop Antenna

Figure 3A:
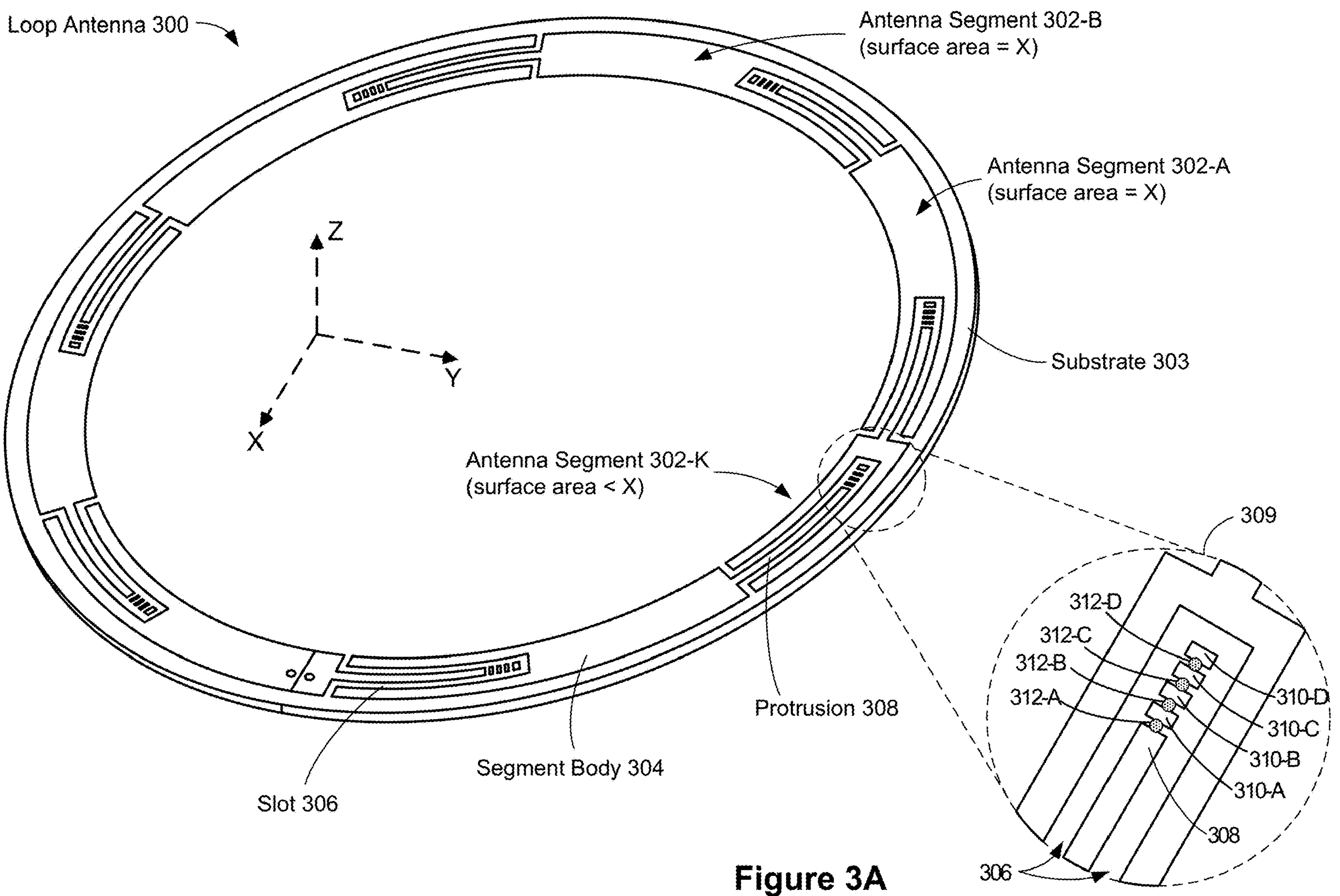
FIGS. 3A-3B show different views of a loop antenna minimally affected by the presence of the human body in accordance with some embodiments.

FIG. 3A shows an isometric view of a loop antenna 300 that is minimally affected by the presence of the human body (e.g., a human hand that is in contact with a housing of an electronic device with which the loop antenna 300 is integrated) in accordance with some embodiments. Put another way, the loop antenna 300 maintains a satisfactory level of efficiency (e.g., greater than 50%) when, e.g., a human hand is in contact with the electronic device 122 (i.e., in close proximity of the loop antenna 300). As shown, the loop antenna 300 includes a plurality of segments 302-A, 302-B, etc. (also referred to herein as "antenna segments," "antenna elements," "radiating elements," and "radiators") forming a loop. The segments 302 can be attached to a substrate 303, and the substrate 303 is configured for integration with an electronic device 122, such as a computer mouse, remote control, etc. For example, a computer mouse, as shown in FIG. 2, has a housing with a first surface (e.g., a top surface) shaped for a palmar surface of a user's hand 204 and a second surface (e.g., a bottom surface), opposite the first surface, to translate on the working surface 202. The substrate 303 can form at least a part of the second surface, and thus, the loop antenna 300 is located as far as possible from the human hand 204. A primary advantage of this arrangement is that a human hand does not substantially detune the antenna (i.e., the electromagnetic waves 116 transmitted by the transmitter 102 are minimally affected by the human hand).

Each segment 302 (e.g., antenna element) includes a segment body 304 with first and second opposing ends, a slot 306 (also referred to herein as a "female component") extending from the first end into the segment body 304 (i.e., the segment body 304 defines the slot 306), and a protrusion 308 (also referred to herein as a "male component") extending from the second end away from the segment body 304. Furthermore, the protrusion 308 of a first segment (e.g., segment 302-A) of the plurality of segments is positioned within the slot 306 defined by a second segment (e.g., segment 302-B) of the plurality of segments (and the same is true for the other segments). Put plainly, each protrusion is mated with a corresponding slot of a neighboring segment. The interlocking arrangement of the segments 302 creates the "loop" of the loop antenna 300. Notably, a respective protrusion 308 does not contact the neighboring segment when mated with the corresponding slot 306 of the neighboring segment. The non-contiguous design of the loop antenna 300 allows for the loop antenna 300 to be omnidirectional and radiate at the desired frequency, as explained below. In some embodiments, the loop antenna has a total length of about a half wavelength (e.g., if the loop antenna is operating at 900 MHz, then the loop antenna has a total length of approximately 166.5 millimeters).

By using these specifically shaped segments (e.g., the slot-protrusion configuration in an oval-planar design), the loop antenna 300 is configured to operate as an omnidirectional antenna (e.g., the loop antenna 300 can receive RF power waves coming from any direction). In contrast, typical loop antennas operate as boresight antennas (e.g., a directional antenna where maximum gain is along a certain axis). However, a boresight antenna would not perform well on the electronic device 122 of FIG. 2 as it rotates during usage (e.g., user turns his or her computer mouse left and right during use), and therefore, the electronic device 122 is not always positioned or pointing along the "boresight" (i.e., the axis of maximum gain). Thus, an omnidirectional antenna is desired for working environments such as that depicted in FIG. 2, in which the omnidirectional antenna disclosed here is integrated with an electronic device, such as a computer mouse. The omnidirectional capabilities of the loop antenna 300 are at least two-fold: (i) distinct conductive loads are formed at each segment as a result of the plurality of segments being adjacent yet separate, and (ii) the specifically shaped segments create a uniform current around the entire loop antenna 300.

As noted above, the loop antenna 300 is configured to receive electromagnetic waves that are polarized in a direction that is substantially parallel (within +/−25 to 35 degrees of parallel) to a plane of the loop antenna 300 (e.g., horizontally-polarized waves for the loop antenna 300 integrated with the electronic device 122 depicted in FIG. 2). A current on a wire creates an electromagnetic field around it with its polarization in the direction of the wire. Given the reciprocity theorem, an electromagnetic field polarized along the direction of a wire will excite a current along the wire. The loop can be seen as a circular/oval wire that will be excited by electromagnetic waves that are polarized in any direction along the plane of the loop. If the polarization is perpendicular to the plane of the loop, however, then no current will be excited on the metallic loop and therefore no energy is received by the antenna.

Each of the antenna elements 302 has a similar shape (e.g., each antenna element/segment has (i) a segment body, (ii) a female component, and (iii) a male component), but sizes of the antenna segments 302 are not necessarily the same. For example, with reference to FIG. 3A, each of the segments 302 has the same shape (e.g., segment 302-A has the same shape as segment 302-B), except for segment 302-K. Segment 302-K is positioned at a "nose" of the electronic device 122, and thus, segment 302-K is intended to be the closest segment to the transmitter 102. As shown, segment 302-K's shape is similar to the other segments, but it is substantially smaller relative to the other segments (e.g., a body 304 of the segment 302-K is smaller relative to respective bodies 304 of other segments 302 shown in FIG. 3A). As such, the segment closest to the transmitter 102 has the least amount of material, and in this way, the loop antenna 300 increases its gain in the direction of the transmitter 102 (i.e., the loop antenna is biased in the direction of the transmitter 102). "Nose" refers to a forward-facing portion of the electronic device that is pointing towards the wireless-power-transmitting device depicted in FIG. 2. An example of the "nose" 205 is shown in FIG. 2.

In contrast, designers of conventional loop antennas used in wireless telecommunications systems are not typically concerned with increasing antenna gain in the direction of a transmitting device. In some instances, this is because wireless communication signals are low power signals (relative to the higher-power signals used in wireless charging applications) and, importantly, a general location of the transmitting device is not predetermined. Therefore, antennas (e.g., some conventional loop antennas) used in wireless telecommunications systems are designed to receive communication signals (e.g., cellular signals, BLUETOOTH signals, etc.) in an omnidirectional fashion and without having an increased gain in any particular direction. The loop antenna 300 described herein is designed to have this feature, namely an increased gain in the direction of the transmitter 102. In addition, as detailed below, the loop antenna 300 includes tuning elements allowing the loop antenna 300 to account for a mismatch of the antenna 300 introduced by a human hand contacting the housing of the electronic device in which the loop antenna 300 is integrated. By designing the loop antenna 300 with these advantageous characteristics specific to wireless-power-transfer applications (e.g., incorporating tuning elements and ensuring that increased gain is in the direction of the transmitter), the inventors have designed the loop antenna 300 to help enable the safe transmission of wireless power in the working environment 200 described herein.

The loop antenna 300 has an added advantage of not obstructing existing/common components of the electronic device 122. In embodiments in which the electronic device 122 is a computer mouse, such a computer mouse has a light source (e.g., a light-emitting diode, LED) to detect movement of the mouse relative to a surface (e.g., the working surface 202). The light source is thus critical to the mouse's operation, and therefore, any component attached to a computer mouse cannot obstruct the light source. The loop antenna 300 is advantageous because the segments 302 are positioned along the substrate 303's perimeter, and thus, a light source (not shown) of the computer mouse 122 positioned in a central portion of the substrate 303 is not obstructed by the loop antenna 300. As such, the computer mouse's basic design and operation is unhindered by the disclosed loop antenna 300.

In some embodiments, one or more of the segments 302 include tuning elements (shown in magnified view 309) configured to adjust an operating frequency of the antenna 300. In the illustrated embodiment, each segment 302 includes one or more respective tuning elements 310 positioned at the end of the segment's protrusion 308. The tuning elements 310 (e.g., metallic portions/strips) can be used to adjust the operating frequency of the loop antenna 300 by connecting a respective tuning element to the respective protrusion 308, either directly, as is the case with the tuning element 310-1, or indirectly via one or more other tuning elements 310, thereby creating an electrical short across the respective tuning element(s), and modifying an overall length of the respective protrusion 308, and in turn, an area of the loop antenna 300.

The magnified view 309 of FIG. 3A illustrates connections 312 between tuning elements 310 and the respective protrusion 308. For ease of discussion below, connections 312-A-312-D are electrical switches that may include one or more transistors or diodes that selectively couple one or more of the tuning elements to the respective protrusion 308. The connections could also be metal deposits, such as solder. For example, the tuning elements may be manufactured without a connection to an antenna segment and one or more of the tuning elements may be connected to (e.g., or disconnected from) by soldering a connection (e.g., or removing a soldered connection) to connect (e.g., or disconnect) the tuning element to the antenna element.

With reference to magnified view 309, electrical switches 312-A-312-D are disposed between the respective protrusion 308 and tuning elements 310-A-310-D. In some embodiments, each electrical switch 312 is switchably coupled to one of the tuning elements 310-A-310-D. In some embodiments, the switches 312-A-312-D are controlled by a controller (e.g., processor 140) of the receiver 120, and the controller may adjust an operating frequency of the antenna 300 by connecting one of the tuning elements 310-A-310-D with the respective protrusion 308 through corresponding switches. For example, the loop antenna 300 has a first operating frequency when the first tuning element 310-A is connected with the respective protrusion 308 through switch 312-A, the antenna 300 has a second operating frequency, different from the first operating frequency, when the first and second tuning elements 310-A, 310-B are connected with the respective protrusion 308 through switches 312-A and 312-B, and so on. Although not shown, the tuning elements associated with the other antenna segments 302 may also include the same arrangement shown in the magnified view 309.

In light of the above, in some embodiments, the receiver 120 can adjust the operating frequency of the loop antenna 300 using one or more sets of tuning elements shown in FIG. 3A. In this way, the antenna 300's operating frequency and/or bandwidth can be adjusted in response to, e.g., detecting the presence of the hand 204 near the antenna 300 (e.g., when the hand is placed in contact with a housing of the electronic device 122) introducing a slight miss-match and de-tuning of the antenna 300. In some embodiments, the level of adjustment is approximately +/−15 MHz (although greater and lesser ranges are possible). For example, increasing a length of the respective protrusion 308 by connecting one or more of the tuning elements 310 to the respective protrusion 308 down tunes the loop antenna 300 (i.e., lowers the operating frequency).

Figure 3B:
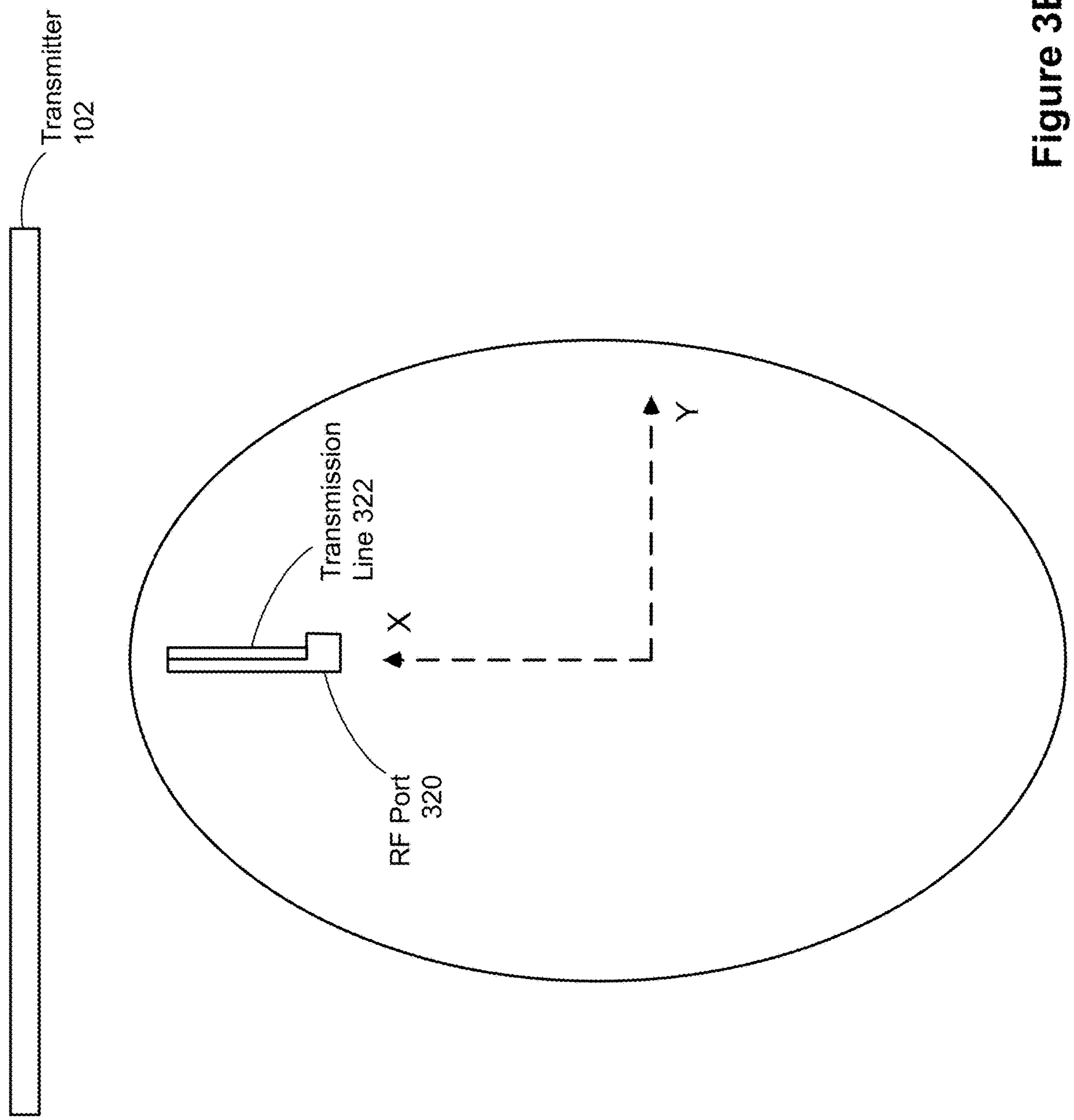

FIG. 3B illustrates a backside of the substrate 303 in accordance with some embodiments. As shown, the backside of the substrate 303 includes a radio frequency (RF) port 320 and a transmission line 322. The transmission line 322 is coupled to a portion of the loop antenna 300. Specifically, in the illustrated embodiment, the transmission line 322 is coupled to the segment 302-K of the loop antenna 300. As discussed above, the segment 302-K is the smaller segment of the loop antenna 300. Smaller antenna segments support stronger currents and therefore, connecting the transmission line 322 to segment 302-K increases the collected power. The transmission line 322 could be potentially connected to any of the segments, and oriented in any direction, but orienting it towards the nose of the electronic device 122 and the transmitter 102 enhances the received power. Thus, because the transmission line 322 is at the nose of the electronic device 122, the loop antenna 300's current is the highest at the nose of the electronic device 122 and in the direction of the transmitter 102. Such an arrangement further increases the loop antenna 300's gain in the direction of the transmitter 102.

Figure 4A:
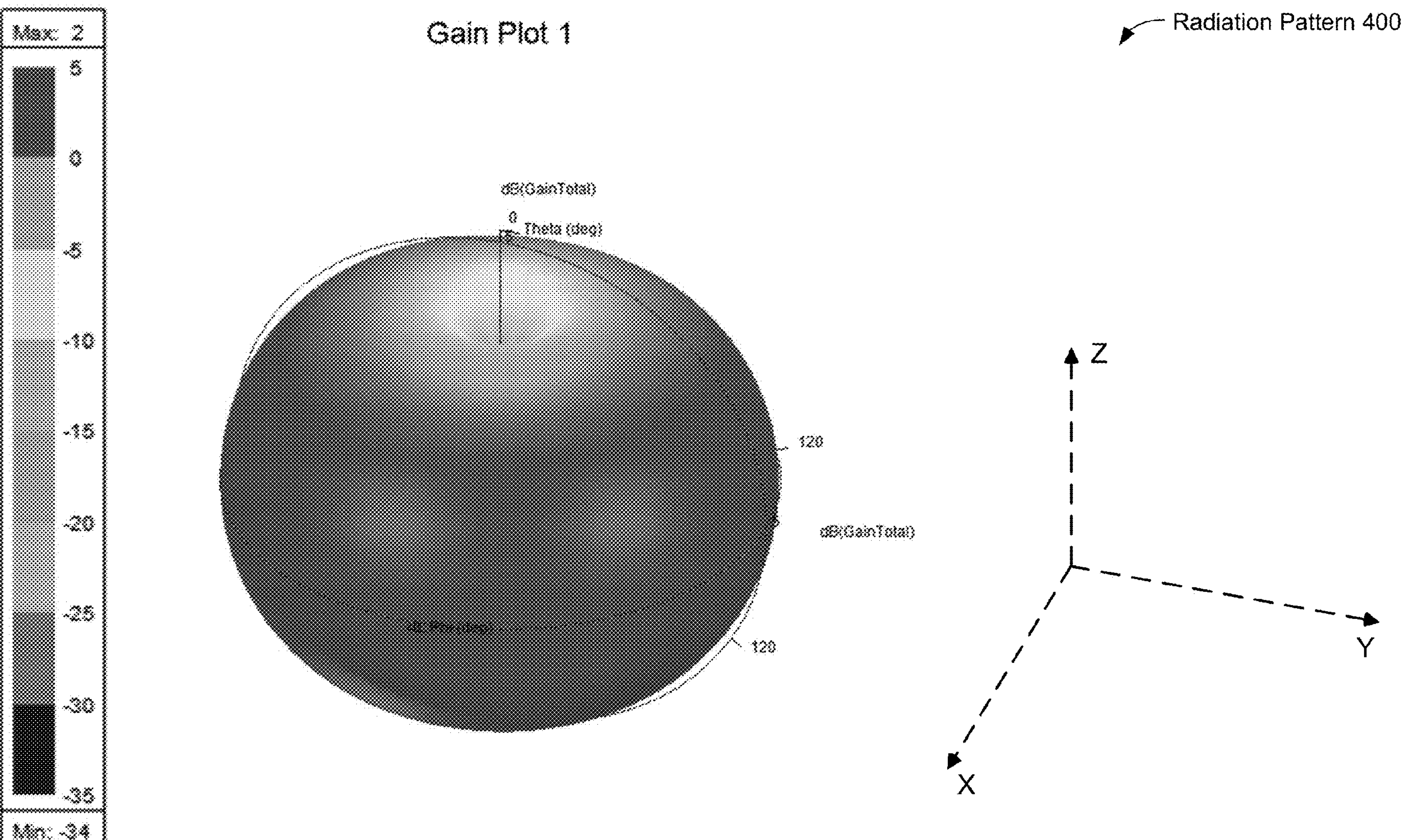
FIG. 4A illustrates a resulting radiation pattern produced by the loop antenna of FIGS. 3A-3B without the human body present in accordance with some embodiments.
Figure 4B:
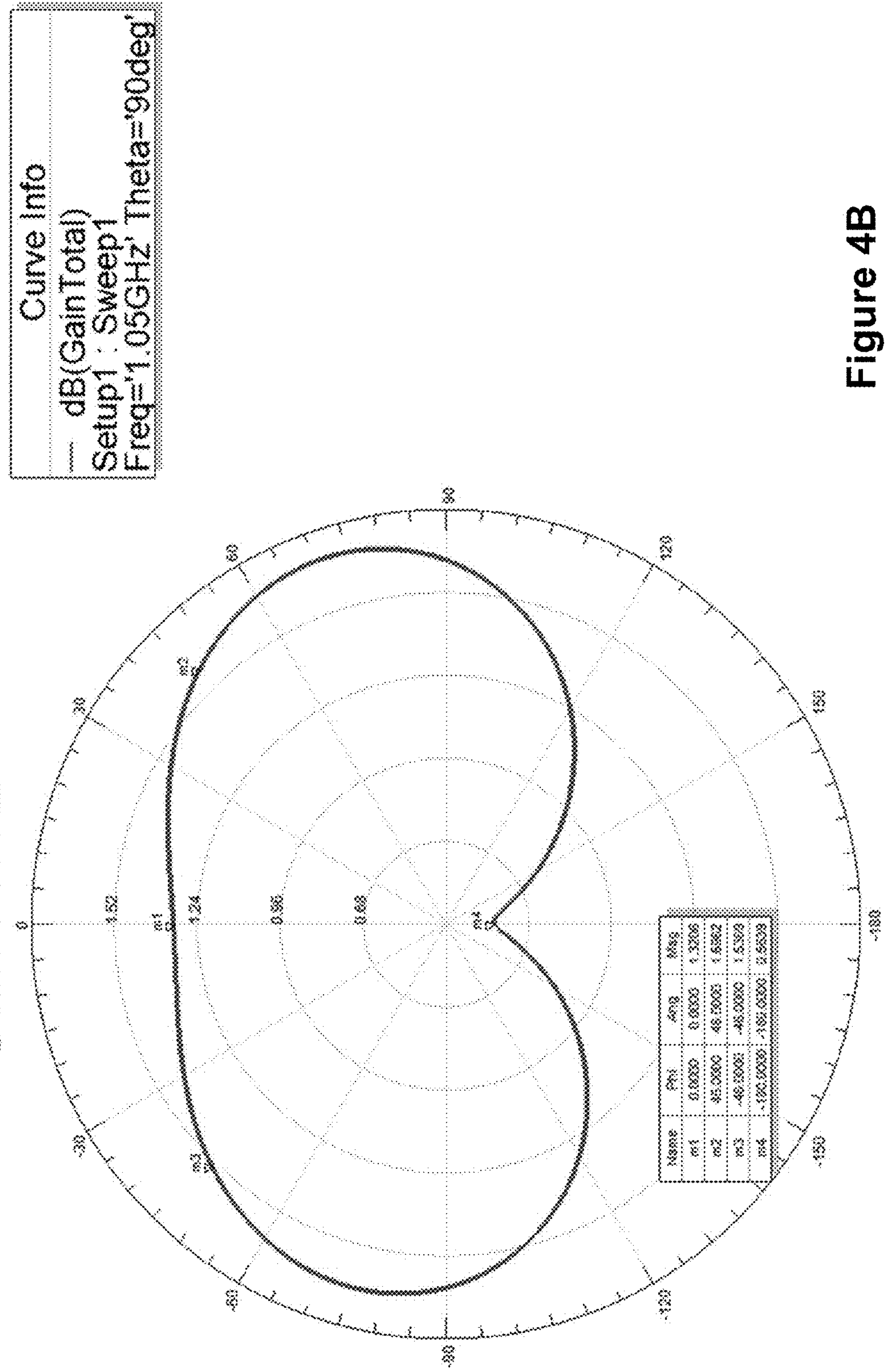
FIG. 4B illustrates a cross-sectional view of the resulting radiation pattern of FIG. 4A (taken along the X-Y plane shown in FIG. 4A), in accordance with some embodiments.
Figure 4C:
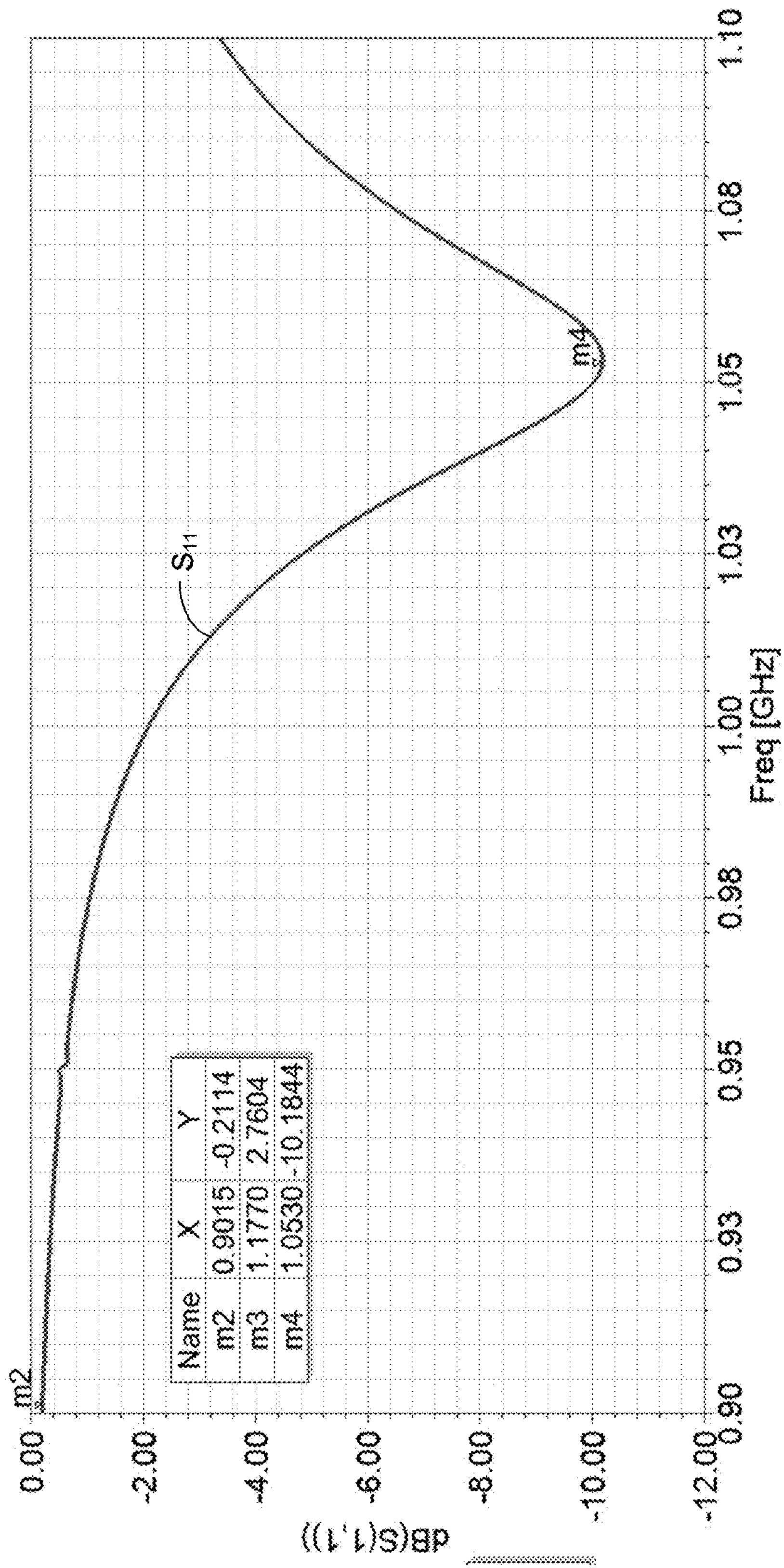
FIG. 4C illustrates a return loss graph for the loop antenna depicted in FIGS. 3A-3B in accordance with some embodiments.

FIG. 4A illustrates a radiation pattern 400 produced by an embodiment of loop antenna 300 shown in FIGS. 3A-3B without the human body present. As shown, the radiation pattern 400 is substantially omnidirectional, as discussed above. The loop antenna 300 is able to achieve, without the human body present near the loop antenna 300, an efficiency of approximately 94%. FIG. 4B illustrates a cross-sectional view 410 of the radiation pattern 400 (taken along the X-Y plane shown in FIG. 4A). The cross-sectional view 410 includes gain along the X-axis and gain along the Y-axis, and shows the substantially omnidirectional shape of the radiation pattern 400. Importantly, the loop antenna 300 radiates more energy forwards than backwards (e.g., towards a nose of the electronic device 122), and thus, the loop antenna 300 has a positive front-to-back ratio. FIG. 4C illustrates a return loss graph 420 for the loop antenna 300 depicted in FIGS. 3A-33, where the resonance frequency is about 1.05 GHz.

Figure 5A:
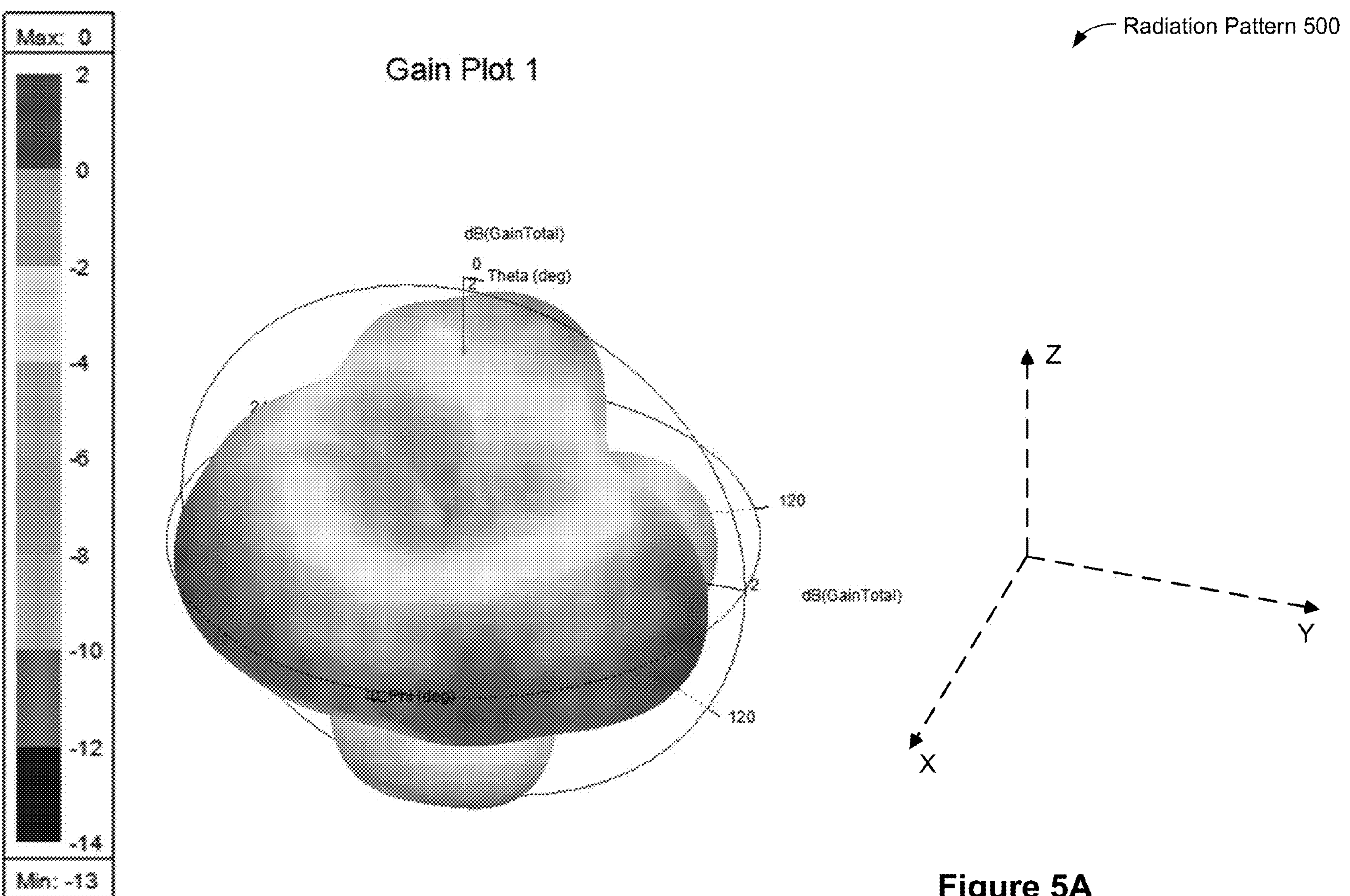
FIG. 5A illustrates a resulting radiation pattern produced by the loop antenna of FIGS. 3A-3B in the presence of the human body, in accordance with some embodiments.
Figure 5B:
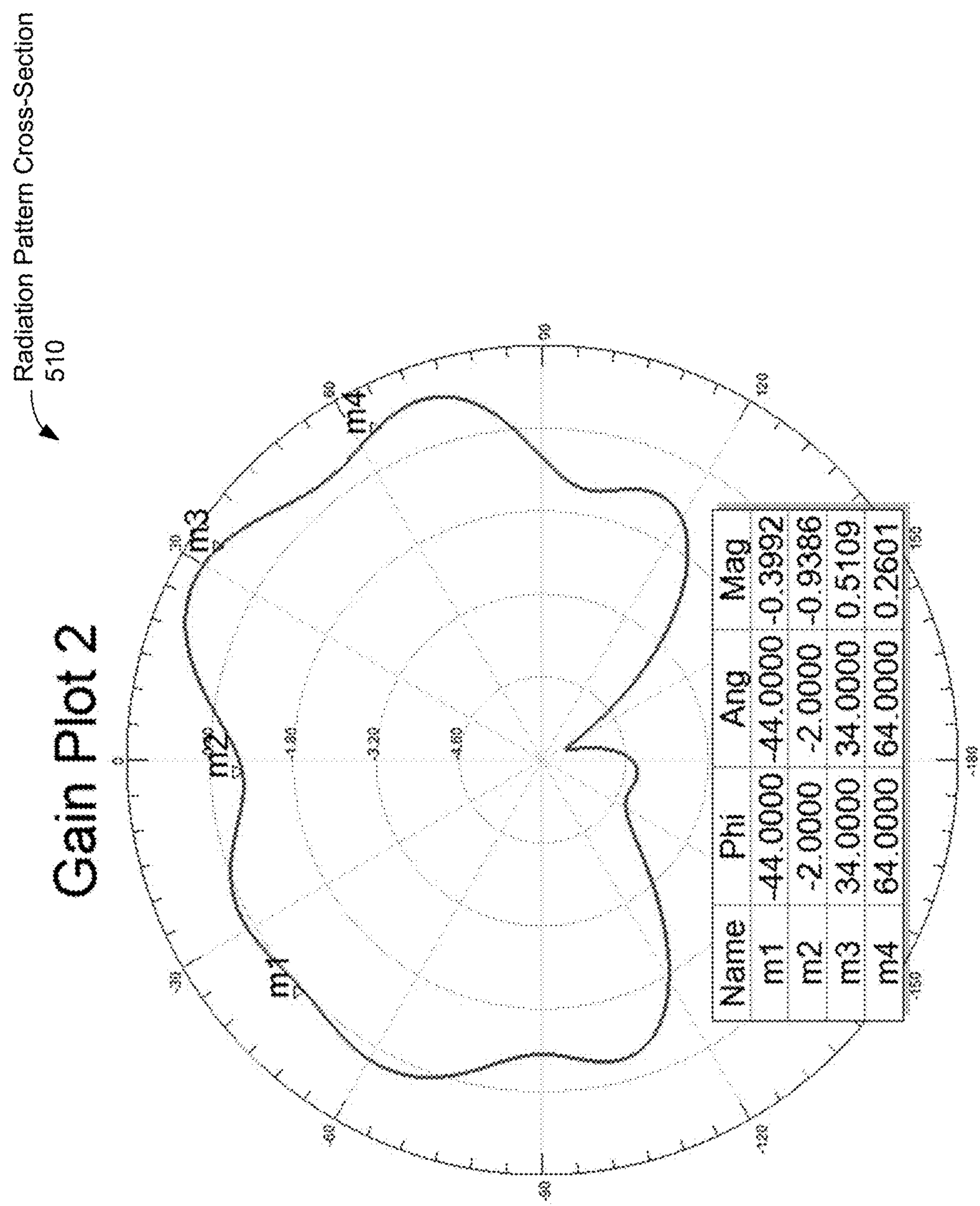
FIG. 5B illustrates a cross-sectional view of the resulting radiation pattern of FIG. 5A (taken along the X-Y plane shown in FIG. 5A), in accordance with some embodiments.
Figure 5C:
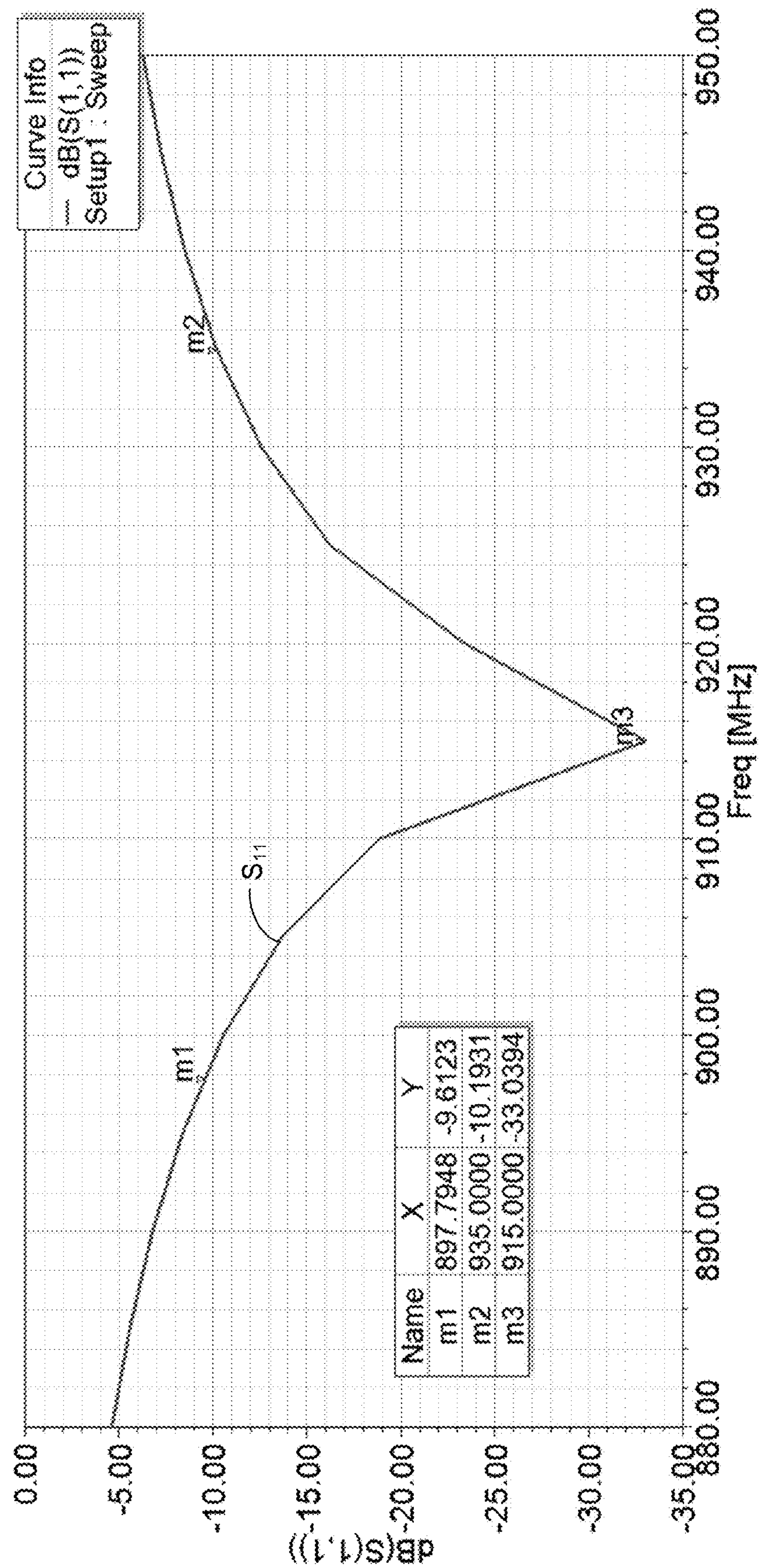
FIG. 5C illustrates a return loss graph for the loop antenna depicted in FIGS. 3A-3B in the presence of the human body, in accordance with some embodiments.

FIG. 5A illustrates a resulting radiation pattern 500 produced by an instance of the loop antenna 300 of FIGS. 3A-3B in the presence of the human body (e.g., when a user's hand is in contact with a housing of the electronic device 122 with which the loop antenna 300 is integrated). In this example, the radiation pattern 500 is influenced by the presence of the human hand 204. The radiation pattern 500 is still substantially omnidirectional, albeit less symmetrical relative to the radiation pattern 400. FIG. 5B illustrates a cross-sectional view 510 of the radiation pattern 500 (taken along the X-Y plane shown in FIG. 5A). The cross-sectional view 510 includes gain along the X-axis and gain along the Y-axis, and shows the substantially omnidirectional shape of the radiation pattern 500. Importantly, the loop antenna 300 radiates more energy forwards than backwards (e.g., towards a nose of the electronic device 122) in the presence of the human body, and thus, the loop antenna 300 maintains its positive front-to-back ratio. FIG. 5C illustrates a return loss graph 520 for the loop antenna 300 depicted in FIGS. 3A-3B in the presence of the human body. The curve $S_{11}$ shows the antenna return loss, indicating that the antenna 300 is down-tuned (relative to the return loss graph 420) due the presence of the human body and now working at the desired frequency. The presence of the hand (e.g., when a human hand is in contact with the electronic device) also enhances the bandwidth and provides better matching at the expenses of lower radiation efficiency since there is resistive matching.

Second Embodiment—Stack Antenna

Figure 6A:
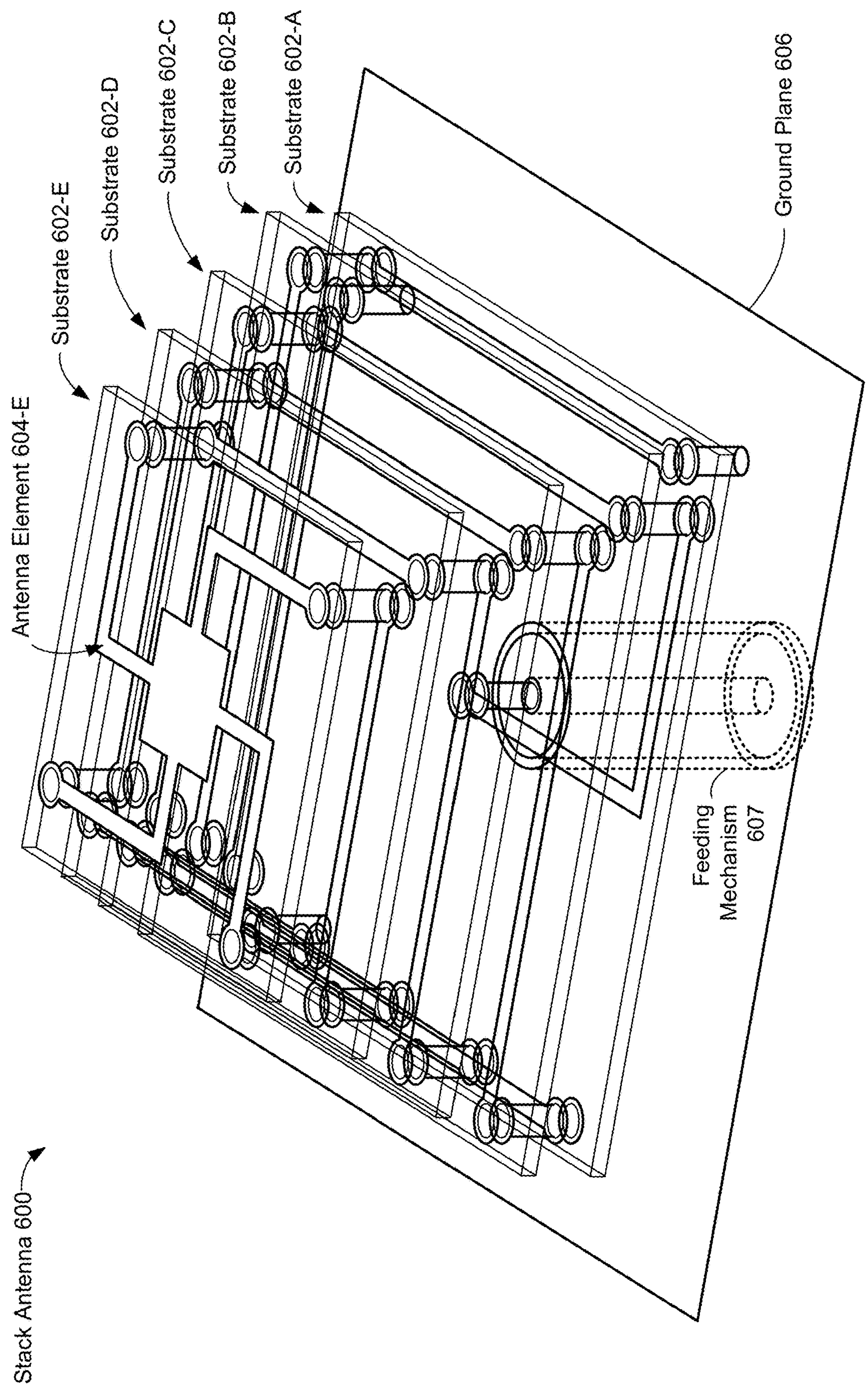
FIGS. 6A-6C show different views of a stack antenna minimally affected by the presence of the human body in accordance with some embodiments.

FIG. 6A shows an isometric view of a stack antenna 600 that is minimally affected by the presence of the human body in accordance with some embodiments. Put another way, the stack antenna 600 maintains a satisfactory level of efficiency (e.g., greater than 50%) when, e.g., a human hand is in contact with the electronic device. The stack antenna 600 is designed to be miniaturized so that it can be integrated with (e.g., embedded in), if desired, an electronic device, such as a computer mouse, remote control, etc. In the illustrated embodiment, the stack antenna 600 includes a plurality of substrates 602-A-602-E that form a pyramidal frustum (substrates 602 are transparent for ease of discussion and illustration). The pyramidal-frustum shape allows the stack antenna 600 to fit inside various electronic devices 122. For example, a computer mouse may include a cavity defined in a bottom-half of the mouse, and the stack antenna 600 may fit inside said cavity (whereas a rectangular cuboid may not fit). In this way, the stack antenna 600 can be concealed inside the electronic device 122, and also located as far as possible from the human hand 204. Like the loop antenna 300, a primary advantage of this arrangement is that a human hand does not substantially detune the antenna (i.e., the electromagnetic waves 116 transmitted by the transmitter 102 are minimally affected by the human hand).

Each substrate 602 includes a respective antenna element 604 that is configured to receive RF power waves 116 transmitted from the transmitter 102. In particular, due to the stacked design of the antenna 600 (and the interconnecting of antenna elements between substrate layers by metal rods 610), the antenna elements 604 are configured to receive RF power waves having a particular polarization. Specifically, the antenna 600 is designed to received waves that are polarized in a direction that is substantially perpendicular to a plane of each of the substrates 602. Thus, when the substrates 602 are horizontally oriented (e.g., aligned along a horizontal plane, as shown in FIG. 6A), the antenna elements 604, in combination with the metal rods 610, are configured to receive vertically polarized RF power waves.

As shown in FIG. 6A, the antenna element 604-E has a four-prong (e.g., four-arm) design, where each prong meanders away from a central patch 615. It is noted, however, that a surface area (and design) of respective antenna elements 604 may differ depending on a position of the antenna element within the stack. For example, antenna elements 604 higher in the stack have smaller surface areas relative to surface areas of antenna elements 604 lower in the stack (e.g., lower antenna elements 604 have longer prongs relative to prongs of higher up antenna elements). By using these specifically shaped antenna elements 604, the stack antenna 600 is an omnidirectional antenna. As explained above with reference to the loop antenna 300, an omnidirectional antenna is desired for the disclosed application because the electronic device 122 moves and rotates left and right during usage. Example designs of each antenna element 604-A-604-E are shown in FIGS. 6D-6H.

The stack antenna 600 further includes a feeding mechanism 607 (e.g., a coaxial cable or any other type of connector, microstrip line, coplanar line, or any other feed line). A feed line of the feeding mechanism 607 may be connected to one of the antenna elements 604 (e.g., antenna element 604-A of the substrate 602-A). Furthermore, the feed line can be isolated from the ground plane 606 by a dielectric included in the feeding mechanism 607.

As explained below with reference to FIG. 6B, each antenna element 604 includes a plurality of prongs (or arms) 609 (e.g., at least two prongs 609). For example, each antenna element 604 illustrated in FIGS. 6A and 6B has four prongs 609 (greater or lesser number of prongs can also be used). In some embodiments, for each antenna element 604: (i) a first prong of the plurality of prongs 609 is connected, either directly or indirectly, to the feed line of the feeding mechanism 607, and (ii) the one or more other prongs of the plurality of prongs 609 are connected, either directly or indirectly, to the ground plane 606. Alternatively, in some embodiments, for each antenna element 604: (i) a first set of prongs of the plurality of prongs 609 is connected, either directly or indirectly, to the feed line of the feeding mechanism 607, and (ii) a second set of prongs, different from the first set of prongs, of the plurality of prongs 609 is connected, either directly or indirectly, to the ground plane 606.

Figure 6B:
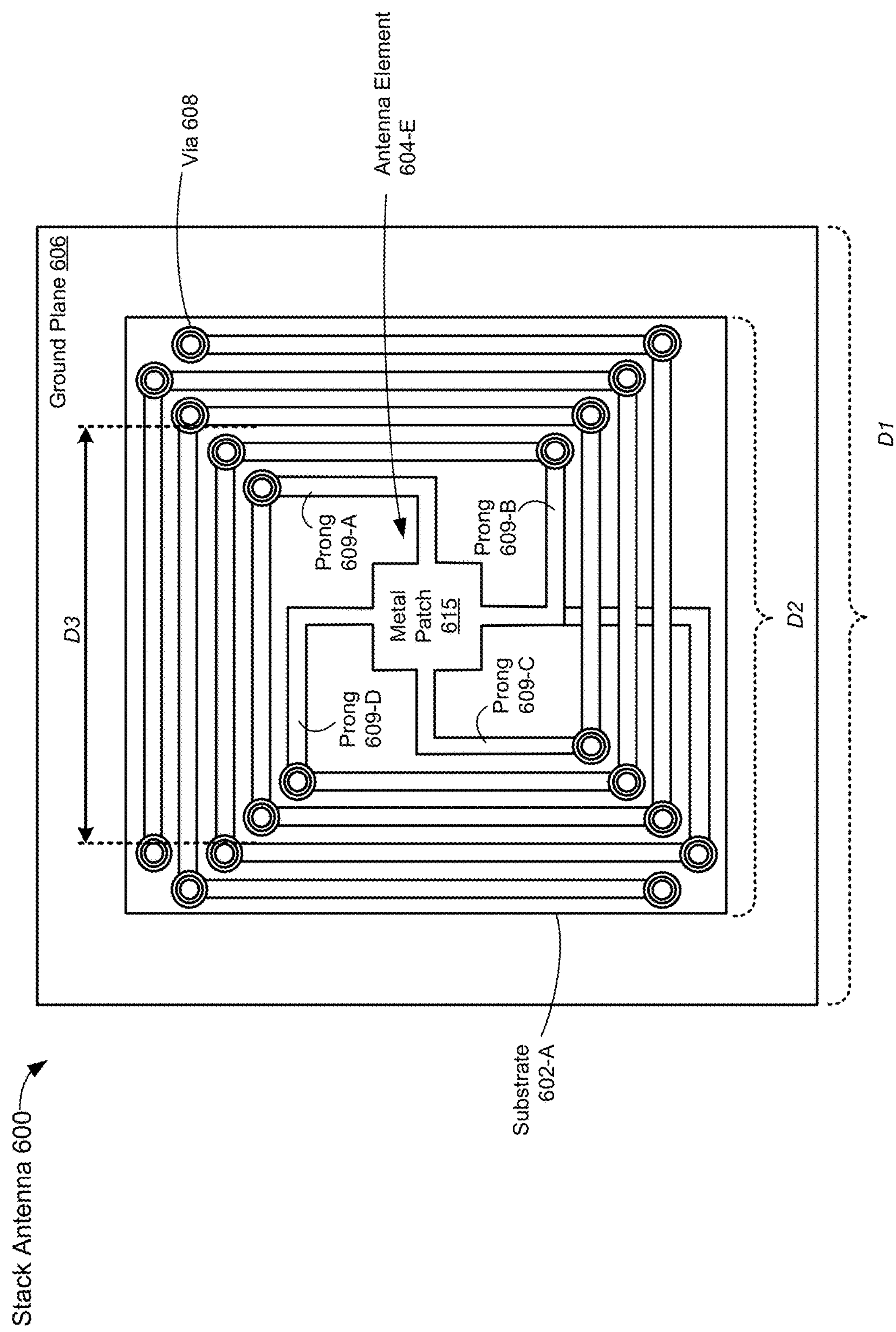

FIG. 6B shows a top view of the stack antenna 600 in accordance with some embodiments. For ease of illustration, borders/perimeters of individual substrates 602 are not shown in FIG. 6B, except for the border of substrate 602-A. As shown, the antenna element 604-E, which is attached to the substrate 602-E, includes four prongs 609-A-609-D that extend and meander away from a central patch 615 (e.g., a metal patch). Various meandering paths can be used, and the meandering paths shown in FIGS. 6A and 6B with perpendicularly-oriented segments are merely one set of possible paths. For example, the four prongs 609-A-609-D may also follow meandering paths with additional perpendicular segments, and/or the meandering paths may be curved. The meandering paths are used, among other things, to increase an effective length the antenna element 604, thus resulting in a lower resonant frequency of the antenna 600 while reducing an overall size of the antenna 600. In doing so, the antenna 600 can be sufficiently miniaturized (e.g., the stack antenna 600, when operating at approximately 915 MHz can have the following example dimensions (approximately): D1=36 mm, D2=27 mm, D3=17 mm, D4=15 mm (FIG. 6C), and D5=3 mm (FIG. 6C)). Further, each substrate 602 may have a thickness of approximately 0.025 mm. It is also noted that a surface area of the central patch 615 can be adjusted to tune an impedance of the antenna 600. In some embodiments, the other antenna elements 604 do not follow a meandering path per se, as shown with reference to FIGS. 6E-6H. Nevertheless, a path followed by the other antenna elements 604 still increases an effective length of the antenna element 604.

In some embodiments, each substrate 602 has a rectangular shape. However, in some other embodiments, each substrate 602 has a circular, hexagonal, triangular, etc. shape. Additionally, in some embodiments, at least one substrate 602 has a shape that differs from the shapes of the other substrates 602. The central patch 615 may also have a circular, hexagonal, triangular, etc. shape.

Figure 6C:
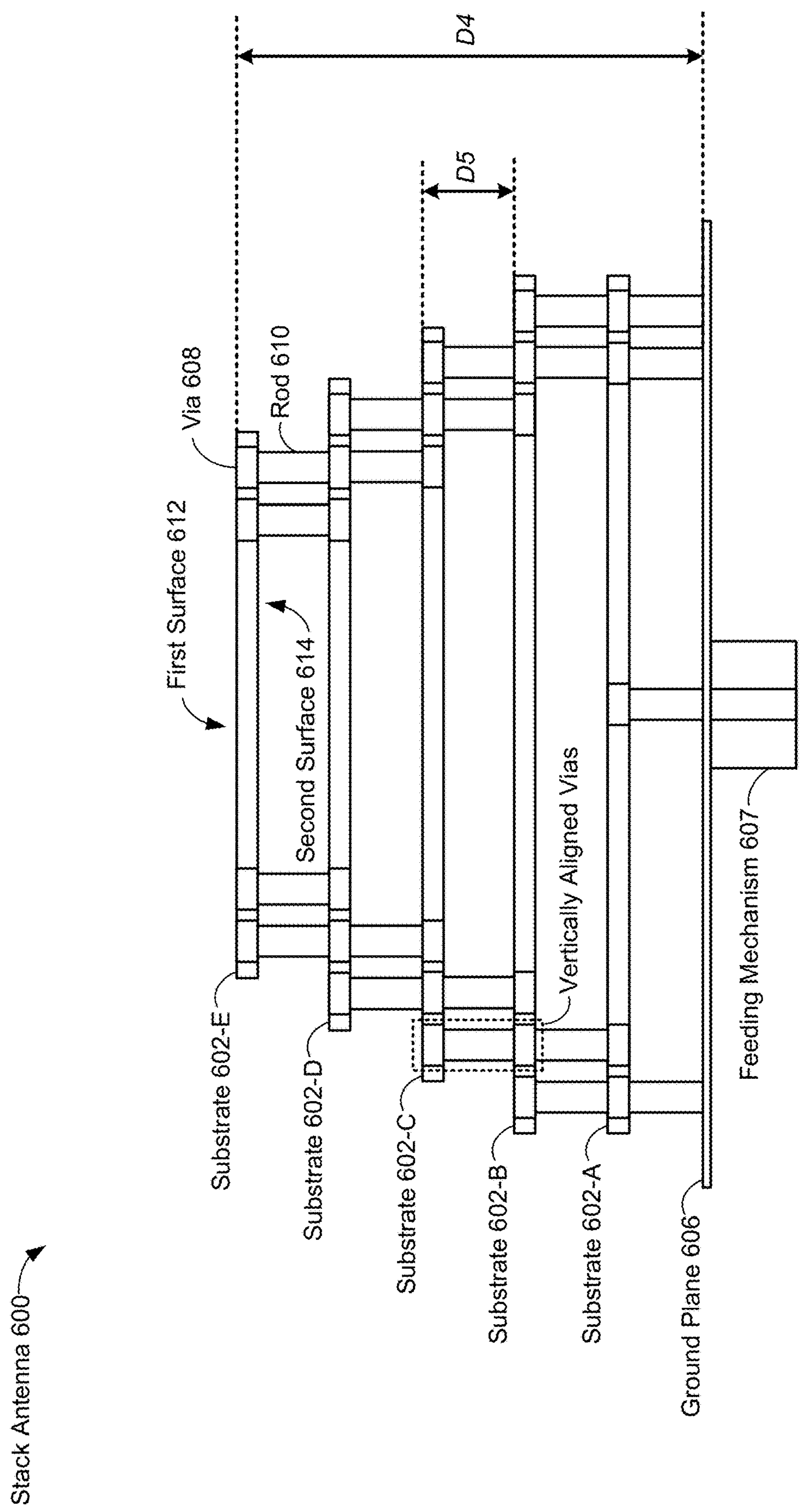
Figure 6D:
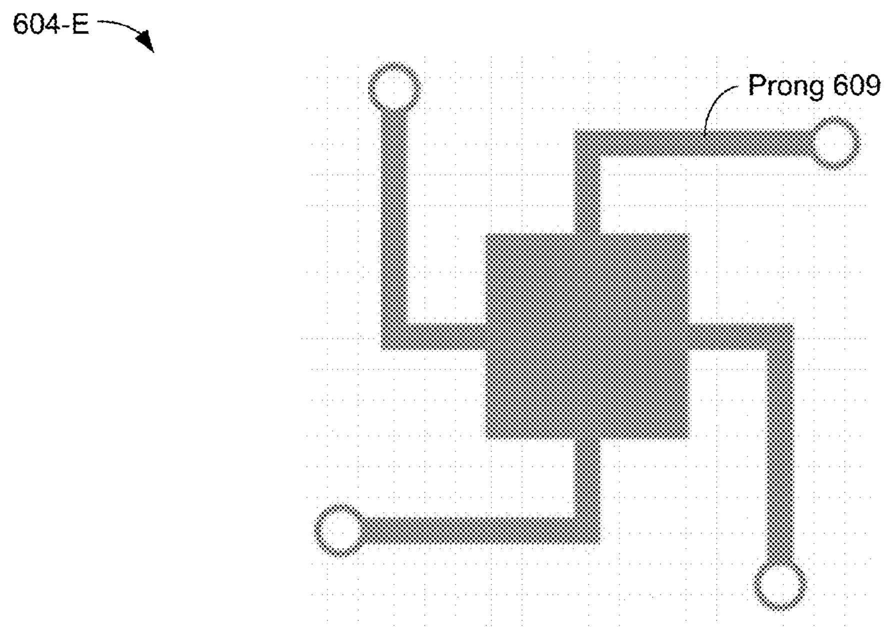
FIGS. 6D-6H show example designs of each antenna element included in the stack antenna depicted in FIGS. 6A-6C.
Figure 6E:
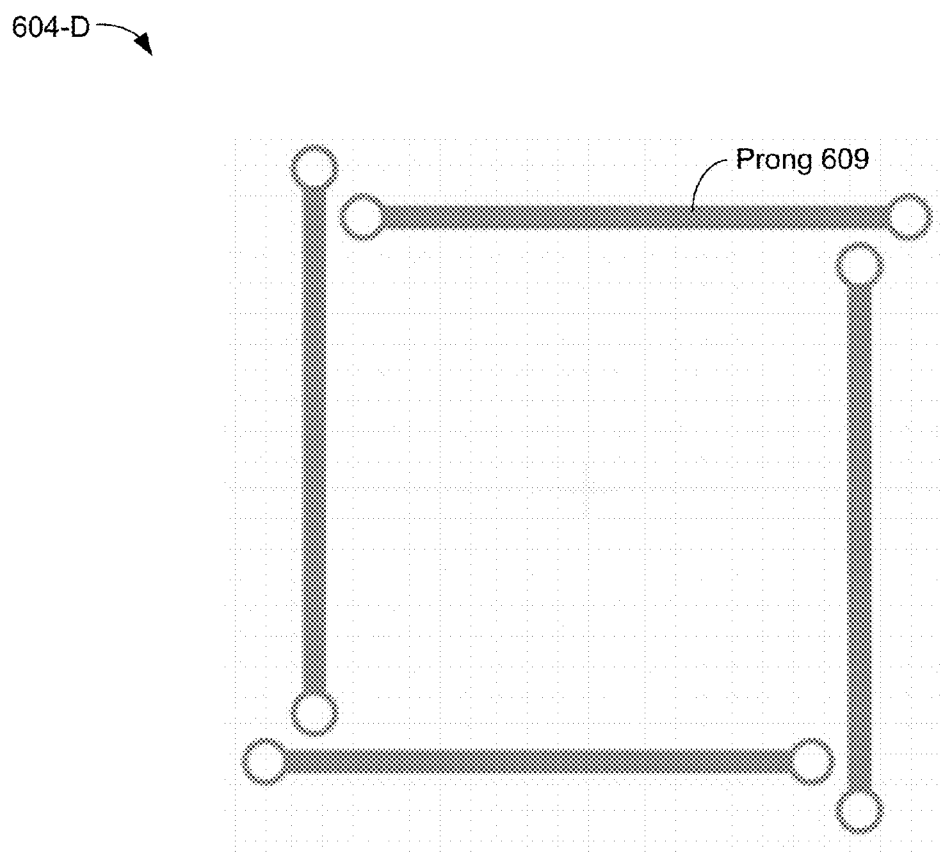
Figure 6F:
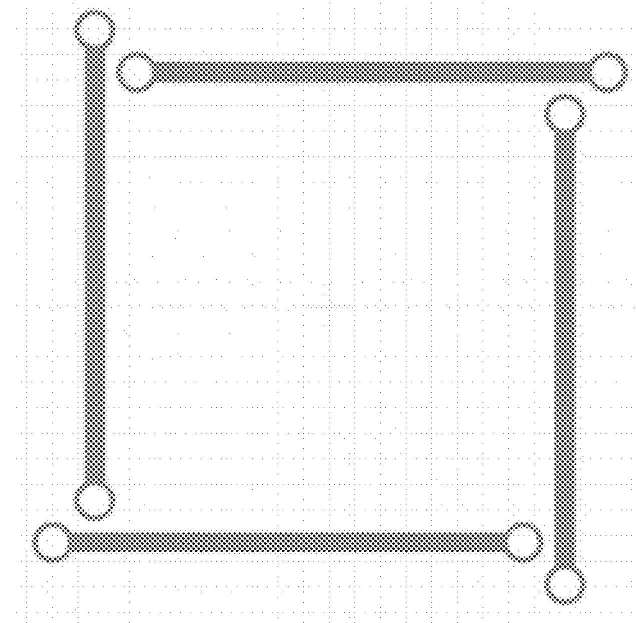
Figure 6G:
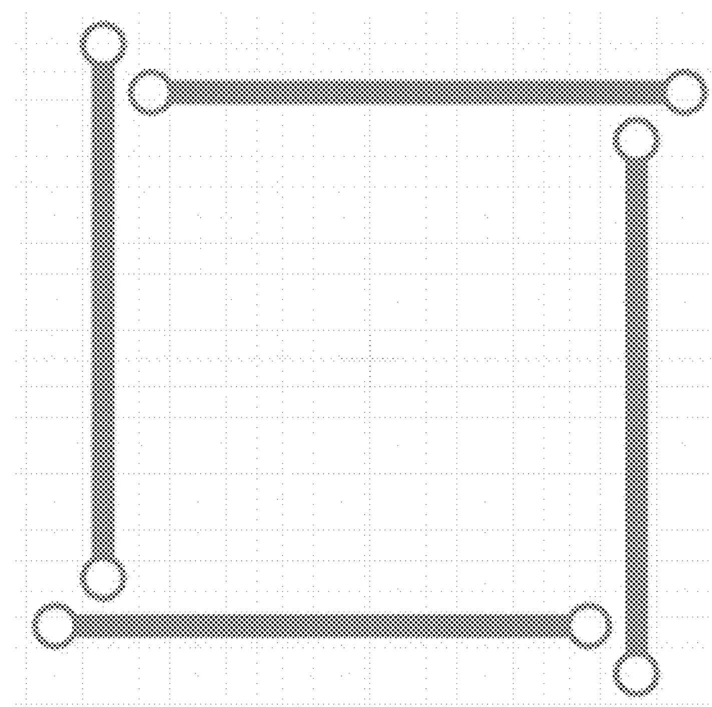
Figure 6H:
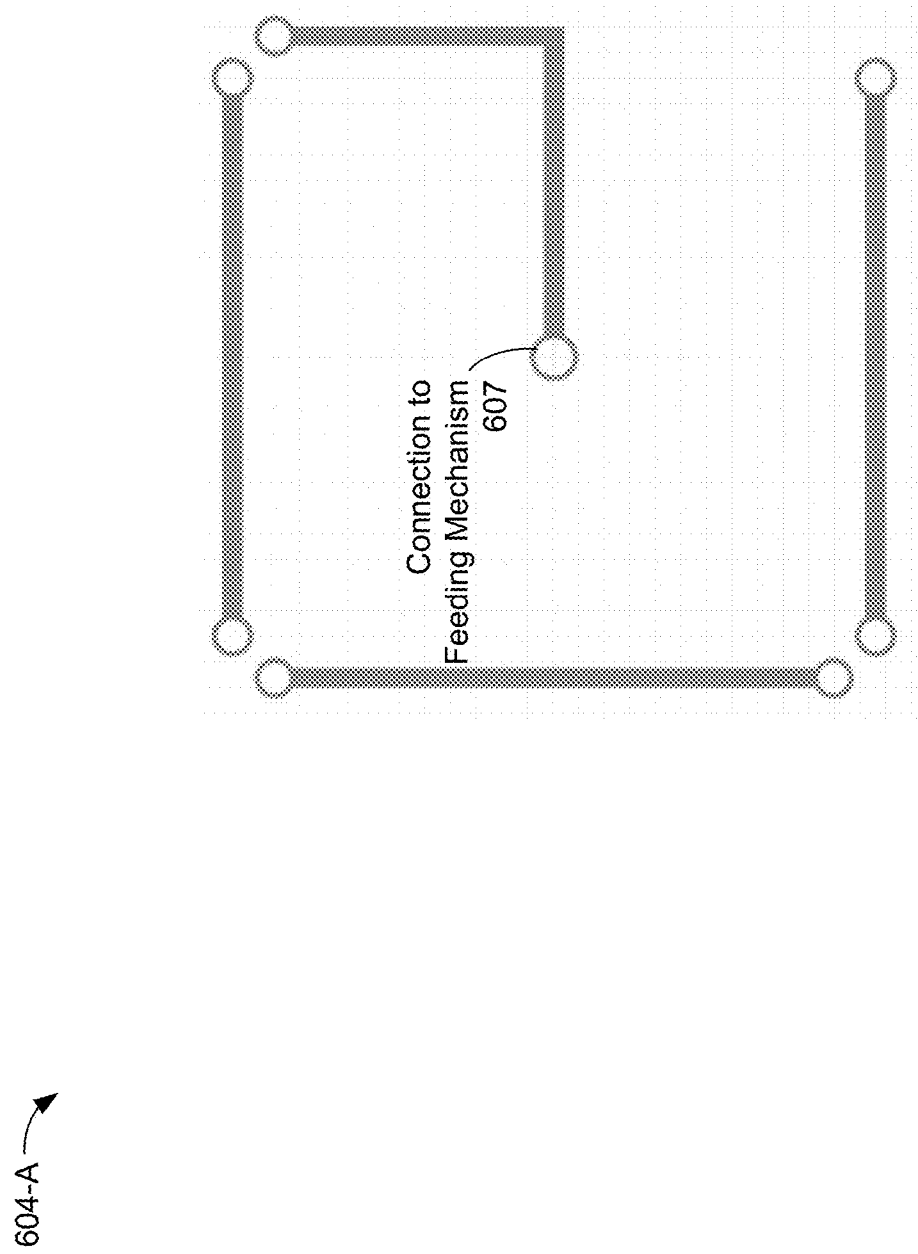

In some embodiments, each substrate 602 includes a plurality of vias 608 positioned at respective ends (or end portions) of the antenna element 604. For example, the substrate 602-E in FIG. 6B includes four vias 608 positioned at respective ends (or end portions) of its four-pronged antenna element 604. In some embodiments, one or more of the vias 608 of a first substrate 602 is/are vertically aligned with one or more of the vias 608 of a second substrate 602, where the first substrate 602 is the substrate directly above the second substrate 602 (e.g., dotted box in FIG. 6C showing vertical alignment of vias defined by neighboring substrates). Due to this alignment, FIG. 6B does not show all the vias 608 included in the antenna 600. Vias are discussed in further detail below with reference to FIG. 6C.

FIG. 6C shows a side view of the stack antenna 600 in accordance with some embodiments. While not shown in FIG. 6C, each antenna element 604 is positioned on a first surface 612 of its associated substrate 602. The stack antenna 600 includes metal rods 610 positioned between neighboring substrates (or substrate 602-A and the ground plane 606). Specifically, a set of metal rods 610 is used to separate and support neighboring substrates 602. For example, the substrate 602-E is separated from the substrate 602-D by a first set of metal rods, the substrate 602-D is separated from the substrate 602-C by a second set of metal rods, and so on. The metal rods 610 of the stack antenna 600 help to impart desired polarization to the antenna 600 (e.g., a vertical polarization when the antenna is oriented within a housing of a computer mouse that is positioned on a flat surface, such as the electronic device 122 of FIG. 2). The operating frequency of the antenna 600 can also be tuned by changing the length of the metal rods 610 (i.e., the distance between adjacent substrates).

The number of metal rods 610 in a set corresponds to the number of prongs 609 included in a respective antenna element 604. In the illustrated embodiments, each antenna element 604 has four prongs 609, and therefore, each set of metal rods 610 has four rods. It is noted that greater (or lesser) number of prongs may be defined by a respective antenna element 604. In such instances, the number of rods 610 in the set would change accordingly. The metal rods 610 can be considered part of the antenna elements 604 (e.g., the metal rods 610 can also receive electromagnetic waves transmitted by the transmitter 102).

As shown in FIG. 6C, each via 608 extends through its associated substrate 602 (e.g., via 608 labeled in FIG. 6C extends from the first surface 612 of the substrate 602-E to (and through) a second surface 614 of the substrate 602-E). In this way, a first end of each via 608 (at least in some instances) is connected to an end portion of a respective antenna prong 609, and a second end of each via 608 is connected to a metal rod 610, which is in turn connected to an end portion of another antenna prong 609 on a neighboring substrate 602. In this configuration, the antenna elements 604 are interconnected, and thus, RF power waves 116 received by, say, antenna element 604-E can travel through each of the other antenna elements 604 to be collected by the feed mechanism 607's feed line.

To provide some clarity, a "via" as used herein is a metal deposit filling an opening defined by a substrate. The disclosed vias facilitate electrical connections at both surfaces 612, 614 of a substrate. In contrast, a metal rod is distinct from the substrate. It is noted, however, that two vias and a metal rod can form a unitary component, at least in some embodiments.

As noted above, a first prong of the plurality of prongs 609 for each antenna element 604 is connected, either directly or indirectly, to the feed mechanism 607's feed line. To expand on this, each antenna element 604 has a respective first prong 609 (along with at least a second respective prong 609), and the respective first prongs 609 are interconnected with each other (e.g., by way of vias 608 and rods 610). For example, the first prong 609 of a first antenna element 604 of a first substrate 602 is connected to the first prong 609 of a second antenna element 604 of a second substrate 602 (and so on if additional substrates are included in the antenna 600). Thus, the respective first prongs 609 and the interconnecting metal rods 610 in the antenna 600 form a meandering path with first segments (e.g., the first prongs 609) defined in a first dimension (e.g., defined in a horizontal plane) and second segments (e.g., the metal rods 610) defined in a second dimension (e.g., defined in a vertical plane). As such, the antenna 600 includes multiple, continuous conductive paths (i.e., antenna elements) that extend from the bottom to the top of the antenna 600. This arrangement allows the antenna 600 to receive electromagnetic waves using a small electrical volume.

In some embodiments, an operating frequency of the antenna 600 corresponds, at least in part, to a magnitude of D5 (e.g., a separation distance between neighboring substrates 602 of the antenna 600). As such, in order to adjust the operating frequency of the antenna 600, a length of the metal rods 610 can be increased or decreased as needed.

In some embodiments, antenna 600 is designed as a printed antenna (e.g., metal deposited/printed on a substrate). In other embodiments, the antenna 600 can also be a stamped metal design, where the antenna elements 604 are on air (i.e., the substrates 602 are optional).

FIGS. 6D-6H show the individual antenna elements 604 of the stack antenna 600 shown in FIG. 6A. These individual antenna elements 604 are provided for additional context and for explanatory purposes only (other antenna element designs would be appreciated by one of skill in the art upon reading this disclosure). The antenna elements 604 are illustrated sequentially in FIGS. 6D-6H from top to bottom of the stack antenna 600 (e.g., antenna element 604-E is at a top of the stack antenna 600 and antenna element 604-A is at a bottom of the stack antenna 600). Stated another way, FIGS. 6D-6H illustrate antenna elements 604 respectively included on each of the substrates 602 of the stack antenna 600, and FIGS. 6D-6H depict these antenna elements beginning from substrate 602-E and down to substrate 602-A.

Figure 7A:
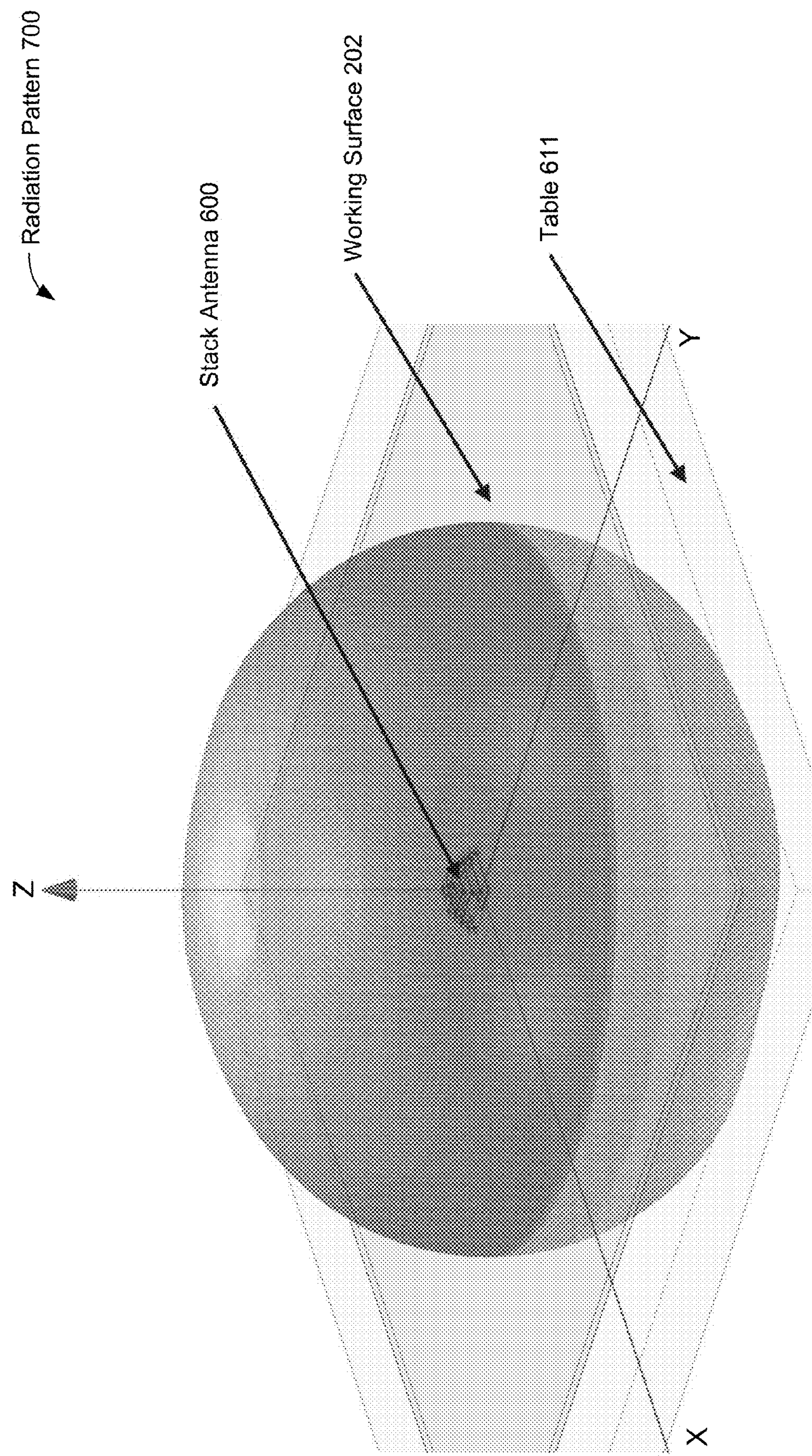
FIG. 7A illustrates a resulting radiation pattern produced by the stack antenna of FIGS. 6A-6C in accordance with some embodiments.
Figure 7B:
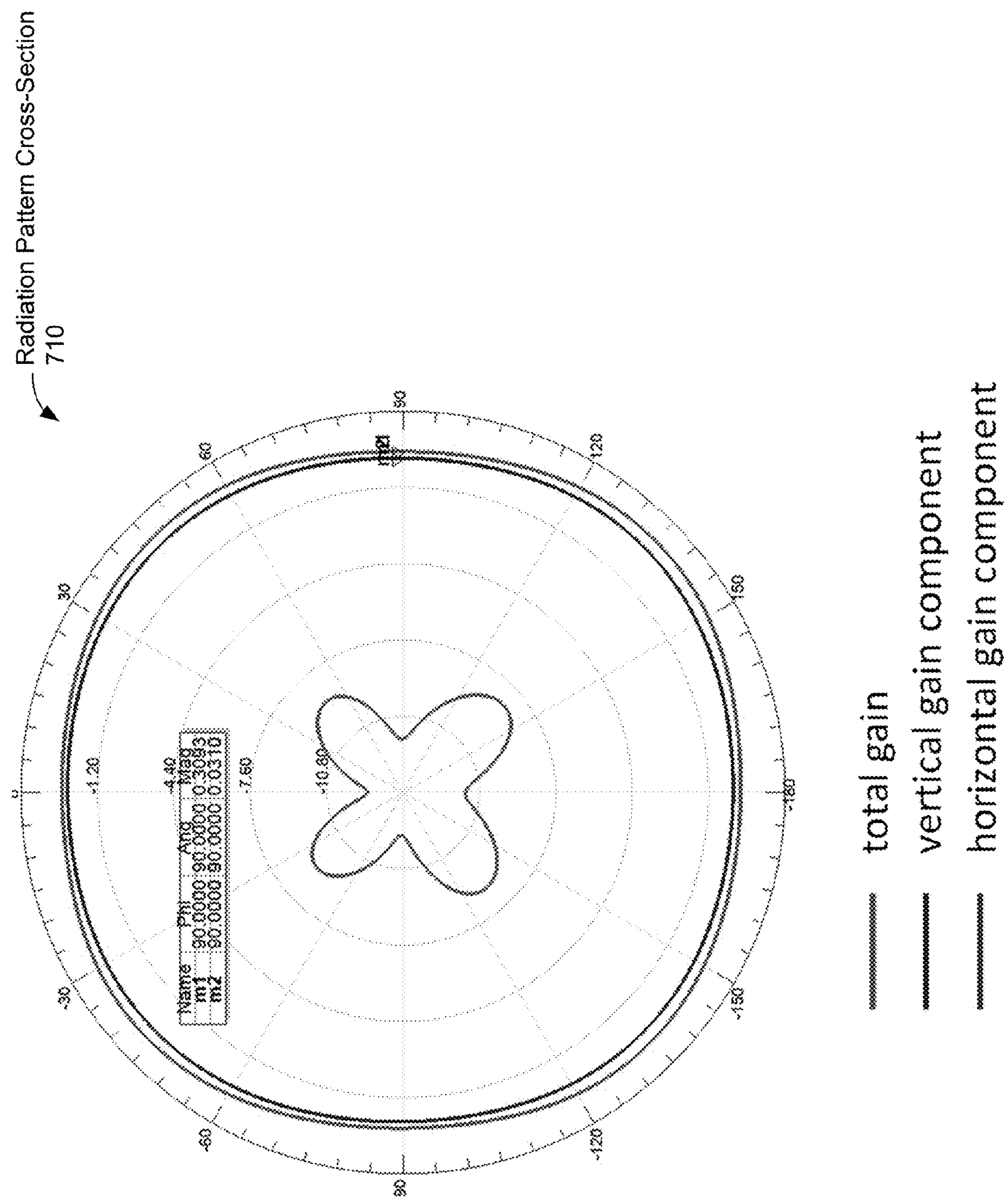
FIG. 7B illustrates a cross-sectional view of the resulting radiation pattern of FIG. 7A (taken along the X-Y plane shown in FIG. 7A), in accordance with some embodiments.
Figure 7C:
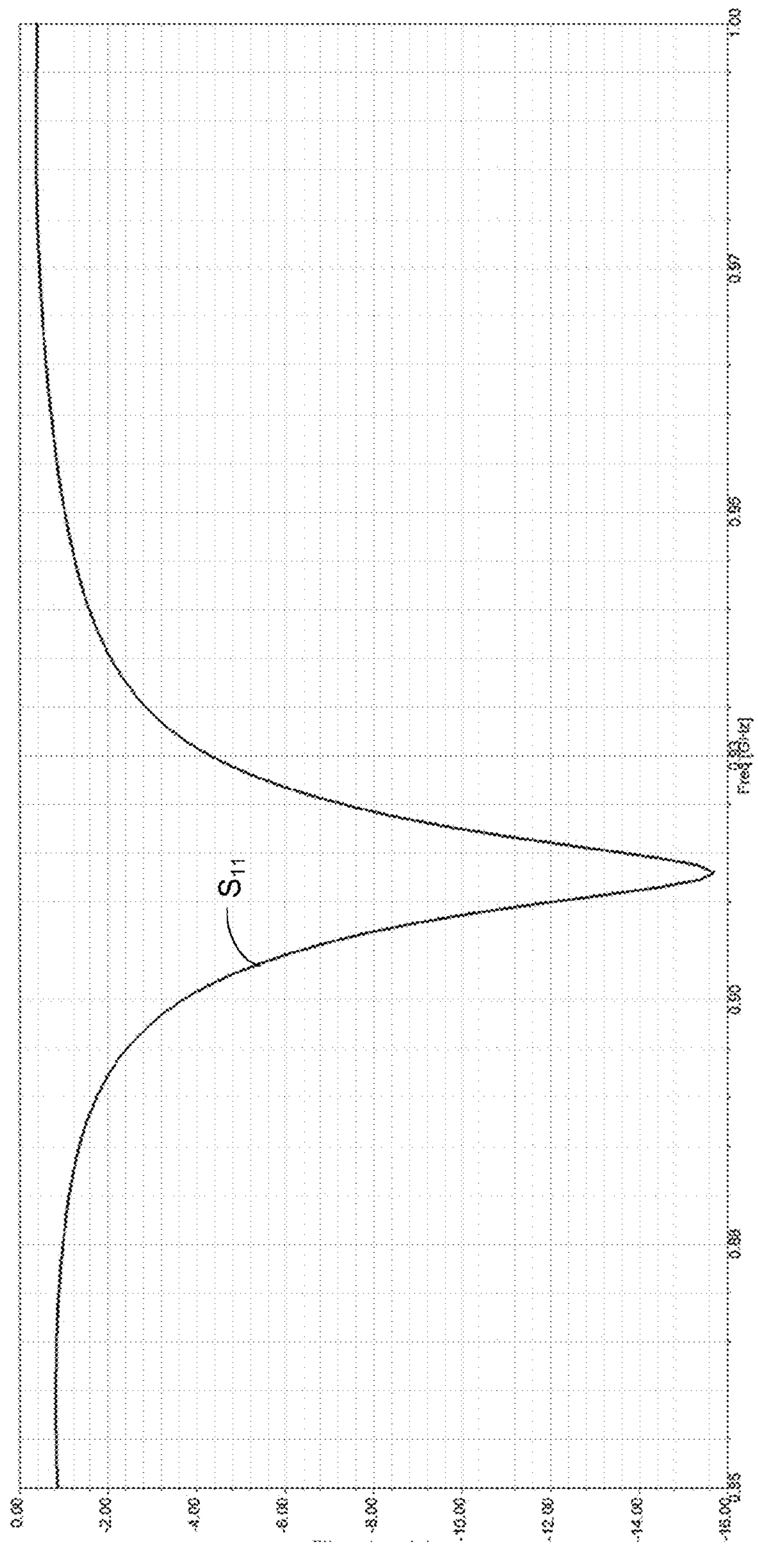
FIG. 7C illustrates a return loss graph for the stack antenna depicted in FIGS. 6A-6C in accordance with some embodiments.

FIG. 7A illustrates a radiation pattern 700 produced by an embodiment of stack antenna 600 shown in FIGS. 6A-6C when no human hand is in contact with an electronic device with which the stack antenna 600 is integrated (e.g., the stack antenna 600 is operating without presence of the human body). As shown, the radiation pattern 700 is substantially omnidirectional. FIG. 7B illustrates a cross-sectional view 710 of the radiation pattern 700 (taken along the XY plane shown in FIG. 7A). The cross-sectional view 710 includes gain along the X-axis and gain along the Y-axis, and shows the substantially omnidirectional shape of the radiation pattern 700. From FIG. 7B, it can be seen that the co-polarization (vertical) component is approximately 10 dB higher the cross-polarization (horizontal) component. FIG. 7C illustrates a return loss graph 720 for the stack antenna 600 depicted in FIGS. 6A-6C.

Third Embodiment—Loop-Slot Antenna

Figure 8A:
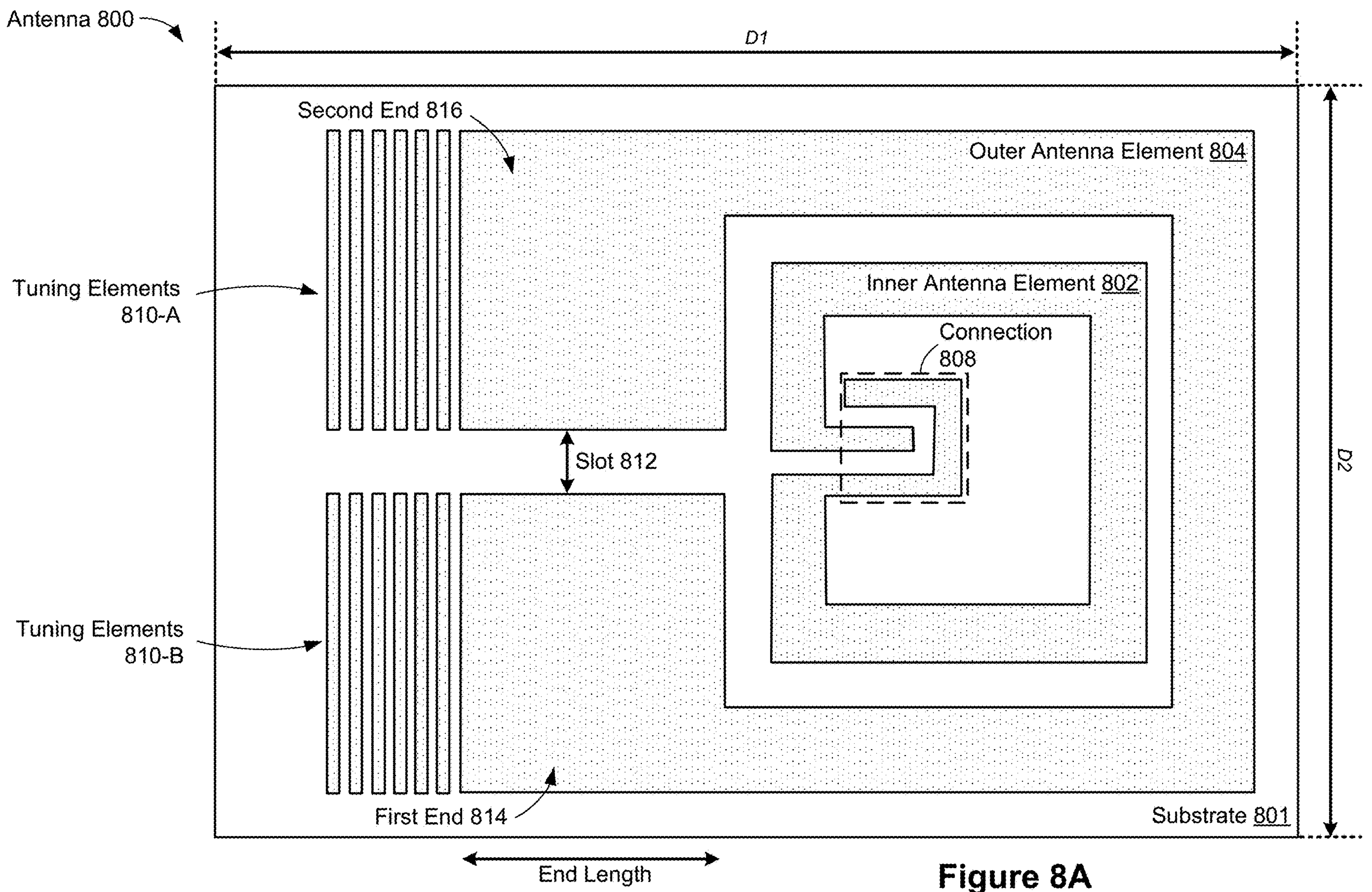
FIG. 8A shows a loop-slot antenna minimally affected by the presence of the human body in accordance with some embodiments.

FIG. 8A shows a top view of a loop-slot antenna 800 that is able to maintain a satisfactory level of efficiency (e.g., greater than 50%) when, e.g., a human hand is in contact with the electronic device. The loop-slot antenna 800 can be integrated with a planar surface of the electronic device 122. For example, a computer mouse can include a surface that contacts and traverses along the working surface 202 (i.e., a bottom of the electronic device 122), and the loop-slot antenna 800 may be attached to that surface. In this way, the loop-slot antenna 800 can be located as far as possible from the human hand 204. Thus, like the loop antenna 300, a primary advantage of this arrangement is that a human hand does not substantially detune the antenna (i.e., the electromagnetic waves 116 transmitted by the transmitter 102 are minimally affected by the human hand).

The loop-slot antenna 800 includes an inner antenna element 802, coupled to a transmission line, configured to receive horizontally polarized (polarization parallel to the plane of the antenna) electromagnetic power waves (e.g., RF power waves 116) from a wireless-power-transmitting device 102. As shown, the inner antenna element 802 forms an open loop (e.g., the inner antenna element 802 is not continuous). Ends of the inner antenna element 802 form a connection area 808 for connecting a transmission/feed line (not shown) with the antenna 800.

The loop-slot antenna 800 also includes an outer antenna element 804, separated from the inner antenna element 802, configured to receive horizontally polarized electromagnetic power waves (e.g., RF power waves 116) from the wireless-power-transmitting device 102. The outer antenna element 804 forms an open-loop and surrounds the inner antenna element 802. The outer antenna element 804 is an "open-loop" because ends 814, 816 of the outer antenna element 804 are separated by a slot 812. The coupling between the outer antenna element 804 and the inner antenna element 802 can be adjusted by changing a width of the slot 812 and lengths of the first and second ends 814, 816.

The loop-slot antenna 800 also includes first and second sets of tuning elements 810-A, 810-B positioned adjacent to the first and second ends 814, 816 of the outer antenna element 804, respectively. The first and second sets of tuning elements are configured to adjust the operating frequency of the antenna. In some embodiments, the first and second sets of tuning elements 810-A, 810-B provide a level of adjustment of up to 130 MHz (although greater and lesser values are possible depending on the number and size of the tuning elements). To provide some context, the presence of the hand 204 near the antenna 800 (e.g., when a human hand is in contact with the electronic device) can introduce a slight miss-match and de-tuning of the antenna 800. The antenna 800, however, can keep operating effectively at the design frequency by connecting one or more tuning elements, from the first and/or second sets of tuning elements, to the outer antenna element 804.

In the illustrated embodiment, the first and second ends 814, 816 of the outer antenna element 804 are adjacent to the first and second sets of tuning element 810-A, 810-B, respectively. The tuning elements 810 (e.g., metallic strips) can adjust the operating frequency of the antenna 800 by directly connecting a respective tuning element to a respective end 814, 816 of the outer antenna element 804, or indirectly via one or more other tuning elements, thereby creating an electrical short across the respective tuning element(s), and modifying an overall length of the outer antenna element 804, and in turn, an area of the outer antenna element 804. In some embodiments, one or more transistors or diodes (e.g., instances of connections 312-A-312-D, FIG. 3A) are positioned between each respective tuning element 810, and the one or more transistors or diodes are configured to selectively couple one or more of the tuning elements 810 to the outer antenna element 804. In other embodiments, one or more of the tuning elements 810 are connected to each other (and the outer antenna element 810) by metal deposits, such as solder. For example, the tuning elements 810 may be manufactured without any connections and one or more of the tuning elements may be connected (e.g., or disconnected from) by soldering a connection (e.g., or removing a soldered connection) to connect (e.g., or disconnect) the tuning element to the antenna outer element 810. Connections between tuning elements are discussed in further detail above with reference to FIG. 3A.

In some embodiments, the inner antenna element 802, the outer antenna element 804, and the one or more tuning elements 810 are coupled to a substrate 801. To provide some context, the substrate 801, when the antenna 800 is operating at approximately 915 MHz, can have the following dimensions (approximately): D1=40 mm and D2=30 mm. Further, the substrate 801 may have a thickness of approximately 0.5 mm.

Figure 8B:
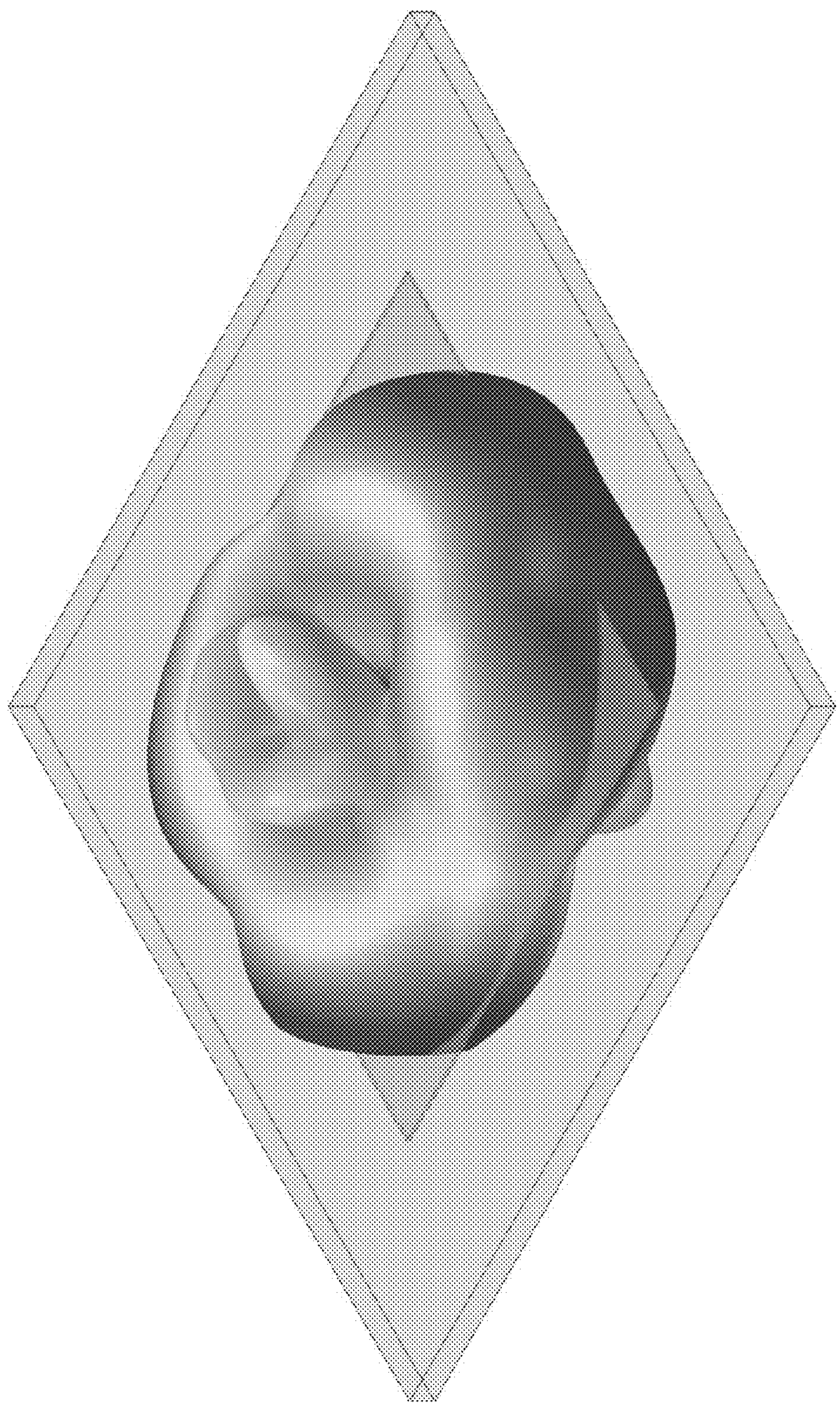
FIG. 8B illustrates a resulting radiation pattern produced by the loop-slot antenna of FIG. 8A without the human body present, in accordance with some embodiments.
Figure 8C:
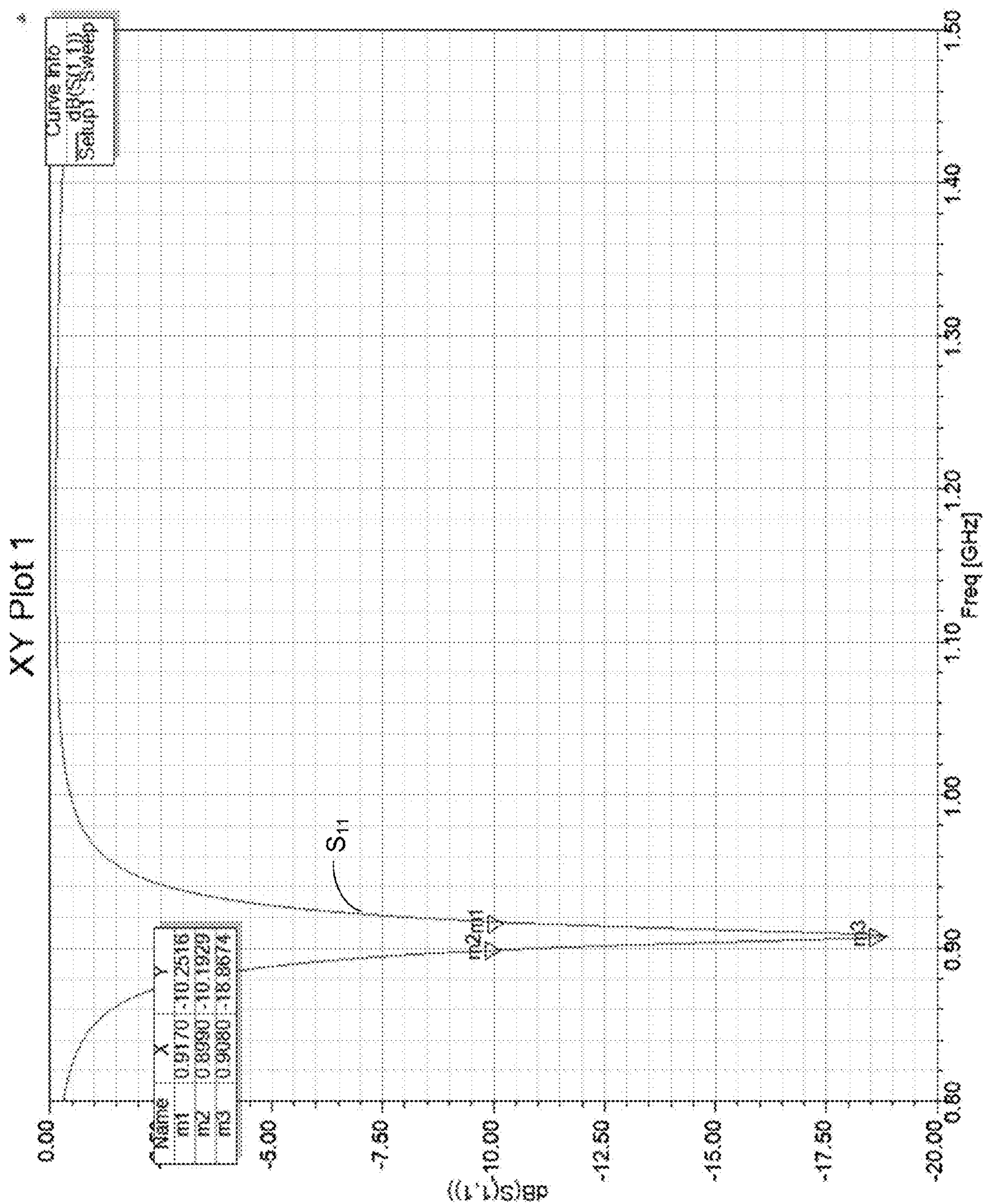
FIG. 8C illustrates a return loss graph for the loop-slot antenna depicted in FIG. 8A in accordance with some embodiments.

FIG. 8B illustrates a radiation pattern 820 produced by an instance of the antenna 800 shown in FIG. 8A without the human body present (but in the presence of a mouse mat and table). As shown, the radiation pattern 820 is substantially omnidirectional (perfect omnidirectionality is achieved when the mat and table are not present). Accordingly, the radiation pattern 820 illustrates that the antenna 800 is mainly immune to the effects of the mat and table. FIG. 8C illustrates a return loss graph for the antenna 800 shown in FIG. 8A without the human body present.

Figure 9A:
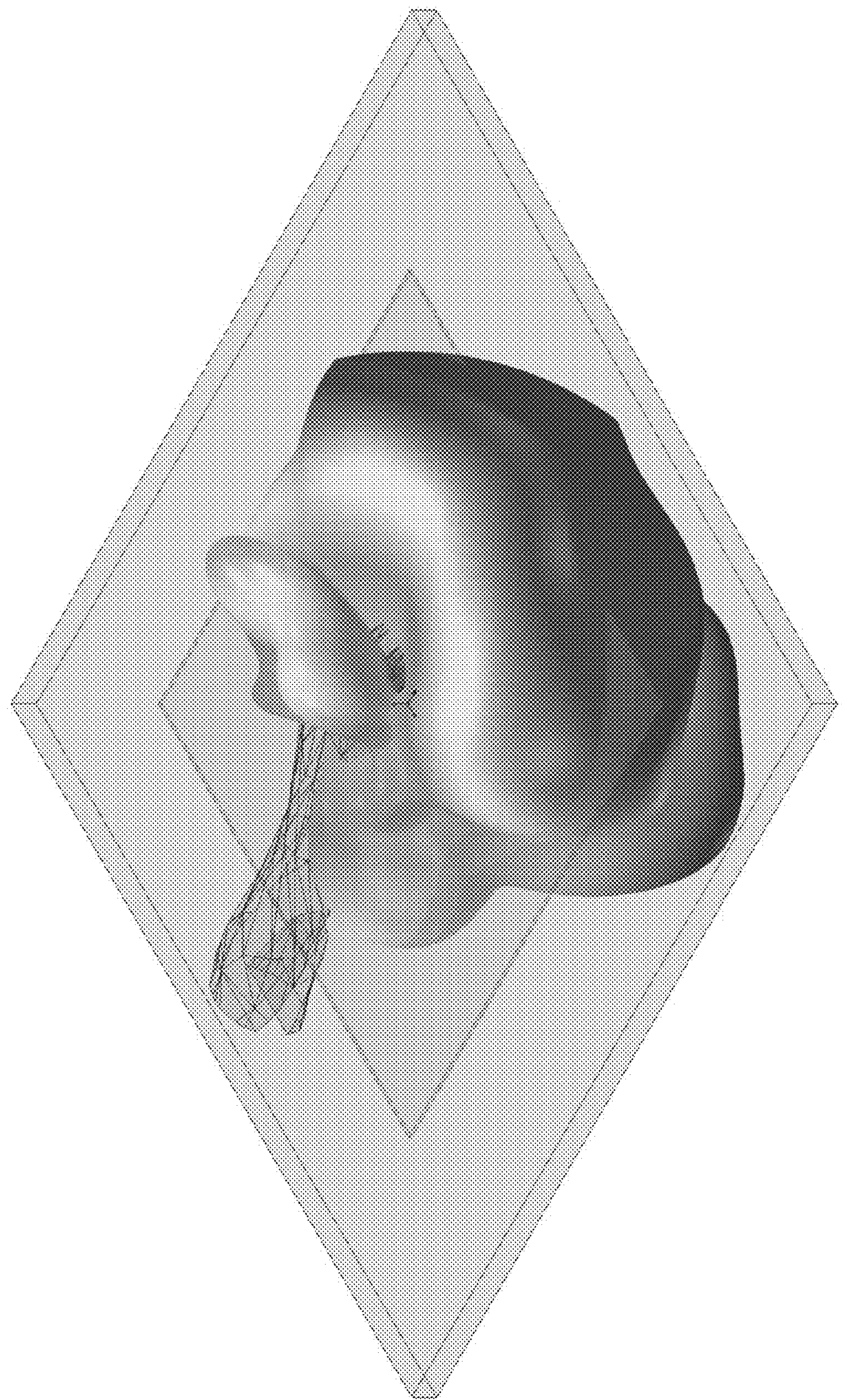
FIG. 9A illustrates a resulting radiation pattern produced by the loop-slot antenna of FIG. 8A in the presence of the human body, in accordance with some embodiments.
Figure 9B:
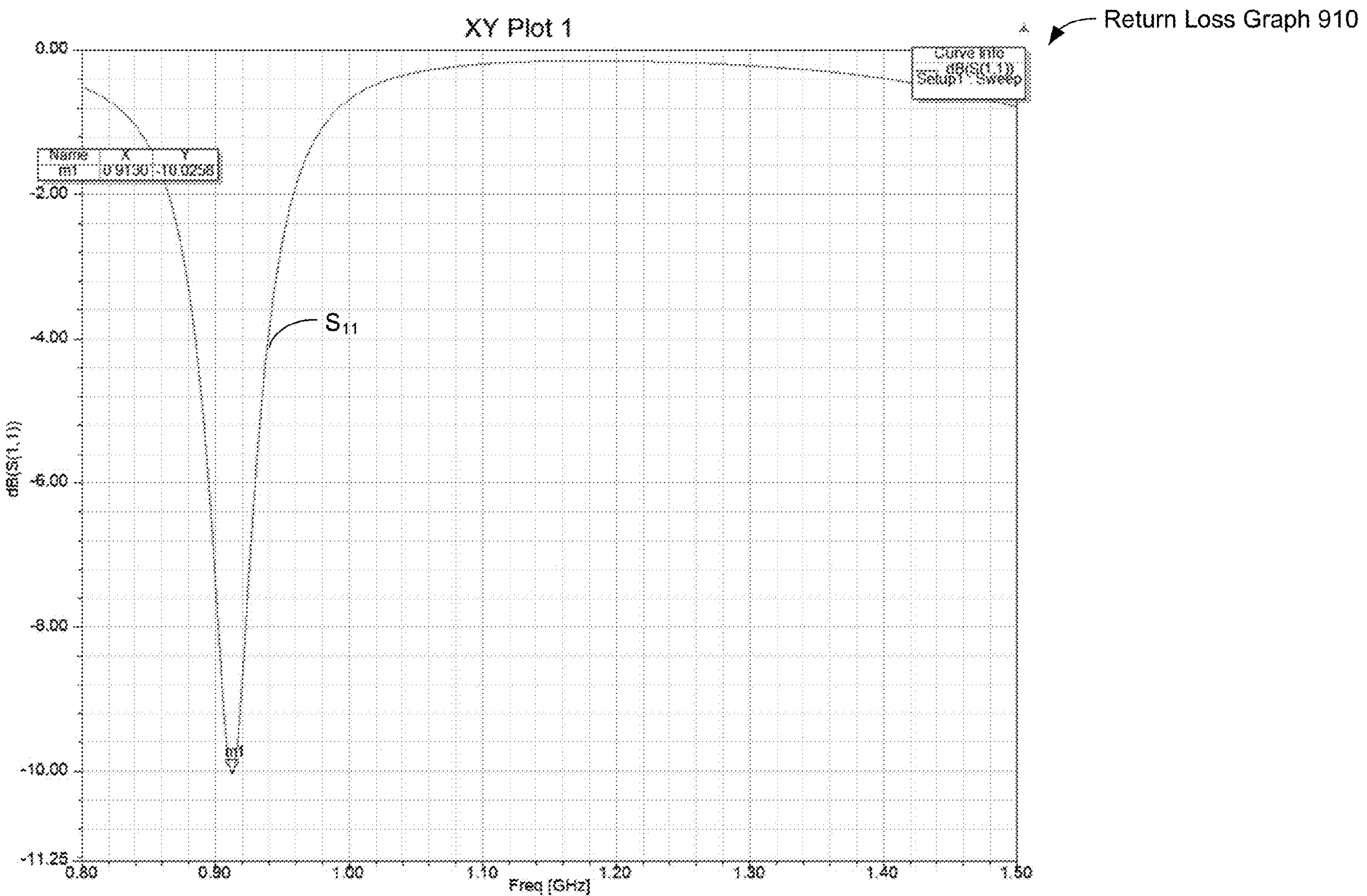
FIG. 9B illustrates a return loss graph for the loop-slot antenna depicted in FIG. 8A in accordance with some embodiments.

FIG. 9A illustrates a radiation pattern 900 produced by an embodiment of the antenna 800 shown in FIG. 8A with a human hand present. As shown, the hand prevents backwards radiation towards the human, but does not prevent forward radiation, which establishes the link with the transmitter 102. FIG. 9B illustrates a return loss graph 910 for the antenna 800 shown in FIG. 8A with a human hand present. It can be observed that given the bandwidth of the antenna 800 (depicted in FIG. 8C), despite the human hand presence, the antenna 800 is still tuned at the frequency of interest.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

It will also be understood that, although the terms "first," "second," etc. may be used herein to describe various elements, these elements should not be limited by these terms. These terms are only used to distinguish one element from another. For example, a first antenna element could be termed a second antenna element, and, similarly, a second antenna element could be termed a first antenna element, without changing the meaning of the description, so long as all occurrences of the "first antenna element" are renamed consistently and all occurrences of the "second antenna element" are renamed consistently. The first antenna element and the second antenna element are both antenna elements, but they are not the same antenna element.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. An antenna for receiving wireless power from a wireless-power-transmitting device, the antenna comprising:
- a plurality of substrates, arranged in a stack, forming a pyramidal frustum;
- a plurality of antenna elements configured to receive vertically polarized electromagnetic power waves transmitted by a wireless-power-transmitting device, wherein:
  - each antenna element of the plurality of antenna elements is attached to one of the plurality of substrates; and
  - one of the plurality of antenna elements is coupled to a transmission line,
- wherein conversion circuitry, coupled to the transmission line, is configured to: (i) convert energy from the received electromagnetic power waves into usable power, and (ii) provide the usable power to an electronic device for powering or charging of the electronic device.

2. The antenna of claim 1, wherein substrates in the plurality of substrates do not directly contact one another.

3. The antenna of claim 1, further comprising multiple sets of metal rods, wherein each of the plurality of substrates is supported by one set of metal rods from the multiple sets of metal rods.

4. The antenna of claim 3, wherein each substrate includes a set of vias defined through the substrate and connected to: (i) predefined portions of one of the plurality of antenna elements at one end, and (ii) one of the sets of metal rods at the other end.

5. The antenna of claim 3, wherein each set of metal rods separates two neighboring substrates by a predefined distance.

6. The antenna of claim 1, wherein:
- the plurality of substrates includes first and second substrates;
- the first substrate includes:
  - a first of the plurality of antenna elements, the first antenna element being a first four-pronged antenna element; and
  - four vias positioned at respective ends of the first four-pronged antenna element;
- the second substrate, which is positioned above the first substrate in the stack, includes:
  - a second of the plurality of antenna elements, the second antenna element being a second four-pronged antenna element; and
  - four vias, vertically aligned with the four vias of the first substrate, positioned at respective ends of the second four-pronged antenna element.

7. The antenna of claim 6, further comprising four metal rods that each have a first length, wherein:
- each of the four metal rods connects one of the four vias of the second substrate with one of the four vias of the first substrate, and
- the second substrate is vertically offset from the first substrate by the first length.

8. The antenna of claim 7, wherein the first and second substrates are parallel.

9. The antenna of claim 7, wherein an operating frequency of the antenna corresponds, at least in part, to a magnitude of the first length.

10. The antenna of claim 6, wherein:
- the first and second substrates are rectangular; and
- a largest cross-sectional dimension of the second substrate is less than a largest cross-sectional dimension of the first substrate.

11. The antenna of claim 6, wherein:
- the first four-pronged antenna element has a first surface area;
- the second four-pronged antenna element has a second surface area; and
- the second surface area is less than the first surface area.

12. The antenna of claim 1, further comprising a ground plane, wherein:
- the ground plane forms a bottom of the stack;
- a first respective antenna element of the plurality of antenna elements is coupled to the ground plane; and
- the first respective antenna element is nearest the ground plane, relative to the other antenna elements in the stack.

13. The antenna of claim 12, wherein the transmission line is coupled to the first respective antenna element.

14. The antenna of claim 1, wherein at least one respective antenna of the plurality of antenna elements follows a meandered path to increase an effective length of the antenna element, thereby lowering a resonant frequency of the at least one respective antenna and reducing an overall size of the at least one respective antenna.

15. An electronic device comprising:
- electronics to track movement of the electronic device;
- a housing with a first surface shaped for a palmar surface of a user's hand and a second surface, opposite the first surface, to translate on a planar surface;
- an antenna, embedded in the housing, including multiple substrates that are spaced apart and arranged in a stack, wherein:

each substrate includes a respective antenna element;

the multiple substrates arranged in the stack form a pyramidal frustum;

the antenna is configured to receive vertically polarized radio frequency (RF) power waves transmitted from a wireless-power-transmitting device; and conversion circuitry, coupled to the antenna and the electronics, configured to (i) convert energy from the received RF power waves into usable power and (ii) provide the usable power to the electronics.

16. The electronic device of claim 15, further comprising multiple sets of metal rods, wherein each of the multiple substrates is supported by one set of metal rods from the multiple sets of metal rods.

17. The electronic device of claim 16, wherein:

each substrate includes a set of vias defined through the substrate and connected to: (i) predefined portions of the respective antenna element at one end, and (ii) one of the sets of metal rods at the other end.

18. The electronic device of claim 16, wherein each set of metal rods separates two neighboring substrates by a predefined distance.

19. The electronic device of claim 15, wherein:

the multiple substrates include first and second substrates;

the first substrate includes:

a first four-pronged antenna element; and four vias positioned at respective ends of the first four-pronged radiating element;

the second substrate, which is positioned above the first substrate in the stack, includes:

a second four-pronged antenna element; and four vias, vertically aligned with the four vias of the first substrate, positioned at respective ends of the second four-pronged meandering antenna element.

20. The electronic device of claim 19, further comprising four metal rods that each have a first length, wherein:

each of the four metal rods connects one of the four vias of the second substrate with one of the four vias of the first substrate, and the second substrate is vertically offset from the first substrate by the first length.

21. The electronic device of claim 20, wherein the first and second substrates are parallel.

22. The electronic device of claim 20, wherein an operating frequency of the antenna corresponds, at least in part, to a magnitude of the first length.

23. The electronic device of claim 19, wherein:

the first and second substrates are rectangular; and a largest cross-sectional dimension of the second substrate is less than a largest cross-sectional dimension of the first substrate.

24. The electronic device of claim 19, wherein:

the first four-pronged antenna element has a first surface area;

the second four-pronged antenna element has a second surface area; and the second surface area is less than the first surface area.

25. The electronic device of claim 15, further comprising a ground plane, wherein:

the ground plane forms a bottom of the stack;

a first respective antenna element is partially coupled to the ground plane; and the first respective antenna element is nearest the ground plane, relative to other antenna elements in the stack.

26. The electronic device of claim 25, further comprising a coaxial cable coupled to the first respective antenna element, wherein the coaxial cable delivers the received RF power waves to the conversion circuitry.

* * * * *